United States Patent
Shirota et al.

(10) Patent No.: US 8,284,246 B2
(45) Date of Patent: Oct. 9, 2012

(54) MICROSCOPE SYSTEM, CONTROL METHOD USED FOR MICROSCOPE SYSTEM, AND RECORDING MEDIUM FOR REPRODUCING A MICROSCOPE STATE BASED ON MICROSCOPE OPERATION HISTORY AND A MICROSCOPE OPERATION ITEM

(75) Inventors: Tetsuya Shirota, Tokyo (JP); Takashi Yoneyama, Sagamihara (JP); Yasuko Ishii, Tokyo (JP)

(73) Assignee: Olympus Corporation, Tokyo (JP)

( * ) Notice: Subject to any disclaimer, the term of this patent is extended or adjusted under 35 U.S.C. 154(b) by 834 days.

(21) Appl. No.: 12/354,045

(22) Filed: Jan. 15, 2009

(65) Prior Publication Data

US 2009/0185035 A1  Jul. 23, 2009

(30) Foreign Application Priority Data

Jan. 18, 2008  (JP) .................................. 2008-008970
Mar. 27, 2008  (JP) .................................. 2008-083182

(51) Int. Cl.
*H04N 9/47* (2006.01)
*H04N 5/243* (2006.01)
*H04N 7/18* (2006.01)

(52) U.S. Cl. ............ 348/79; 348/345; 356/73; 359/363; 382/128; 382/276

(58) Field of Classification Search .................... 348/79, 348/80, 345; 356/73; 359/385–390; 382/276
See application file for complete search history.

(56) References Cited

U.S. PATENT DOCUMENTS

| 5,703,714 | A | 12/1997 | Kojima |
| 7,215,467 | B2* | 5/2007 | Nakagawa ..................... 359/380 |
| 8,014,579 | B2 | 9/2011 | Shirota et al. |
| 8,072,586 | B2* | 12/2011 | Teich et al. ..................... 356/73 |
| 2007/0258011 | A1 | 11/2007 | Tachikawa |
| 2008/0111911 | A1* | 5/2008 | Kawanabe ..................... 348/345 |
| 2008/0158664 | A1* | 7/2008 | Teich et al. ................... 359/363 |
| 2011/0013011 | A1* | 1/2011 | Teich et al. ..................... 348/79 |

FOREIGN PATENT DOCUMENTS

| JP | 8-68946 A | 3/1996 |
| JP | 8-211295 A | 8/1996 |
| JP | 2002-14288 A | 1/2002 |

(Continued)

OTHER PUBLICATIONS

Japanese Office Action dated Jul. 17, 2012 (and English translation thereof) in counterpart Japanese Application No. 2008-008970, pp. 1-6.

(Continued)

*Primary Examiner* — Haresh N Patel
(74) *Attorney, Agent, or Firm* — Holtz, Holtz, Goodman & Chick, PC

(57) ABSTRACT

A microscope system which is capable of changing observation states by driving various optical members and which includes a history record unit for recording history data related to a microscope operation history, a selection unit for selecting one or more microscope operation items from among a plurality of microscope operation items, and a state reproduction unit for reproducing a microscope state on the basis of a microscope operation item(s) selected by the selection unit and on the basis of a microscope operation history related to history data recorded in the history record unit.

4 Claims, 42 Drawing Sheets

FOREIGN PATENT DOCUMENTS

| | | |
|---|---|---|
| JP | 2004-309716 A | 11/2004 |
| JP | 2004-309768 A | 11/2004 |
| JP | 2006-030969 A | 2/2006 |
| JP | 2006-330040 A | 12/2006 |
| JP | 2007-004734 A | 1/2007 |
| JP | 2007-026885 A | 2/2007 |
| JP | 2007-306061 A | 11/2007 |
| JP | 2007-316259 A | 12/2007 |

OTHER PUBLICATIONS

Japanese Office Action dated Jul. 10, 2012 (and English translation thereof) in counterpart Japanese Application No. 2008-083182, pp. 1-4.

* cited by examiner

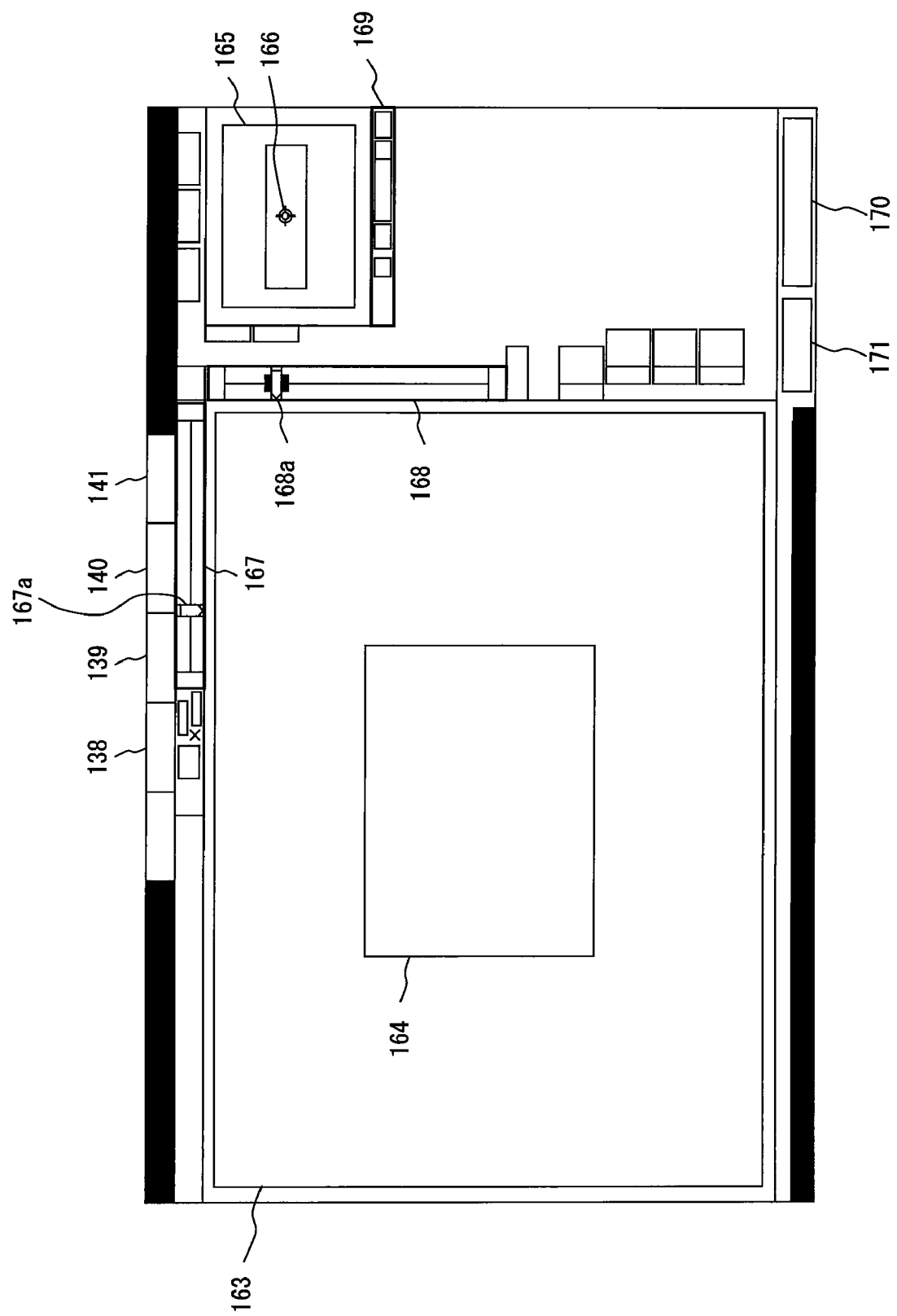
F I G. 25

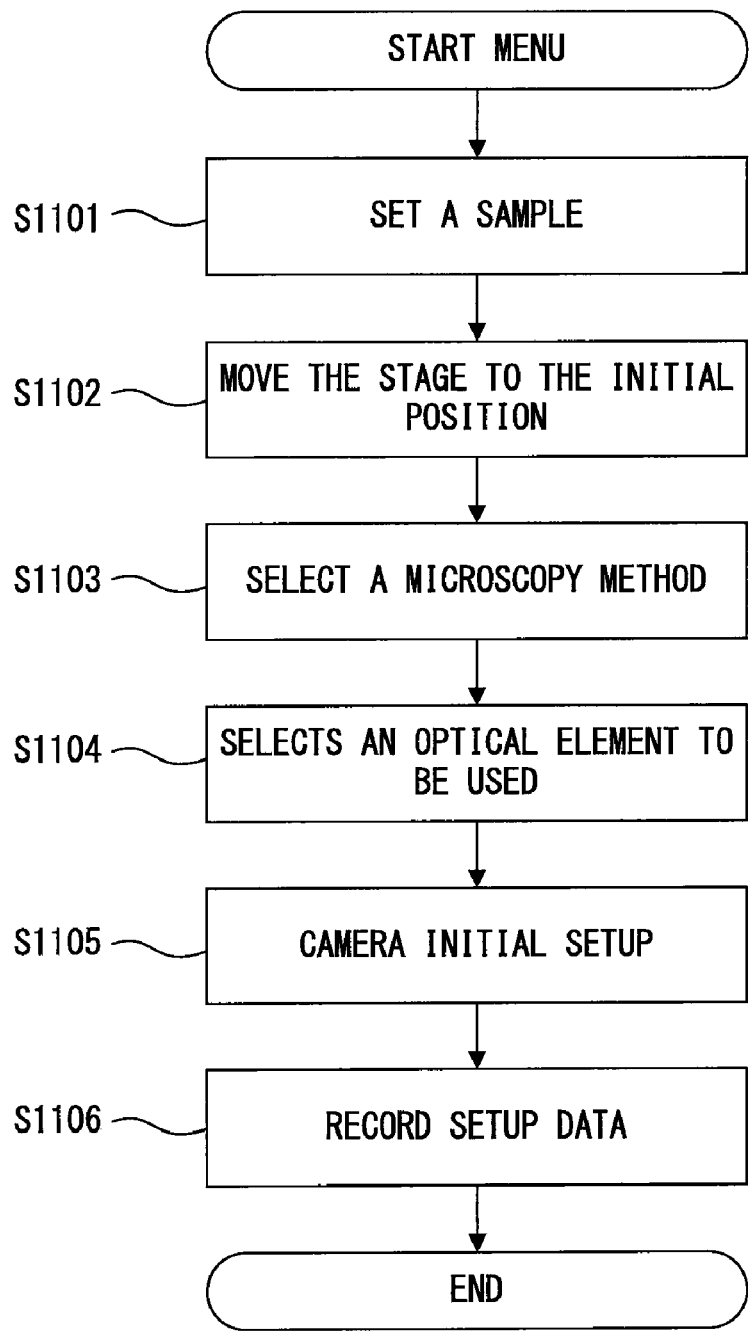
F I G. 2 7

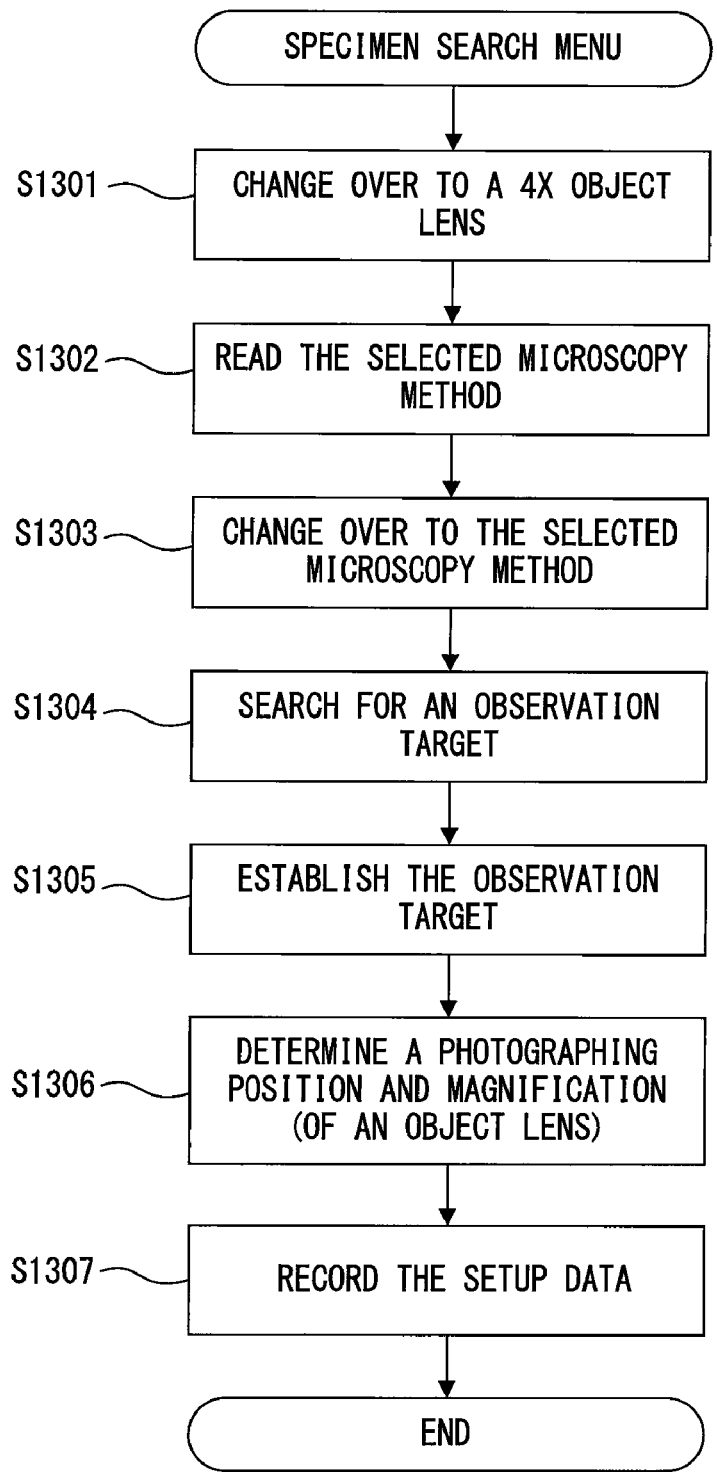
F I G. 29

US 8,284,246 B2

MICROSCOPE SYSTEM, CONTROL METHOD USED FOR MICROSCOPE SYSTEM, AND RECORDING MEDIUM FOR REPRODUCING A MICROSCOPE STATE BASED ON MICROSCOPE OPERATION HISTORY AND A MICROSCOPE OPERATION ITEM

CROSS REFERENCE TO RELATED APPLICATIONS

This application is based upon and claims the benefit of priority from prior Japanese Patent Applications No. 2008-008970, filed Jan. 18, 2008, and No. 2008-083182, filed Mar. 27, 2008, the entire contents of which are incorporated herein by reference.

BACKGROUND OF THE INVENTION

1. Field of the Invention

The present invention relates to a microscope system which includes a plurality of object lenses used for observing minute specimens by enlarging them and in which various optical members are driven by a motor or motors.

2. Description of the Related Art

Microscope apparatuses are widely used in various fields including industry and research and inspection in the field of biology.

When performing inspections using such a microscope apparatus, the observation and inspection are commonly carried out by using a plurality of object lenses with different magnification ratios and operating a motorized stage capable of moving an observation specimen in a plane orthogonal to the observation light path of an object lens. The method for such an inspection includes setting an object lens at a low magnification, screening the entirety of a specimen so as to cover every part thereof, then returning to a point (i.e., a spot) where an abnormal region is discovered in the observation specimen or a point to be desirably recorded, inspecting the abnormal region in detail by changing over to an optimal object lens of high magnification in accordance with the microscopic observation method, and recording the detailed observation data.

Patent document 1 (i.e., Laid-Open Japanese Patent Application Publication No. H08-68946) has put forth a microscope system that restores the attachment and detachment of an optical member and the photography conditions of a photographing apparatus on the basis of one kind of observation state and photographing condition, respectively, selected from a plurality of observation states and photographing conditions, both of which are recorded.

Patent document 2 (i.e., Laid-Open Japanese Patent Application Publication No. 2002-14288) has put forth a microscope apparatus capable of memorizing the content that has been set in a microscope.

Patent document 3 (i.e., Laid-Open Japanese Patent Application Publication No. 2004-309768) has put forth a microscope system which reads a registered observation point and observation condition and which reproduces the observation image of a specimen on the basis of the aforementioned observation point and observation condition.

SUMMARY OF THE INVENTION

A microscope system according to one aspect of the present invention is a microscope system which is capable of changing observation states by driving various optical members and which includes a history record unit for recording history data related to a microscope operation history, a selection unit for selecting one or more microscope operation items from among a plurality of microscope operation items, and a state reproduction unit for reproducing a microscope state on the basis of a microscope operation item(s) selected by the selection unit and on the basis of a microscope operation history related to history data recorded in the history record unit.

Further, a microscope system according to another aspect of the present invention is a microscope system which is capable of changing observation states by driving various optical members and which includes a plurality of wizard units for accepting a setting and an operation which are required in each of a plurality of observation steps, a control unit for executing one of the plurality of wizard units and controlling a microscope apparatus in accordance with the setting and the operation accepted by the wizard unit in execution, and a history record unit for recording the history data of the setting and the operation, wherein the control unit determines a setting and an operation that are to be reproduced on the basis of the post-changeover wizard unit and the history data recorded in the history record unit when the wizards to be executed are changed over, and controls the microscope apparatus in accordance with the present setting and the present operation.

BRIEF DESCRIPTION OF THE DRAWINGS

FIG. 25 is a diagram showing exemplary wizard screen C;

FIG. 27 is a diagram showing a flow chart related to wizard screen A;

FIG. 29 is a diagram showing a flow chart related to wizard screen C;

DESCRIPTION OF THE PREFERRED EMBODIMENTS

The following is a description of the preferred embodiment of the present invention with reference to the accompanying drawings.

First Embodiment

First is a description of a first preferred embodiment.

Figure 1:
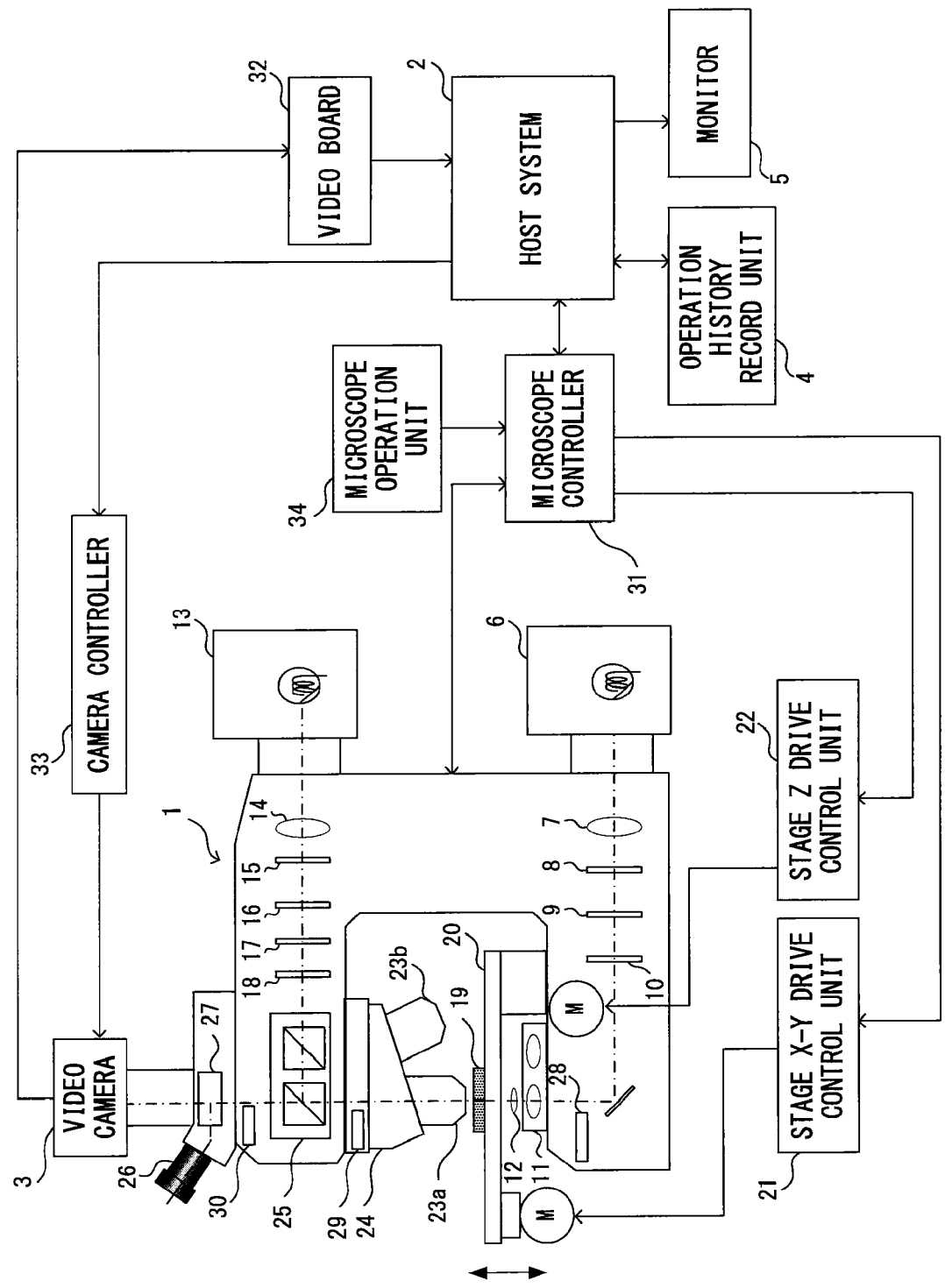
FIG. 1 is a diagram showing an exemplary configuration of a microscope system embodying the present invention.

FIG. 1 is a diagram showing an exemplary configuration of a microscope system embodying the present invention.

Here, an operation history record unit for recording history data related to the history of the operation of a microscope, and the like data, corresponds to an operation history record unit 4. A state reproduction unit for reproducing the state of a microscope corresponds to a host system 2 connected to a microscope apparatus 1 by way of a microscope controller 31. An image pickup unit for picking up the image of a sample corresponds to a video camera 3 for photographing the observation image of the microscope apparatus 1. An image display unit for displaying an image corresponds to a monitor 5 connected to the host system 2.

The microscope apparatus 1 includes, as a transmissive observation-use optical system, a transmissive illumination-use light source 6, a collector lens 7 for condensing the illumination light for the transmissive illumination-use light source 6, a transmissive-use filter unit 8, a transmissive field stop 9, a transmissive aperture stop 10, a condenser optical element unit 11, and a top lens unit 12. The microscope apparatus 1 also includes, as an epifluorescent observation-use optical system, an epifluorescent illumination use light source 13, a collector lens 14, an epifluorescence-use filter unit 15, an epifluorescence shutter 16, an epifluorescence field stop 17, and an epifluorescence aperture stop 18.

Further, a motorized stage 20 on which a sample (i.e., a specimen) 19 is placed and which can be moved in the respective directions up, down, left, and right is comprised on an observation light path at which the light path of the transmissive observation-use optical system crosses that of the epifluorescent observation-use optical system. The movement of the motorized stage 20 is controlled by a stage X-Y drive control unit 21 and a stage Z drive control unit 22. Note that the motorized stage 20 is equipped with an origin detection function (not shown in a drawing herein) by means of an origin sensor and is capable of performing a movement control of the sample 19 placed on the motorized stage 20 by means of a coordinate detection and a coordinate designation.

Further, comprised on the observation light path are a revolver 24 for selecting, by way of a revolving operation, an object lens to be used for an observation from among the object lenses 23a, 23b, 23c and so forth (to be generally called "object lens 23" as appropriate hereinafter); a cube unit 25 for changing over microscopy methods; and a beam splitter 27 for branching the observation light path between an eye lens 26 side and a video camera 3 side.

Further, enabled to be inserted into the observation light path are a polarizer 28 for use in a differential interference observation; a differential interference contrast (DIC) prism 29; and an analyzer 30. Note that these units are respectively motorized and the respective operations are controlled by a microscope controller 31.

The microscope controller 31 connected to the host system 2, including a function of controlling the operation of the entirety of the microscope apparatus 1, is equipped with the function of changing the microscopy methods and adjusting the respective light intensities of the transmissive illumination-use light source 6 and epifluorescent illumination-use light source 13 in accordance with the control signal from the host system 2 and is also equipped with the function of sending out the present microscopy state (i.e., the microscope state) of the microscope apparatus 1 to the host system 2 in accordance with the control signal from the host system 2. Further, the microscope controller 31 is also connected to the stage X-Y drive control unit 21 and stage Z drive control unit 22 so that the motorized stage 20 can also be controlled by the host system 2. A microscope operation unit 34 is a hand switch including various input units for inputting an operating instruction for the microscope apparatus 1, as the host system 2 is capable of doing, and is configured to be capable of operating the motorized stage 20 as well through a joystick and an encoder (which are not shown in a drawing) included in the microscope operation unit 34.

A microscope image of the sample 19 picked up by the video camera 3 is imported into the host system 2 by way of a video board 32. The host system 2 is capable of setting an automatic gain control ON/OFF, a gain, an automatic exposure control ON/OFF, and an exposure time, all on the video camera 3, by way of a camera controller 33. The host system 2 is further capable of storing, in the operation history record unit 4, the image data of an image of the sample 19 that is sent from the video camera 3. The image data stored in the operation history record unit 4 is read by the host system 2 and can be displayed on the monitor 5 that is a display unit.

The host system further provides a function, a so-called video AF function, for performing a focusing operation on the basis of the contrast of an image picked up by the video camera 3. Incidentally, the host system 2 is a commonly configured computer, including: a central processing unit (CPU) for managing the operation control of the entirety of the microscope system through the execution of a control program; main memory used by the CPU as work memory on an as-required basis; an input unit, including a mouse and a keyboard, for obtaining various instructions from a user; an interface unit for managing the exchange of various kinds of data with the individual constituent components of the microscope system; and an auxiliary storage apparatus, such as a hard disk apparatus, for storing various programs and various pieces of data. Further, an operation menu (which is described later) provided by the host system 2 also has the function of the microscope operation unit 34.

The following is a description of the operation of the microscope system in detail.

Figure 2A:
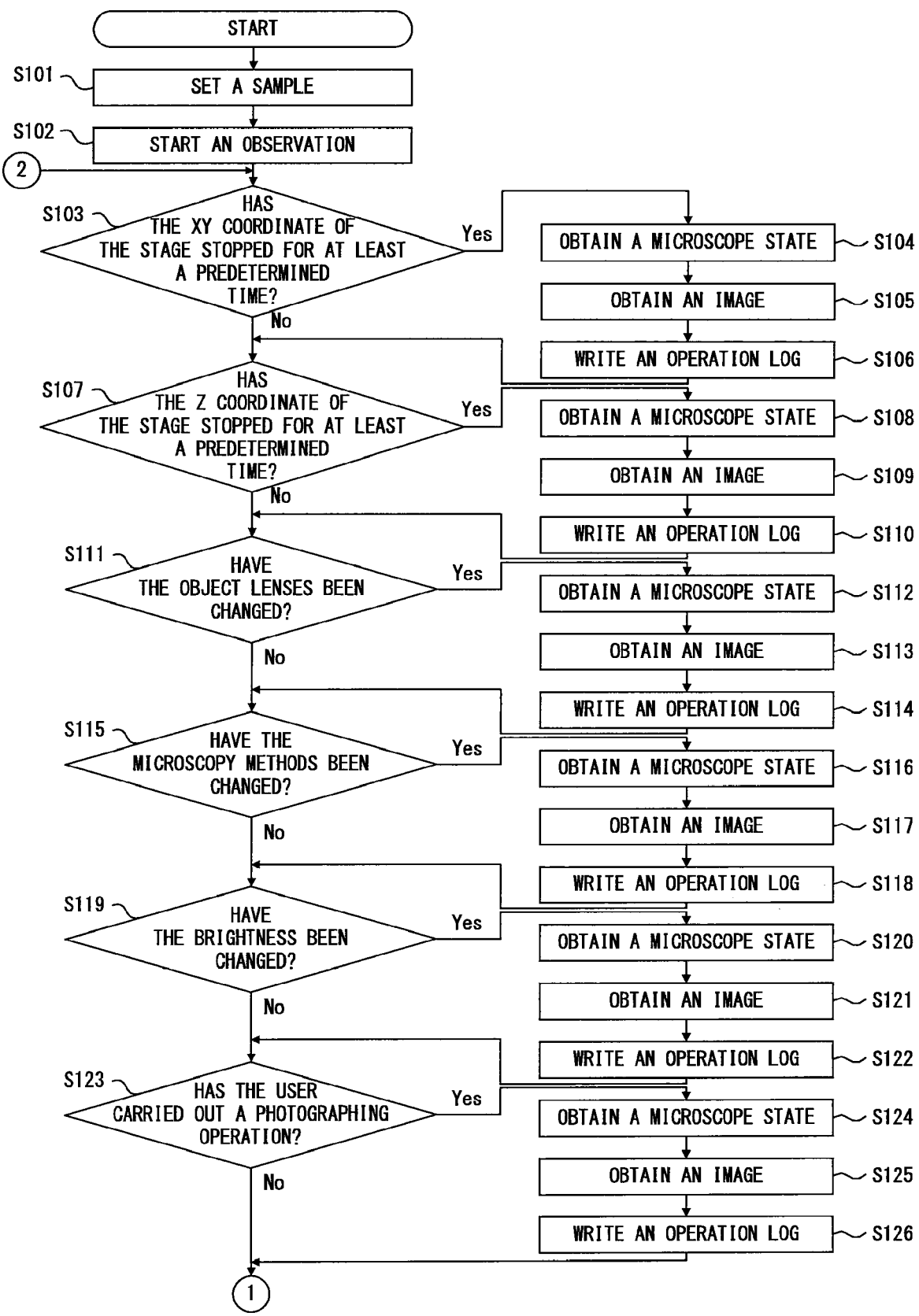
FIG. 2A is a first flow chart showing the process content of the observation of a sample and the restoring operation (i.e., the reproducing operation) of a microscope state, both of which are performed by a host system according to a first preferred embodiment.
Figure 2B:
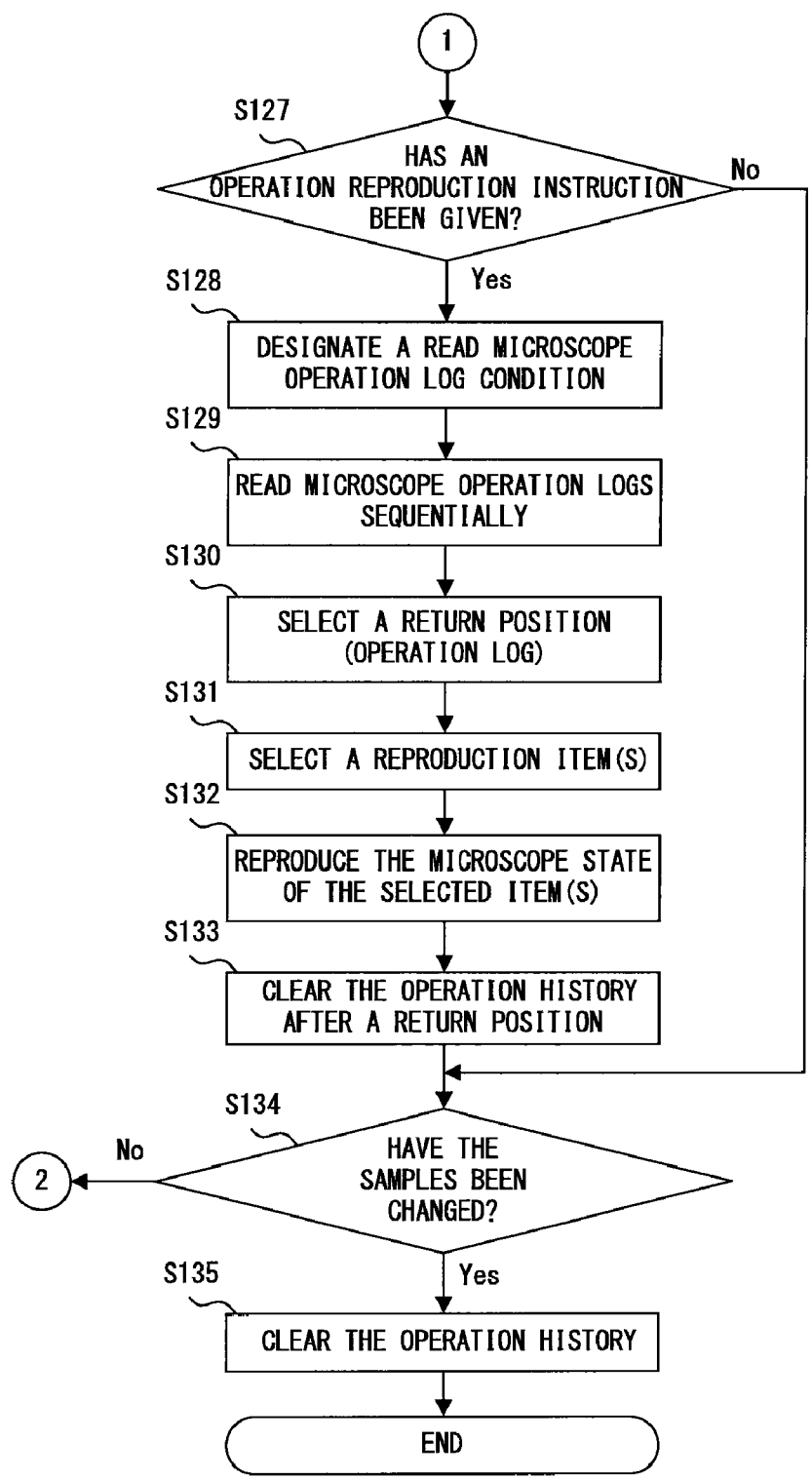
FIG. 2B is a second flow chart showing the process content of the observation of a sample and the restoring operation (i.e., the reproducing operation) of a microscope state, both of which are performed by a host system according to a first preferred embodiment.

FIGS. 2A and 2B are flow charts showing the process content of the observation of the sample 19 and the restoring operation (i.e., the reproducing operation) of a microscope state, which are performed by the host system 2. This process is implemented and started by the CPU of the host system 2 executing a prescribed control program.

Here, the operation is described by exemplifying the case in which the user carries out a screening of the sample 19 and reproduces a microscope state in the state of stopping the motorized stage 20 in order to perform a detailed observation during the screening.

Figure 3:
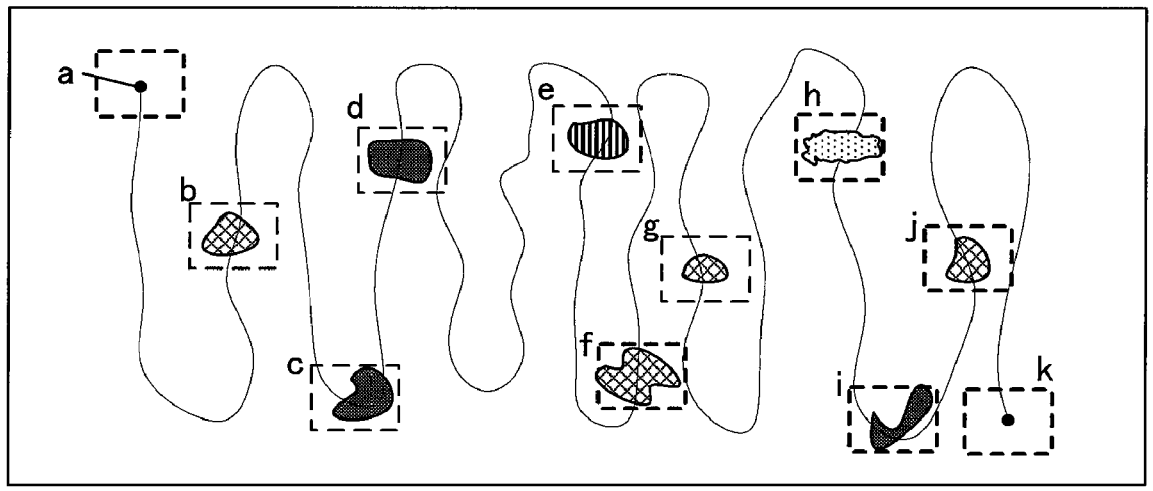
FIG. 3 is a diagram showing an example of a screening path.

FIG. 3 is a diagram showing an example of a screening path in the event. In FIG. 3, a line curve indicates the screening path using a low-magnification object lens 23a. Further, the assumption here is that the sample 19 is observed with a transmissive bright field observation and that the area indicated by the dotted line rectangle shown in FIG. 3 indicates a field scope covered by the low magnification object lens 23a selected during the screening. Another assumption is that the operation of the motorized stage 20 has been stopped for at least a predetermined time period at the respective points, i.e., b to j, for a detailed observation on the screening path.

Figure 4:
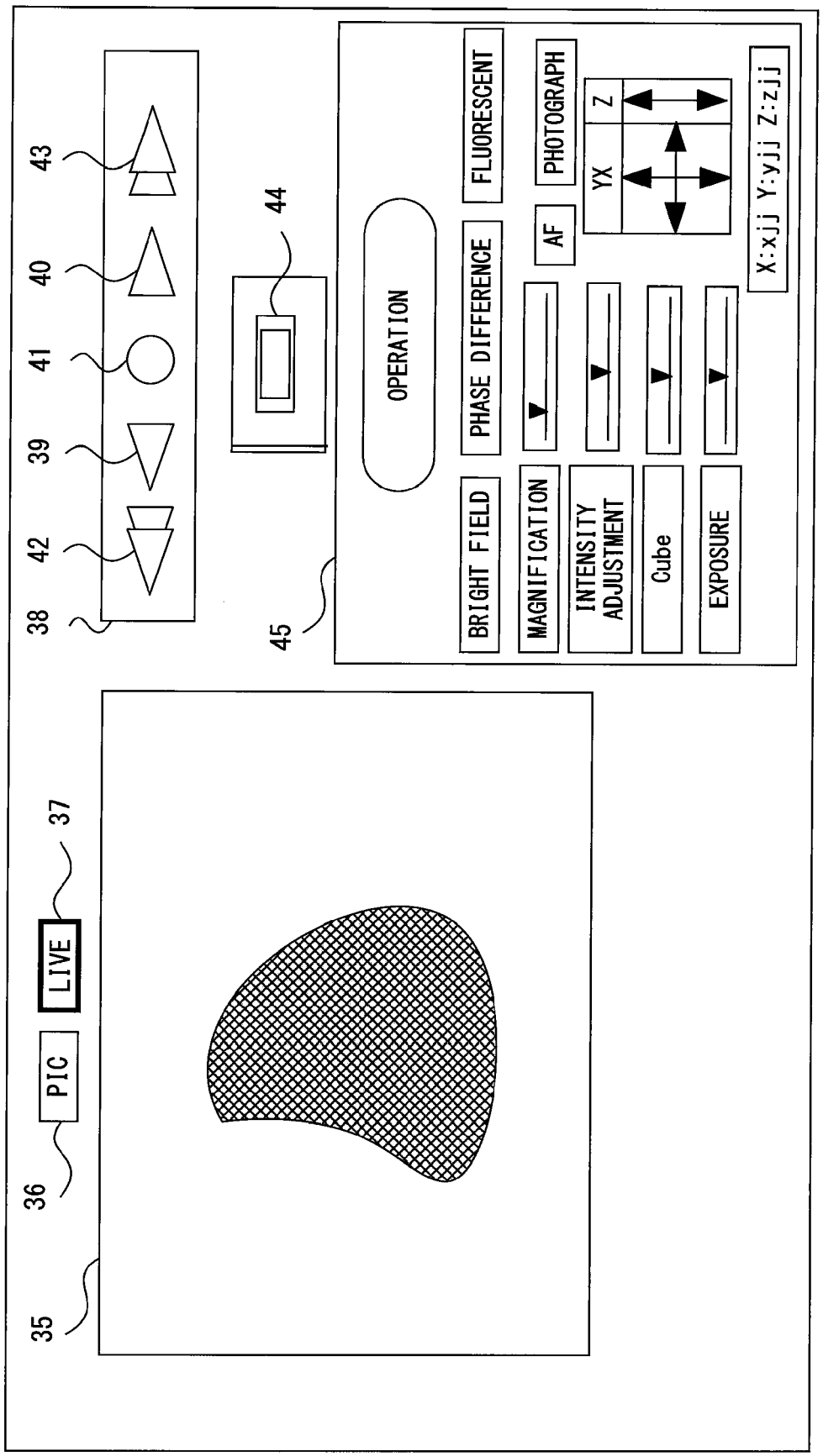
FIG. 4 is a first diagram showing an example of an operation menu according to the first embodiment.

FIG. 4 is a diagram showing an example of an operation menu provided by the host system 2. The operation menu is displayed on the monitor 5 by the host system 2 so that an operation on the basis of the operation menu can be carried out by using the above described mouse and/or keyboard. In the operation menu shown in FIG. 4, a window 35 is configured as a window for displaying an observation image (i.e., a live image) or a photographed image (i.e., a still image), both of which are imaged by the video camera 3 so as to enable a discernment as to which image is displayed depending on whether a button 36 (i.e., a still image button) or a button 37 (i.e., a live image button) is turned on. In the example of FIG. 4, the window 35 displays the live image at point "j" (refer to FIG. 3) during the screening, turning on button 37. Note that the turned-on state of button 36 or button 37 is indicated by a bold solid line box in the drawing(s). The individual buttons, i.e., buttons 39 through 43, of the menu 38 are used for selecting the state for restoring (i.e., reproducing) a microscope state (described later). A microscope operation menu 45, as in the microscope operation unit 34, is a menu for the user to carry out various operations of the microscope apparatus 1 so that an operation of a respective button initiates an execution such as the movement of the motorized stage 20, the changeover of object lenses 23, the changeover of microscopy methods, a light intensity adjustment, and the photographing of a microscopy body (i.e., a sample 19).

As shown in FIGS. 2A and 2B, when the present operation is started, first, the user sets the sample 19 on the motorized stage 20 (S101), changes over various optical elements in order to carry out a transmissive bright field observation, and also changes over to a low-magnification ratio object lens 23a in order to carry out a screening, and starts an observation (S102).

Then the user operates the motorized stage 20 by maneuvering the joystick on the microscope operation unit 34 to start a screening of the sample 19 along the path from "a" through to "k" shown by the line curve shown in FIG. 3.

As the screening is started, the host system 2 judges whether or not a change has occurred in the microscope state and, if a change has occurred, obtains the microscope state at the present time as an operation log (i.e., as an example of microscope operation history), and also obtains the image of the sample 19 using the video camera 3, and stores them in the operation history record unit 4 by correlating them (S103 through S126).

Note that the microscope information obtained as an operation log is the microscope information of the microscope apparatus 1, including the coordinate data (i.e., the coordinate data of the motorized stage 20) of the sample 19 obtained from the motorized stage 20, the information of the selected (i.e., inserted into the light path) object lens 23, the adjusted light intensity value information that is the brightness of a light source in usage (i.e., the transmissive illumination-use light source 6 in this case), and the information related to a microscopy method, all of which are obtained by the host system 2 by way of the microscope controller 31. In the meantime, an obtainment condition flag indicating under what condition (i.e., under what change of the microscope states) the operation log has been obtained is added to the present operation log.

Further, when an operation log and an image of the sample 19 are recorded by correlating them, the record of the operation log and that of the image of the sample 19 are carried out synchronously.

Further describing the above noted S103 through S126 in detail, when the screening is started, the first judgment is made as to whether or not the motorized stage 20 stopped on the XY coordinate for at least a predetermined time period (S103) and, if the judgment result is "yes", a microscope state at the present time is obtained as an operation log and also a flag F_A indicating that the motorized stage 20 has stopped on the XY coordinate for at least a predetermined time period is added to the operation log as an obtainment condition flag (S104), and an image of the sample 19 is obtained by using the video camera 3 (S105). Then, the operation log data related to the operation log obtained in S104 and the image data representing the image of the sample 19 obtained in S105 are recorded in the operation history record unit 4 by correlating both data (S106).

If the judgment result of S103 is "no", or when S106 is completed, then whether or not the motorized stage 20 has stopped on the Z coordinate for at least a predetermined time period is judged (S107) and, if the judgment result is "yes", the microscope state at the present time is obtained as an operation log and also a flag F_B indicating that the motorized stage 20 has stopped on the Z coordinate for at least a predetermined time period is added to the operation log as an obtainment condition flag (S108), and an image of the sample 19 is obtained by using a video camera 3 (S109). Then, the operation log data related to the operation log obtained in S108 and the image data representing the image of the sample 19 obtained in S109 are recorded in the operation history record unit 4 by correlating both data (S110).

If the judgment result of S107 is "no", or when S110 is completed, then whether or not the object lenses 23 have been changed over is judged (S111) and, if the judgment result is "yes", the microscope state at the present time is obtained as an operation log and also a flag F_C indicating that the magnifications (i.e., the object lenses 23) have been changed is added to the operation log (S112), and an image of the sample 19 is obtained by using the video camera 3 (S113). Then, the operation log data related to the operation log obtained in S112 and the image data representing the image of the sample 19 obtained in S113 are recorded in the operation history record unit 4 by correlating both data (S114).

If the judgment result of S111 is "no", or when S114 is completed, then whether or not the microscopy methods have been changed is judged (S115). If the judgment result is "yes", the microscope state at the present time is obtained as an operation log and also a flag F_G indicating that the microscopy methods have been changed is added to the operation log as an obtainment condition flag (S116), and an image of the sample 19 is obtained by using the video camera 3 (S117). Then, the operation log data related to the operation log obtained in S116 and the image data representing the image of the sample 19 obtained in S117 are recorded in the operation history record unit 4 by correlating both data (S118).

If the judgment result of S115 is "no", or when S118 is completed, then whether or not the brightness levels of the light source in use (i.e., the transmissive illumination-use light source 6 in this case) have been changed is judged (S119). If the judgment result is "yes", the microscope state at the present time is obtained as an operation log and also a flag F_E indicating that the brightness levels of the light source in use has been changed is added to the operation log as an obtainment condition flag (S120), and an image of the sample 19 is obtained by using the video camera 3 (S121). Then, the operation log data related to the operation log obtained in S120 and the image data representing the image of the sample 19 obtained in S121 are recorded in the operation history record unit 4 by correlating both data (S122).

If the judgment result of S119 is "no", or when S122 is completed, then whether or not a photographing operation instructed by the user has been carried out is judged (S123). If the judgment result is "yes", the microscope state at the present time is obtained as an operation log and also a flag F_H indicating that the photographing operation that the user has instructed be performed has been carried out is added to the operation log (S124), and an image of the sample 19 is obtained by using the video camera 3 (S125). Then, the operation log data related to the operation log obtained in S124 and the image data representing the image of the sample 19 obtained in S125 are recorded in the operation history record unit 4 by correlating both data (S126).

If the judgment result of S123 is "no", or when S126 is completed, then whether or not an operation reproduction instruction has been given is judged (S127) Note that the judgment is made in accordance with whether or not button 39 on the menu 38 in the operation menu (refer to FIG. 4) has been clicked with a mouse. That is, if button 39 has been clicked with the mouse, the judgment of S127 is "yes"; otherwise, it will be "no".

If the judgment result of S127 is "yes", the restoring (i.e., reproducing) operation is carried out (S128 through S133, to be described later in detail) and the process proceed to S134, while if the judgment result of S127 is "no", the process proceeds to S134.

After completing S133, or if the judgment result of S127 is "no", then whether or not the samples 19 placed on the motorized stage 20 have been changed is judged (S134). Note that the judgment can be made, for example, by judging whether or not a report indicating that the samples 19 have been changed is sent to the host system 2 by the user operating the keyboard or mouse.

If the judgment result of S134 is "no", the process returns to S103.

As described above, the operation log is recorded in the host system 2 every time the operation on the microscope is carried out until the sample 19 that is a specimen is changed to another (i.e., until the screening is completed).

At this time, a specific example of the operations of the above noted S103 through S126 is described.

It is assumed, for example, that the motorized stage 20 stops at a point "b" (refer to FIG. 3) on the XY coordinate for at least a predetermined time period in order to perform a detailed observation after starting a screening. In this case, the host system 2, judging that the microscope states have changed, carries out the above described S104 through S106. That is, the host system 2 obtains, by way of the microscope controller 31, the microscope information of the microscope apparatus 1, as an operation log, including the coordinate data of the sample 19 from the motorized stage 20 (i.e., the coordinate data of the motorized stage 20), the information of the object lens 23, the information of the intensity adjustment value, and the information related to the microscopy method. The host system 2 further adds a flag F_A to the operation log, as an obtainment condition flag, indicating that the motorized stage 20 has stopped on the XY coordinate for at least a predetermined time period and obtains the image of the sample 19 at point b by using the video camera 3. Then, the host system 2 records the operation log data related to the operation log and the image data representing the image of the sample 19 in the operation history record unit 4 by correlating both data. In this case, the image data at point b is correlated by adding the microscope information, including the operation log data at point b, that is, the XYZ coordinate data (b_x, b_y, b_z) of the sample 19, the information (b_ob) of the selected object lens 23, the information (b_bright) of the intensity adjustment value, the information (b_posi) related to the microscopy method, the information (b_ccd) of the camera setup, and flag F_A (b_flag) as an obtainment condition flag, and they are recorded in the operation history record unit 4 in a form allowing a readout in synchronization with the image data.

Meanwhile, at point f (refer to FIG. 3) for example, the image data at point f is correlated by adding the microscope information, including the operation log data at point f, that is, the XYZ coordinate data (f_x, f_y, f_z) of the sample 19, the information (f_ob) of the selected object lens 23, the information (f_bright) of the intensity adjustment value, the information (f_posi) related to the microscopy method, the information (f_ccd) of the camera setup, and an obtainment condition flag (f_flag), and they are recorded in the operation history record unit 4 in a form allowing a readout in synchronization with the image data.

Next is a description of the restoring (i.e., reproducing) operation of the microscope state carried out if the judgment result of the above described S127 is "yes". Here, the operation is described by exemplifying a case in which the judgment result of S127 is "yes" when the operation menu shown in FIG. 4 is displayed on the monitor 5.

Figure 5:
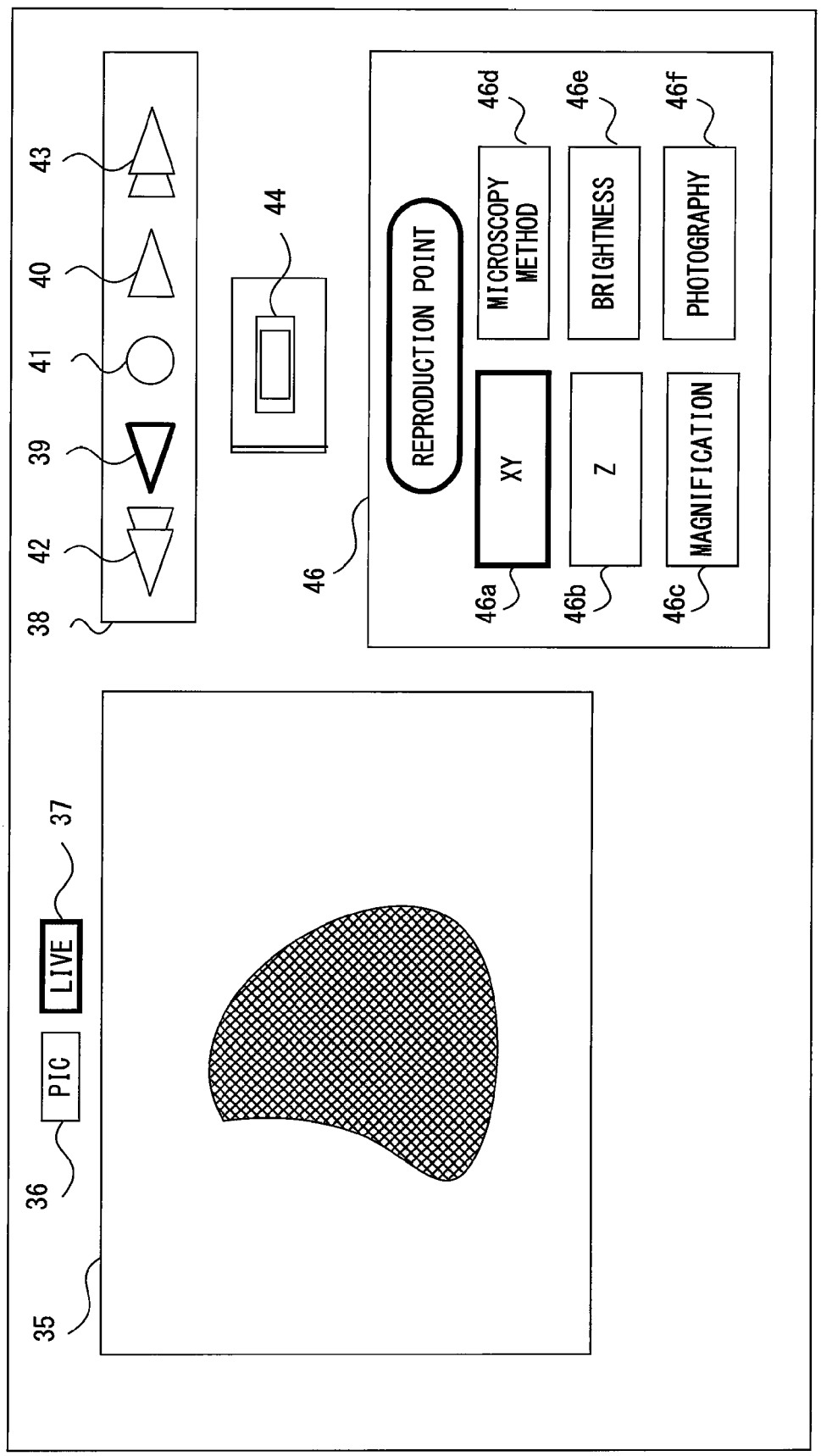
FIG. 5 is a second diagram showing an example of an operation menu according to the first embodiment.

When S127 constitutes "yes", the microscope operation menu 45 of the operation menu shown in FIG. 4 is changed to a reproduction point selection menu 46 as shown in FIG. 5.

Here, the reproduction point selection menu 46 is disposed to enable a selection for restoring to (i.e., reproducing) a microscope state in which it is shown what conditions have been changed, when the user clicks button 39 of the menu 38 with the mouse. For example, when the user clicks the XY button 46a with the mouse in the reproduction point selection menu 46 to select the XY button 46a, the operation log data that have been recorded when the motorized stage 20 is stopped on the XY coordinate for at least a predetermined period are read from the operation history record unit 4 one at a time every time button 39 is clicked with the mouse. Note that operation log data that has been recorded when the motorized stage 20 is stopped on the XY coordinate for at least a predetermined period is read after a judgment of the obtainment condition flag added to the operation log related to the operation log data is made. Meanwhile, when the user clicks a magnification button 46b with the mouse to select the magnification button 46b for example, the operation log data that have been recorded when the object lenses 23 were changed are read from the operation history record unit 4 one at a time every time button 39 is clicked with the mouse. Note that the operation log data that has been recorded when the object lenses 23 were changed is read after a judgment of the obtainment condition flag added to the operation log related to the operation log data is made.

When the judgment result of S127 constitutes "yes" and the microscope operation menu 45 is changed over to the reproduction point selection menu 46, then a condition for the operation log data to be read from the operation history record unit 4 is designated (S128), and the operation log data in accordance with the condition is sequentially read from the operation history record unit 4 (S129).

Figure 6:
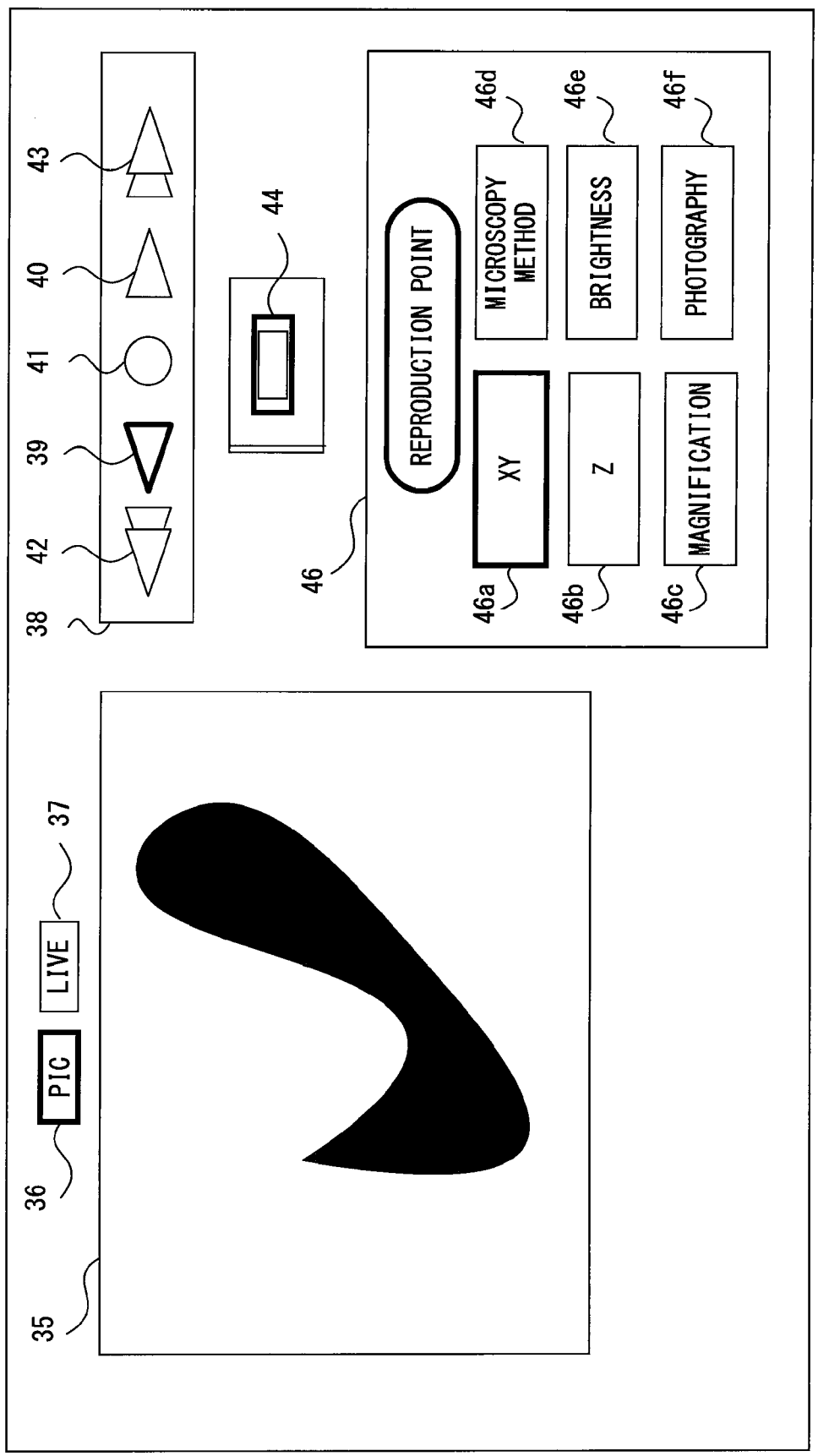
FIG. 6 is a third diagram showing an example of an operation menu according to the first embodiment.

For example, when the XY button 46a is selected in the reproduction point selection menu 46, with the operation log data that has been recorded when the motorized stage 20 being stopped on the XY coordinate for at least a predetermined period is designated as the condition for the operation log data to be read from the operation history record unit 4, the operation log data that has been recorded when the motorized stage 20 is stopped at point i (refer to FIG. 3), which is one point prior to point j (refer to FIG. 3), on the XY coordinate for at least a predetermined period is read in accordance with one mouse click on button 39 performed by the user thereafter, and the image of the sample 19 related to the image data that is correlated with the operation log data is displayed in the window 35 as shown in FIG. 6. Note that a still image is displayed in the window 35 in this event and therefore a button 36 indicating the event is turned on. Then, further clicking on button 39 with the mouse in this case will cause the operation log data recorded at the points h, g, f and so on (refer to FIG. 3) to be read in sequence.

Meanwhile, button 40 in the menu 38 of the operation menu is disposed to move along in time the operation log data to be read from the operation history record unit 4 so that, if button 40 is clicked with the mouse when the operation log data recorded, for example, at point f (refer to FIG. 3) is being read, the operation log data recorded at point g (refer to FIG. 3) is read once again. Further, button 41 is disposed to cancel reading operation log data to return to an operation menu prior to reading the operation log data. That is, when button 41 is clicked with the mouse, the operation menu shown in FIG. 4 is resumed in this case. In the meantime, buttons 42 and 43 are for reading the operation log data recorded first and the operation log data recorded last, respectively.

As such, the user is enabled to click buttons 39, 40, or the like to search for a point for which a microscope state is reproduced.

When S129 is completed, the point for which the microscope state is to be reproduced is selected (S130). Note that the selection is carried out by the user clicking the reproduction button 44 with the mouse. That is, an image displayed in the window 35 when the reproduction button 44 is clicked with the mouse is selected, and the point at which the image data representing the image is recorded is selected as the point for which the microscope state is to be reproduced. This configuration enables the user to reproduce the microscope state on the basis of the operation log data recorded at the point just by the user clicking the reproduction button 44 with the mouse after displaying the image of the sample 19 related to the image data recorded at the point for which the microscope state is to be reproduced. Here, the assumption is that point g (refer to FIG. 3) is selected as the point for which the microscope state is to be reproduced.

Note that at the timing when the reproduction button 44 is clicked with the mouse and the operation log data correlated with the image data related to the image displayed in the window 35 is also read already, with the microscope state not being yet to be reproduced.

Figure 7:
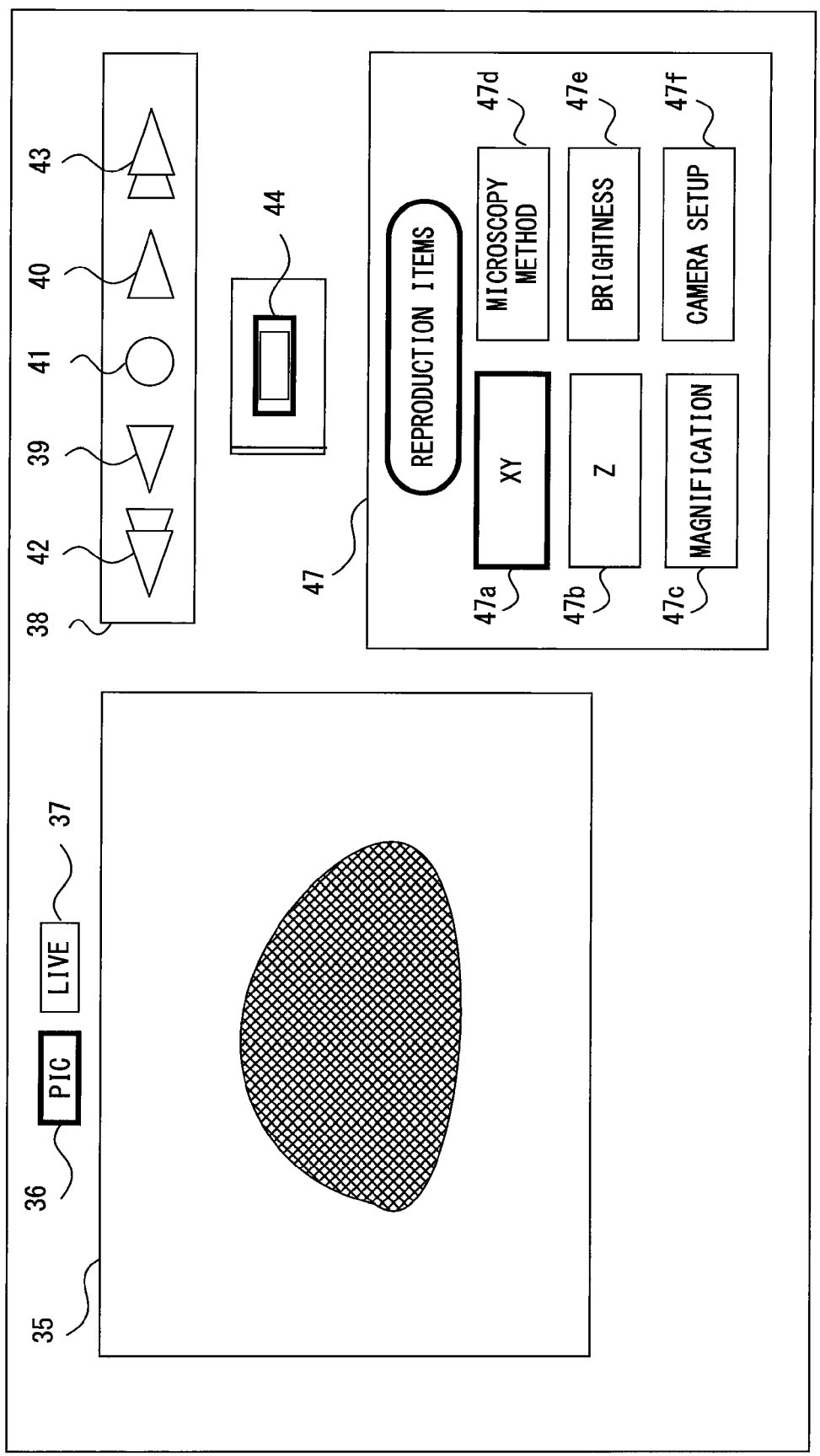
FIG. 7 is a fourth diagram showing an example of an operation menu according to the first embodiment.

When the reproduction button 44 is clicked with the mouse and the point for which the microscope state is to be reproduced is selected, the reproduction point selection menu 46 shown in FIG. 6 and elsewhere is changed over to a reproduction item selection menu 47 as shown in FIG. 7. Note that point g is selected as the point for which the microscope state is to be reproduced in this case and therefore the window 35 displays the image according to the image data recorded at point g.

The reproduction item selection menu 47 is disposed to enable the user to select which operation item(s) (i.e., a microscope operation item(s)) is to be reproduced in the operation log related to the operation log data recorded at the selected point. When the user clicks, for example, an XY button 47a with the mouse to select it in the reproduction item selection menu 47, the state of the XY coordinate of the motorized stage 20 is reproduced, while when she/he clicks the camera setup button 47f with the mouse to select it, the setup of the video camera 3 is reproduced.

When S130 is completed and the reproduction point selection menu 46 is changed over to the reproduction item selection menu 47, the reproduction item(s) therein is (are) selected (S131). The assumption here is that only the state of the XY coordinate of the motorized stage 20 at point g is reproduced and that the user has selected it by clicking the XY button 47a with the mouse in the reproduction item selection menu 47.

Then, the microscope state is reproduced in accordance with the reproduction item selected in S131 (S132). The microscope state, however, is reproduced by the user clicking the reproduction button 44 once again with the mouse. Here, since the XY button 47a in the reproduction item selection menu 47 is selected, the host system 2, by way of the microscope controller 31, instructs the stage X-Y drive control unit 21 so as to cause the XY coordinate of the motorized stage 20 to be the coordinate (g_x, g_y) so that only the XY coordinate of the motorized stage 20 is reproduced in the operation log related to the operation log data that has been recorded at point g (refer to FIG. 3) when the reproduction button 44 is once again clicked with the mouse.

Figure 8:
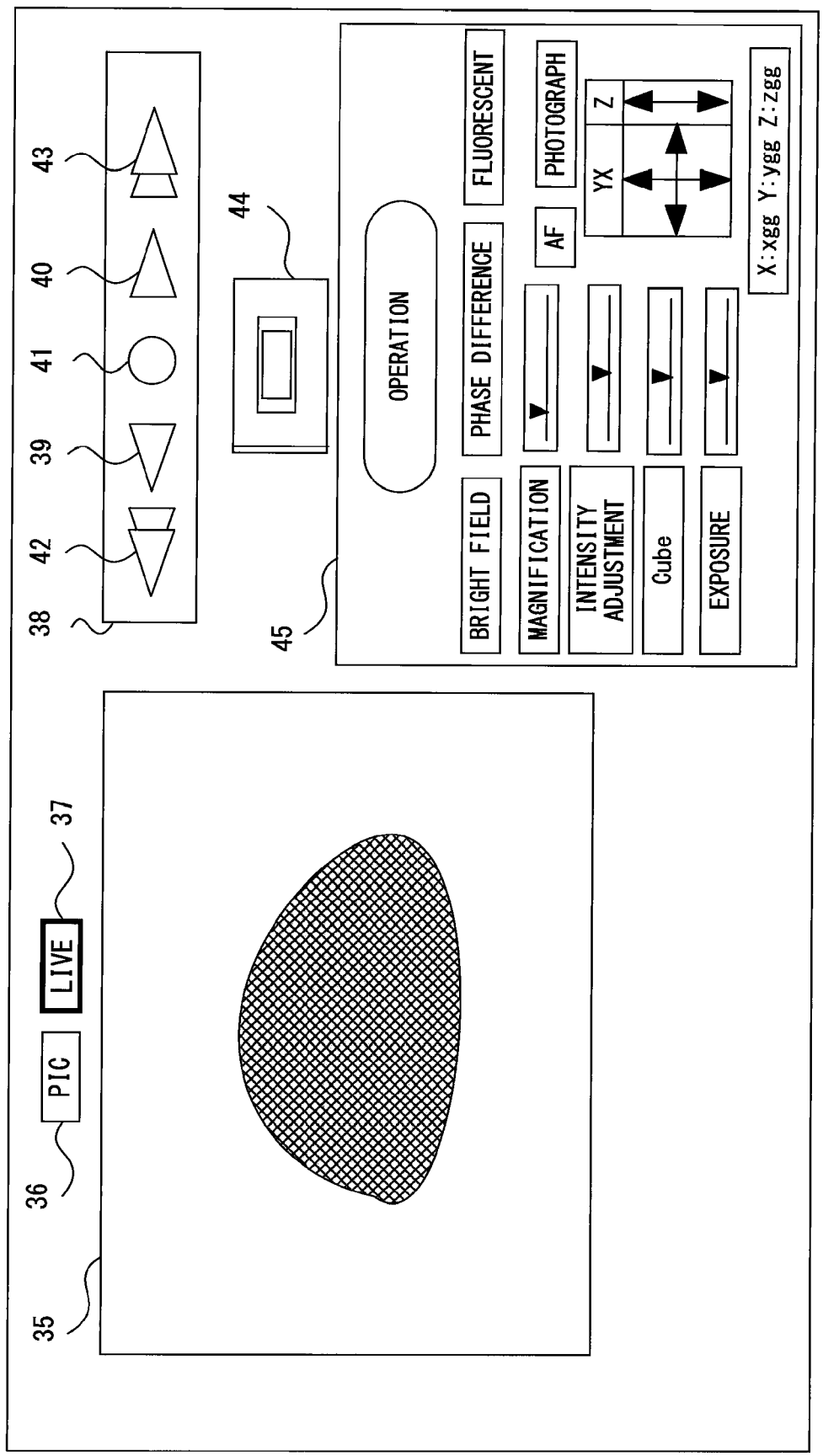
FIG. 8 is a fifth diagram showing an example of an operation menu according to the first embodiment.

When the microscope state is reproduced as such, the image displayed in the window 35 in the operation menu is changed over to a live image, and the reproduction item selection menu 47 is changed over to the microscope operation menu 45. Here, when the state of the XY coordinate of the motorized stage 20 at point g is actually reproduced, the image displayed in the window 35 is changed over to the live image of point g, and button 37 is turned on, as shown in FIG. 8. Further, the reproduction item selection menu 47 shown in FIG. 7 is changed over to the microscope operation menu 45 as shown in FIG. 8. This enables a continuation of the observation starting from point g once again.

When S132 is completed, the operation log data and image data which are recorded in the operation history record unit 4 between the point at which the last operation log data and image data have been recorded in the operation history record unit 4 and the point at which the microscope state has been reproduced in S132 are cleared (i.e., deleted) (S133). Here, the operation log data and image data which are recorded in the operation history record unit 4 between point j and point g are cleared.

When S133 is completed, whether or not the samples 19 placed on the motorized stage 20 have been changed is judged as described above (S134). If the judgment result is "no", the process returns to S103. In contrast, if the judgment result is "yes", the operation log data and image data which are recorded in the operation history record unit 4 are all cleared (i.e., deleted) (S135) and the present process flow ends.

As described above, the present process flow records the microscope operations carried out between the setting of a sample 19 and the replacement thereof as the operation log every time the microscope operation is carried out, making it possible to reproduce (i.e., restore) the microscope state only for a specific microscope operation(s) on the basis of the operation log.

Note that the process flow shown in the above described FIG. 2 has been provided by exemplifying the case of reproducing only the XY coordinate in the microscope state between the point j and point g with reference to FIGS. 3 through 8. At this time, a description is provided by exemplifying the case in which only an XY coordinate and magnification in the microscope state between point j and point h are reproduced, with reference to FIGS. 3 and 4 and FIGS. 9 through 12. The assumption for this case is that the object lens 23 is changed to a higher magnification at point h and then an observation at a high magnification is carried out.

Figure 9:
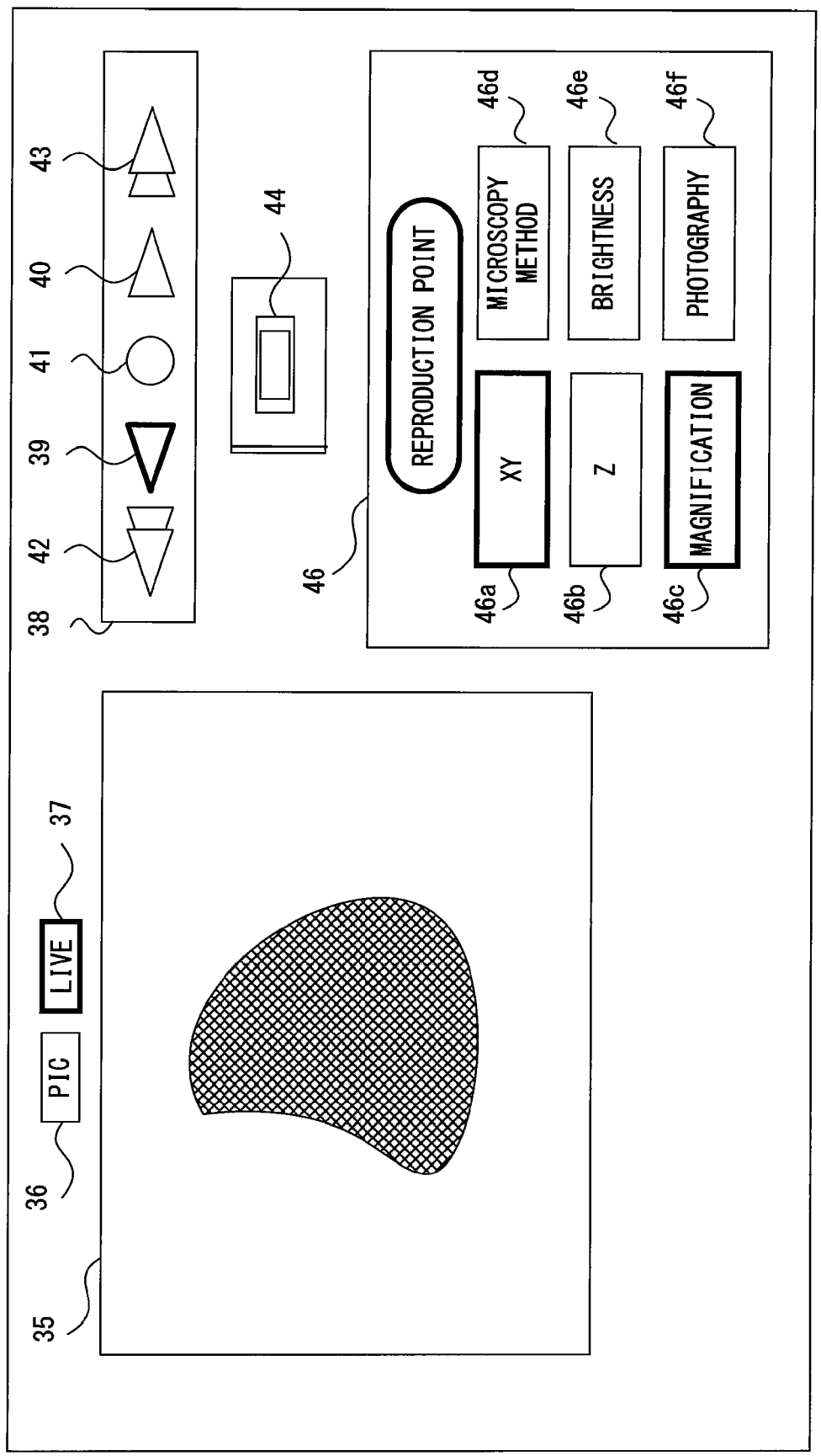
FIG. 9 is a sixth diagram showing an example of an operation menu according to the first embodiment.

In this case, if button 39 in the menu 38 is clicked with the mouse by the user when the live image of point j (refer to FIG. 3) is displayed in the window 35 as shown in FIG. 4, the microscope operation menu 45 is changed over to the reproduction point selection menu 46 as shown in FIG. 9. Then, when the XY button 46a and magnification button 46c in the reproduction point selection menu 46 are clicked with the mouse by the user and when button 39 is further clicked with the mouse, the operation log data that was recorded when the motorized stage 20 was stopped on the XY coordinate for at least a predetermined period, or the operation log data that was recorded when the magnifications (i.e., object lenses 23) were changed, is read.

Note that after the XY button 46a and magnification button 46c in the reproduction point selection menu 46 are selected, the operation log data that was recorded when the motorized stage 20 was stopped on the XY coordinate for at least a predetermined period, or the operation log data that was recorded when the magnifications (i.e., object lenses 23) were changed, is read every time button 39 is clicked with the mouse.

Figure 10:
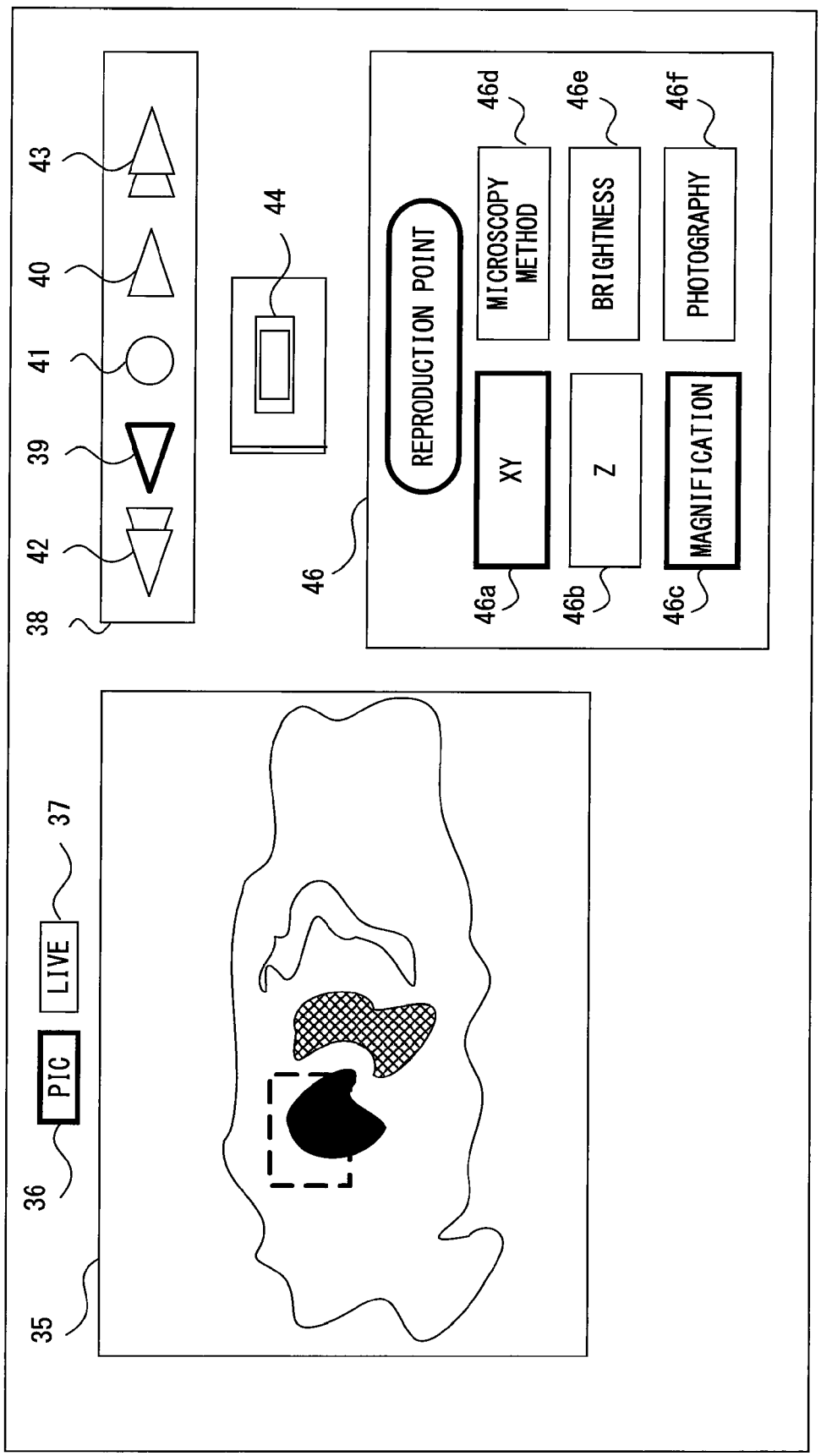
FIG. 10 is a seventh diagram showing an example of an operation menu according to the first embodiment.

FIG. 10 shows the operation menu when the operation log data and image data, both of which have been recorded at point h (refer to FIG. 3) at which the motorized stage 20 stopped on the XY coordinate for at least a predetermined period, are read as a result of the user clicking button 39 with the mouse. Therefore, the image according to the image data is displayed in the window 35 according to the operation menu shown in FIG. 10. Note that the image is an image picked up with a low magnification ratio object lens 23a. Meanwhile, the dotted line box shown in the image indicates, for convenience, the field scope provided by a high magnification ratio object lens 23 (which is described later), and such a display does not actually exist.

Figure 11:
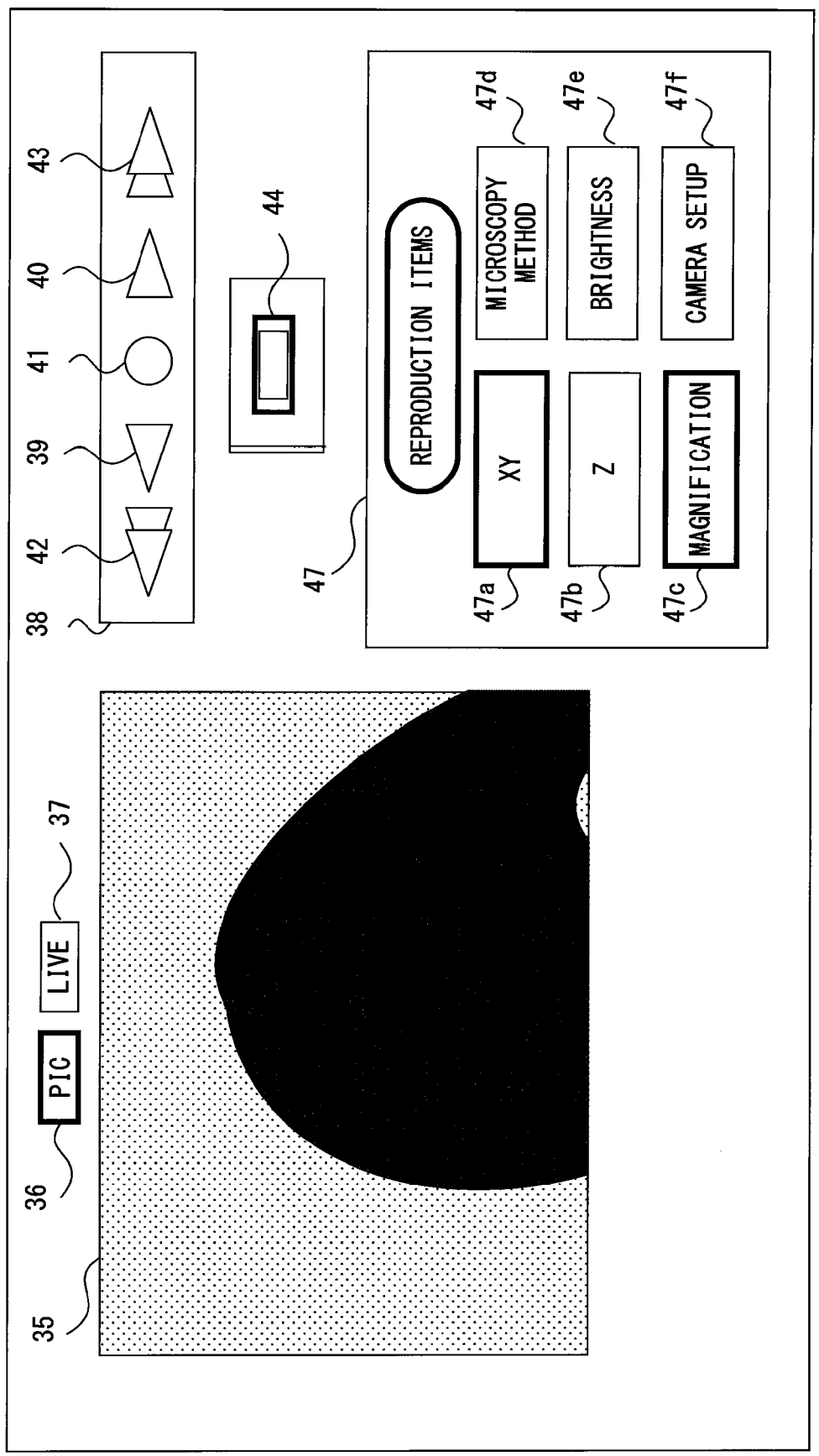
FIG. 11 is an eighth diagram showing an example of an operation menu according to the first embodiment.

FIG. 11 shows the operation menu when the operation log data and image data, both of which were recorded when the magnifications (i.e., the object lenses 23) were changed, are read by the user further clicking button 39 with the mouse in an event subsequent to the above described FIG. 10, the image according to the image data is displayed in the window 35, and then the user clicks the reproduction button 44 with the mouse, causing the reproduction point selection menu 46 to be changed over to the reproduction item selection menu 47. Note that the image displayed in the window 35 in this event is an image picked up with a high magnification ratio object lens 23, and the field scope in this case is the scope of the dotted line box indicated in the window 35 shown in FIG. 10.

In the reproduction item selection menu 47 in this event, when the user selects the XY button 47a and magnification button 47c by clicking them with the mouse and when she/he clicks the reproduction button 44 again with the mouse, the host system 2 instructs the microscope controller 31 so as to reproduce the state of the XY coordinate of the motorized stage 20 and the state of the object lens 23 among the content in the operation log related to the operation log data which has also been read when the image data representing the image displayed in the window 35 of FIG. 11 has been read.

Figure 12:
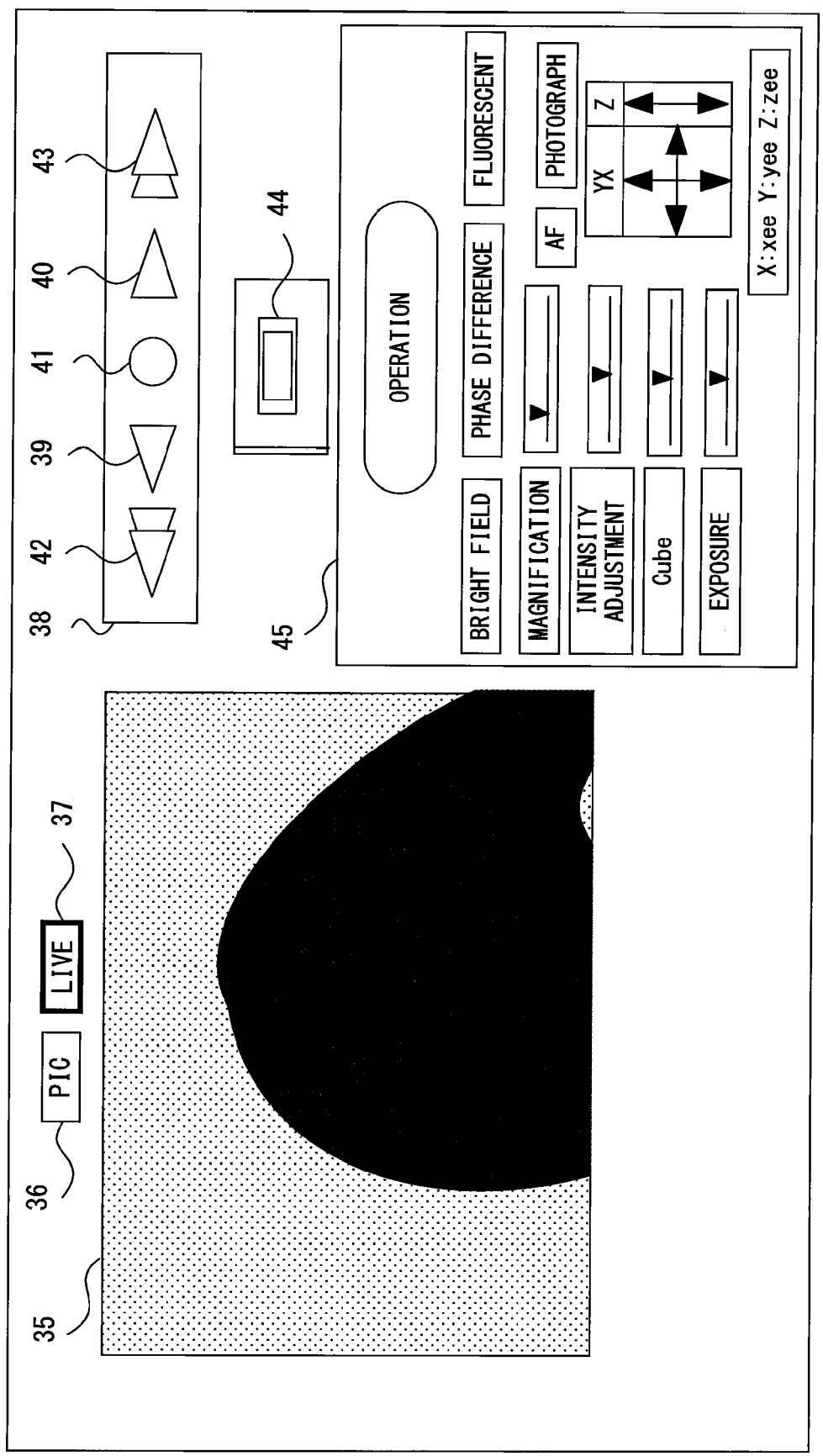
FIG. 12 is a ninth diagram showing an example of an operation menu according to the first embodiment.

When the microscope state is reproduced as such, the image displayed in the window 35 in the operation menu is changed over to a live image and also the reproduction item selection menu 47 is changed over to the microscope operation menu 45 as shown in FIG. 12 so that a continuation of the observation is enabled.

Figure 13:
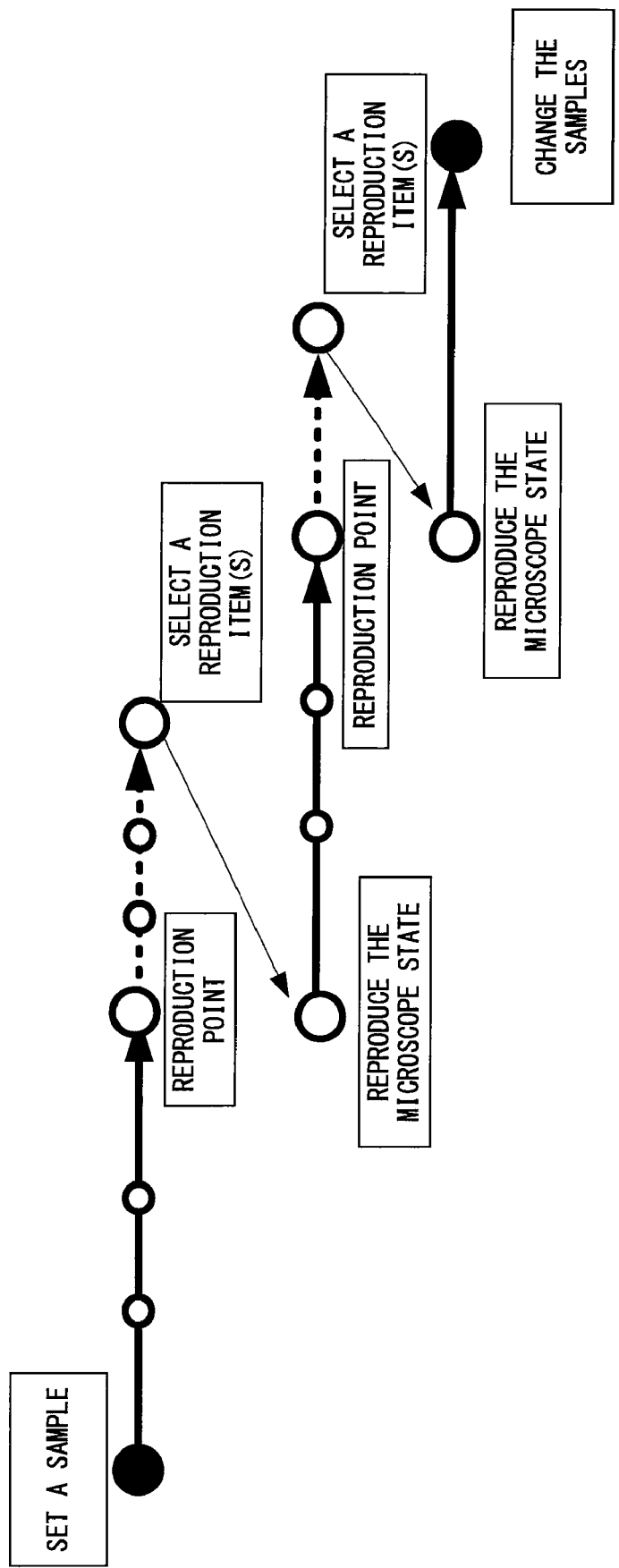
FIG. 13 is a diagram showing an exemplary operation carried out by an execution of the flow shown in FIGS. 2A and 2B.

The performing of the operation of such a process flow shown in FIG. 2 makes it possible to reproduce (i.e. restore) the microscope state to the state of a desired position by carrying out the designation of a condition for operation log data to be read from the operation history record unit 4 and the selection of reproduction item(s) if the microscope state is desired to be reproduced so as to be the state of a desired position during a screening between the setting of the sample 19 and the replacement thereof as shown in FIG. 13. What is also enabled is that such a reproduction can be carried out as many times as desired during the screening.

Note that, in the present process flow, the reproduction point selection menu 46 or reproduction item selection menu 47 is displayed by changing over between the menus; alternatively, it is also possible to display these selection menus in separate windows.

Figure 14:
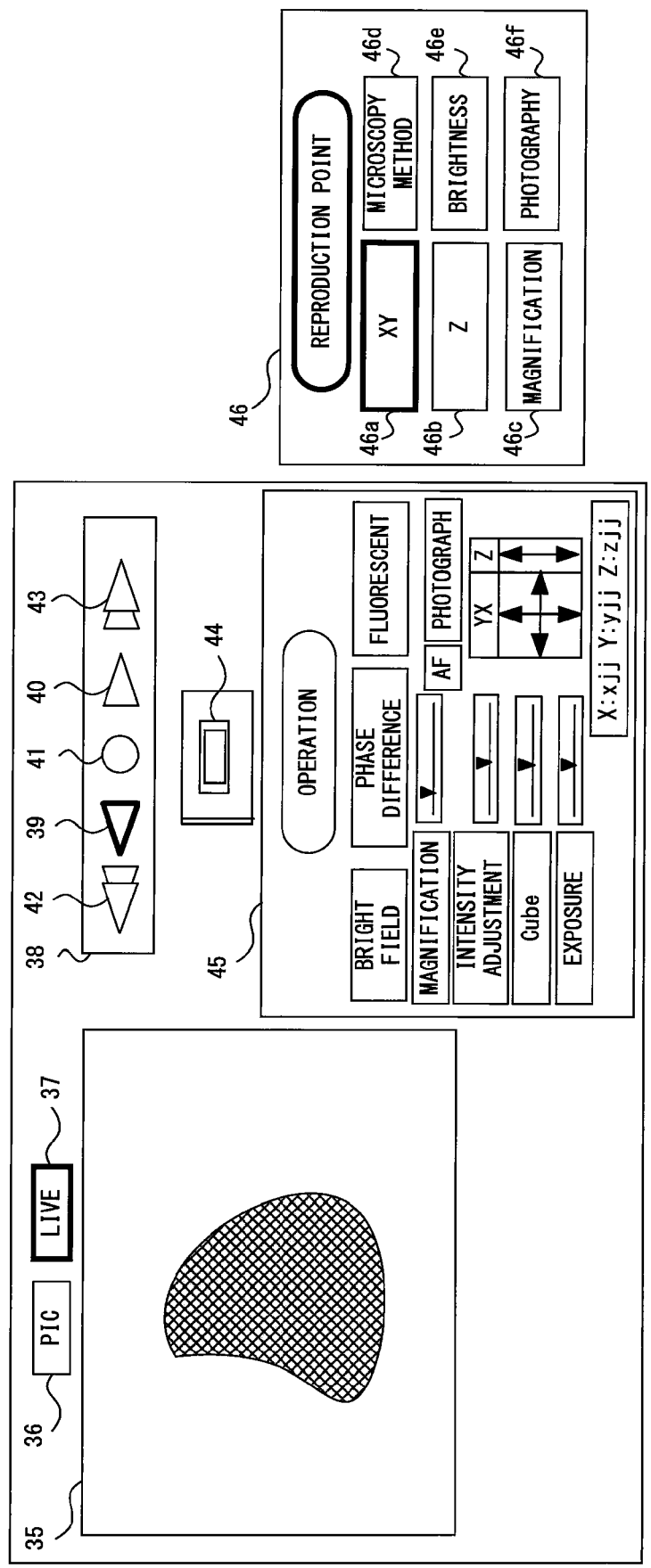
FIG. 14 is a first diagram showing another example of an operation menu according to the first embodiment.

FIG. 14 is a diagram showing an exemplary case of displaying the reproduction point selection menu 46 as a separate window. In this example, the operation menu including the window 35, microscope operation menu 45, et cetera, and the reproduction point selection menu 46 are displayed in the same screen. Note that a live image (i.e., an observation image) is displayed in the window 35 in this event, and therefore the state of the currently performed microscope operation is displayed in the microscope operation menu 45.

Figure 15:
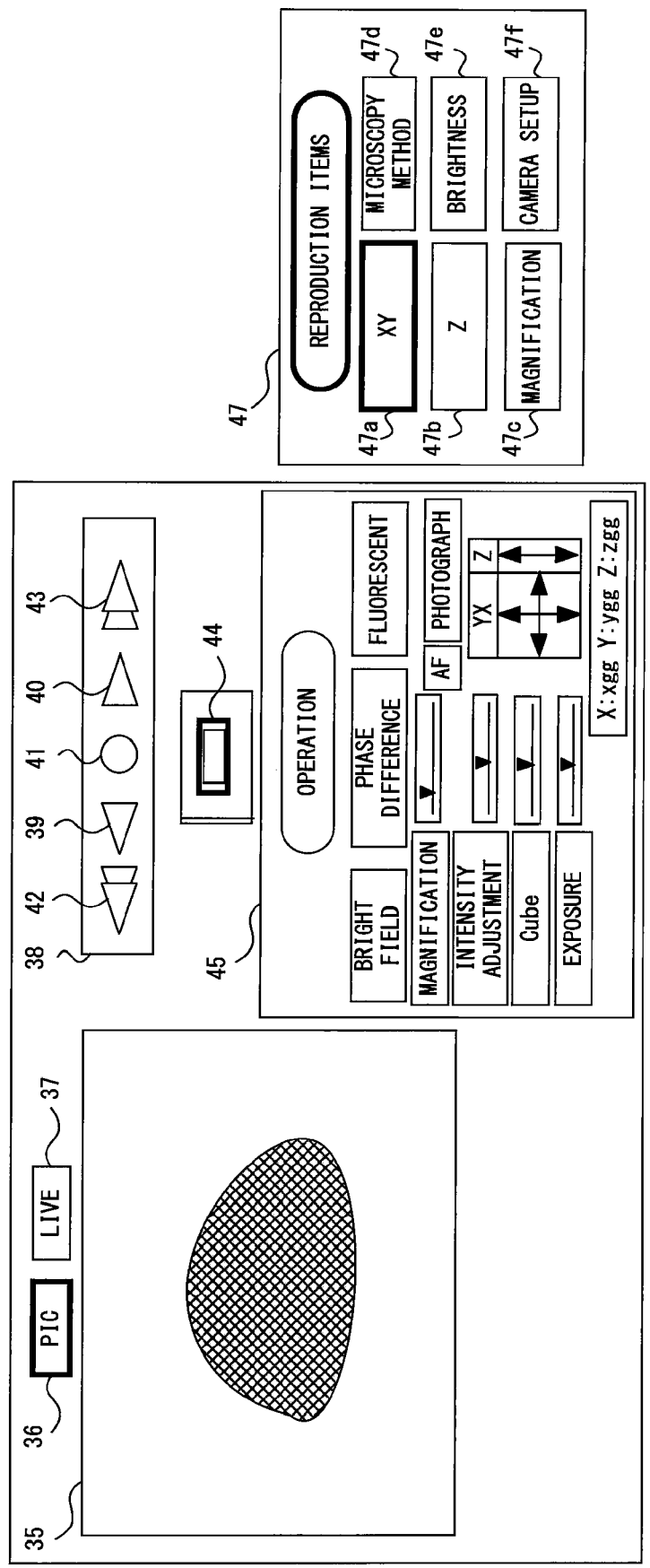
FIG. 15 is a second diagram showing another example of an operation menu according to the first embodiment.

FIG. 15 is a diagram showing an exemplary case of displaying the reproduction item selection menu 47 as a separate window. In this example, the reproduction item selection menu 47 and the operation menu including the window 35 and the microscope operation menu 45 are displayed on the same screen. Note that a still image (i.e., a photographed image) is displayed in the window 35 in this event, and therefore the microscope state indicated by the content of the operation log correlated with the still image is displayed in the microscope operation menu 45. As such, the microscope state indicated by the content of the operation log that is correlated with the still image displayed in the window 35 is displayed in the reproduction item selection menu 47, and thereby the user is also enabled to make a judgment while validating the content when the microscope state is reproduced.

As described above, the microscope system according to the present embodiment is configured to record, as a log, the microscope operations carried out during a screening of the sample 19, thereby making it possible to easily search for the point for which the state is to be reproduced and to easily reproduce the state of the microscope apparatus 1 by further selecting the reproduction item(s), and therefore the time required for the work to record the detailed observation data can be shortened and the load on the user can be lightened a significant amount. The microscope system further enables the user to restore the microscope state to the original safely and securely if a failure occurs even when a complex microscope operation is required.

Note that the present embodiment is configured to obtain an operation of the microscope as an operation log and also to photograph an image of the sample 19 and record the operation log data related to the operation log and the image data representing the image in the operation history record unit 4 by correlating both pieces of data every time the microscope is operated, as shown in S103 through S126 in FIG. 2. An alternative configuration, however, could be such that, the image of the sample 19 is not photographed, only the operation is obtained as an operation log so that only the operation log data related to the operation log is recorded in the operation history record unit 4.

Further, the present embodiment is configured such that the microscope information obtained as an operation log is the microscope information of the microscope apparatus 1, including the coordinate data of the sample 19 (i.e., the motorized stage 20), the information of the selected (i.e., inserted into the light path) object lens 23, the information of an intensity adjustment value, and the information related to the microscopy method. However, these are arbitrary and, for example, other pieces of information related to a filter, aperture stop, and the video camera 3 and the like data may be included.

Further, the present embodiment is configured to set an obtainment condition flag in accordance with the state of the motorized stage 20, the state of an object lens 23, the state of a microscopy method, the state of the brightness of a light source, and the photographing instruction given by the user. They are, however, arbitrary, and it is alternatively possible to set an obtainment condition flag in accordance with other states of the microscope or a condition made by combining them.

Further, the present embodiment may be alternatively configured to preset a button(s) to be selected in the reproduction point selection menu 46 and a button(s) to be selected in the reproduction item selection menu 47, with these menus, i.e., the reproduction point selection menu 46 and reproduction item selection menu 47, being turned off during normal operation and turned on when required, such as when changing the settings.

Second Embodiment

Next is a description of a second preferred embodiment of the present invention.

A microscope system according to the present embodiment is configured in the same manner as the microscope system according to the first embodiment, with a portion of the operation being different therefrom. Therefore, the operation according to the present embodiment is mainly described here.

Figure 16A:
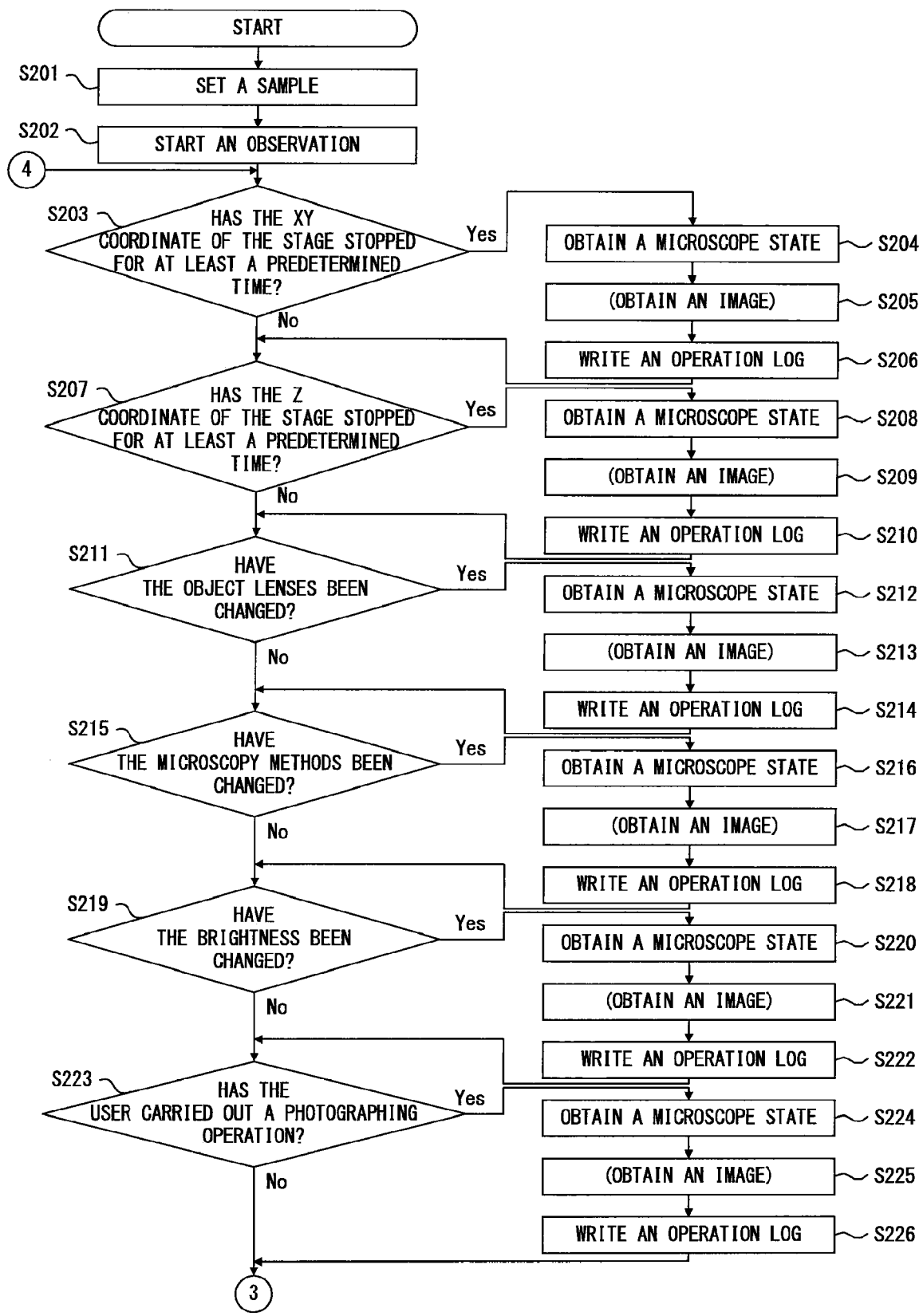
FIG. 16A is a first flow chart showing the process content of the observation of a sample and the restoring operation (i.e., the reproducing operation) of a microscope state, both of which are performed by a host system according to a second preferred embodiment.
Figure 16B:
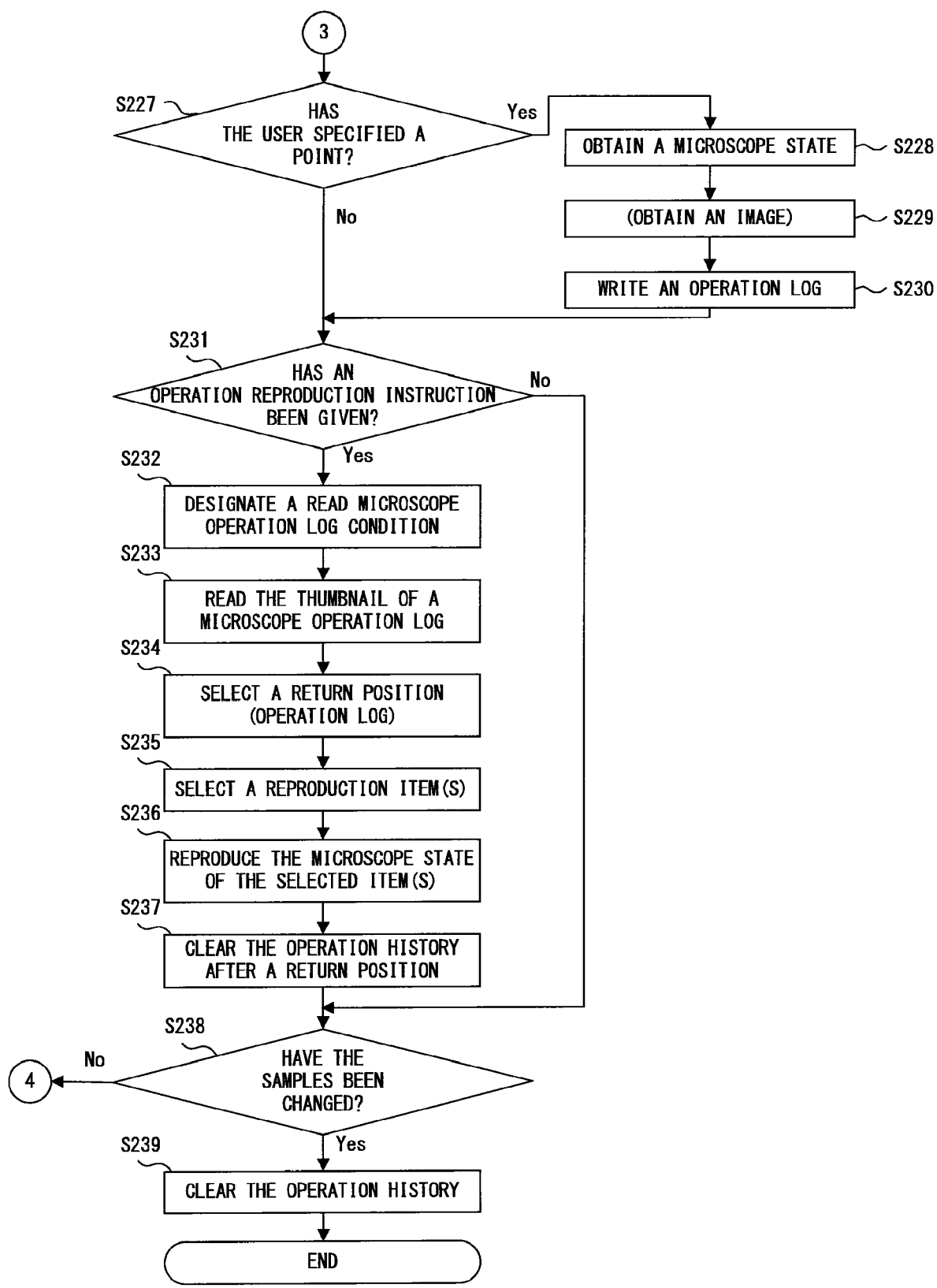
FIG. 16B is a second flow chart showing the process content of the observation of a sample and the restoring operation (i.e., the reproducing operation) of a microscope state, both of which are performed by a host system according to a second preferred embodiment.

FIGS. 16A and 16B are flow charts showing the process content of the observation of a sample 19 and the restoring operation (i.e., the reproducing operation) of a microscope state, both of which are performed by the host system 2 according to the present embodiment. This process is attained, and started, by the CPU of the host system 2 executing a prescribed control program.

Note that in the present embodiment it is assumed that the screening path for the sample 19 is the same as what is shown in FIG. 3; that the observation of the sample 19 is carried out in a transmissive bright field observation method in the screening path; and that the area indicated by the dotted line box in FIG. 3 is the scope of a field provided by a low-magnification ratio object lens 23a selected for the screening. It is further assumed that the action of the motorized stage 20 is stopped for at least a predetermined period at respective points b through j for detailed observations in the screening path and that the image of sample 19 has been photographed by the user at each of the points c, d and i.

As shown in FIG. 16A, in steps S201 through S202, the same operation is carried out as in S101 and S102, which are shown in FIG. 2A, and therefore the description is not provided here.

When a screening is started with a completion of S202, the host system 2 judges whether or not there has been a change in the microscope state. If a change has occurred, the host system 2 obtains the microscope state at the present time as an operation log (i.e., as an example of a microscope operation history), and also obtains an image of the sample 19 with a video camera and stores the microscope state and image in the operation history record unit 4 by correlating both pieces of information (S203 through S230).

Note that, also in the present embodiment, a microscope state obtained as an operation log is the microscope information of the microscope apparatus 1, including the coordinate data of the sample 19 obtained from the motorized stage 20 (i.e., the coordinate data of the motorized stage 20), the information of the selected (i.e., inserted into the light path) object lens 23, the information of an intensity adjustment value that is the brightness of the light source in use (i.e., the transmissive illumination-use light source 6 in this case), and the information related to a microscopy method, all of which are obtained by the host system 2 by way of the microscope controller 31. Further, an obtainment condition flag indicating under what condition (i.e., what kind of change in the microscope state) the present operation log has been obtained is added to the operation log. Further, when the operation log and the image of the sample 19 are recorded by correlating both data, the operation log and the image of the sample 19 are synchronously recorded.

In the present embodiment, however, the image of the sample 19 to be obtained includes the original image of the sample 19 and its thumbnail image. Note that the thumbnail image can be generated by the host system 2 on the basis of the original image of the sample 19.

Describing the above noted steps S203 through S230 in greater detail, first, the images of the sample 19 obtained in S205, S209, S213, S217, S221 and S225 include the original image and thumbnail image of the sample 19 in steps S203 through S226, and except for this, the same operations are performed as in steps S101 through S126 shown in FIG. 2A, and therefore the description is not provided here.

If the judgment result of S223 is "no", or when S226 is completed, then whether or not a designated reproduction point has been set by the user is judged (S227). If the judgment result is "yes", the microscope state at the present time is obtained as an operation log, and then a flag F_7 indicating that a designated reproduction point has been set by the user is added to the operation log as an obtainment condition flag (S228) and an image of the sample 19 is obtained by using the video camera 3 (S229). Incidentally, the image of the sample 19 to be obtained here includes the original image of the sample 19 and its thumbnail image as described above. Further, the operation log data related to the operation log obtained in S228 and the image data representing the image of the sample 19 (i.e., the original image data representing the original image of the sample 19 and the thumbnail image data representing the thumbnail image of the sample 19 are included) obtained in S229 are recorded in the operation history record unit 4 by correlating both sets of data (S230).

Note that a designated reproduction point can be set by newly equipping, for example, the microscope operation menu 45 with a button, enabling a setup such that the user clicks on the button with a keyboard or mouse. Further, the set-up designated reproduction point is for making it possible to specify the designated reproduction point as one of the conditions when the conditions for operation log data to be read from the operation history record unit 4 in S232 (which is described later) are specified.

Let it be assumed that the user sets a designated reproduction point at point i (refer to FIG. 3) during a screening. In this case, the host system 2 determines that the microscope states have been changed and accordingly carries out the above described S228 through S230. That is, the host system 2, by way of the microscope controller 31, obtains as an operation log the microscope information of the microscope apparatus 1, including the coordinate data of the sample 19 obtained from the motorized stage 20 (i.e., the coordinate data of the motorized stage 20), the information of the object lens 23, the information of an intensity adjustment value, and the information related to a microscopy method, adds as an obtainment condition flag a flag F_7 indicating that the user has set the designated reproduction point to the operation log, and further obtains the image of the sample 19 (i.e., the original image and thumbnail image) at point i with the video camera 3. Then the host system 2 records the operation log data related to the operation log and the image data representing the image of the sample 19 in the operation history record unit 4 by correlating both data. In this case, the operation log data at point i, that is, microscope information including the XYZ data (i_x, i_y, i_z) of the sample, the information (i_posi) of the selected object lens 23, the information (i_bright) of an intensity adjustment value, the information (i_ccd) of a camera setup, and a flag F_7 as an obtainment condition flag (i_flag) is added to the image data (including the original-image data representing the original image and the thumbnail image data representing the thumbnail image) at point i, and thereby both sets of data are correlated and they are recorded in the operation history record unit 4 in the form allowing a read in synchronization with the image data.

After S230, or If the judgment of S227 is "no", it is judged whether or not an operation reproduction instruction has been given (S231). This judgment is made depending on whether or not button 48 (which is described later; also, refer to FIG. 17), which is newly equipped in the operation menu for the present embodiment, has been clicked on with the mouse. That is, if button 48 is mouse-clicked, the judgment result of S231 is "yes"; otherwise it is "no". Note that button 48 is disposed to enable a catalog (or list) display of the thumbnail images correlated with a desired operation log in the window 35.

If the judgment of S231 is "yes", the restoring (i.e., reproducing) operations of the microscope state (S232 through S237) are carried out. Here, the operation is described by exemplifying the case in which the judgment result of S231 is "yes" when the live image for point j (refer to FIG. 3) is displayed in the window 35 of the operation menu.

Figure 17:
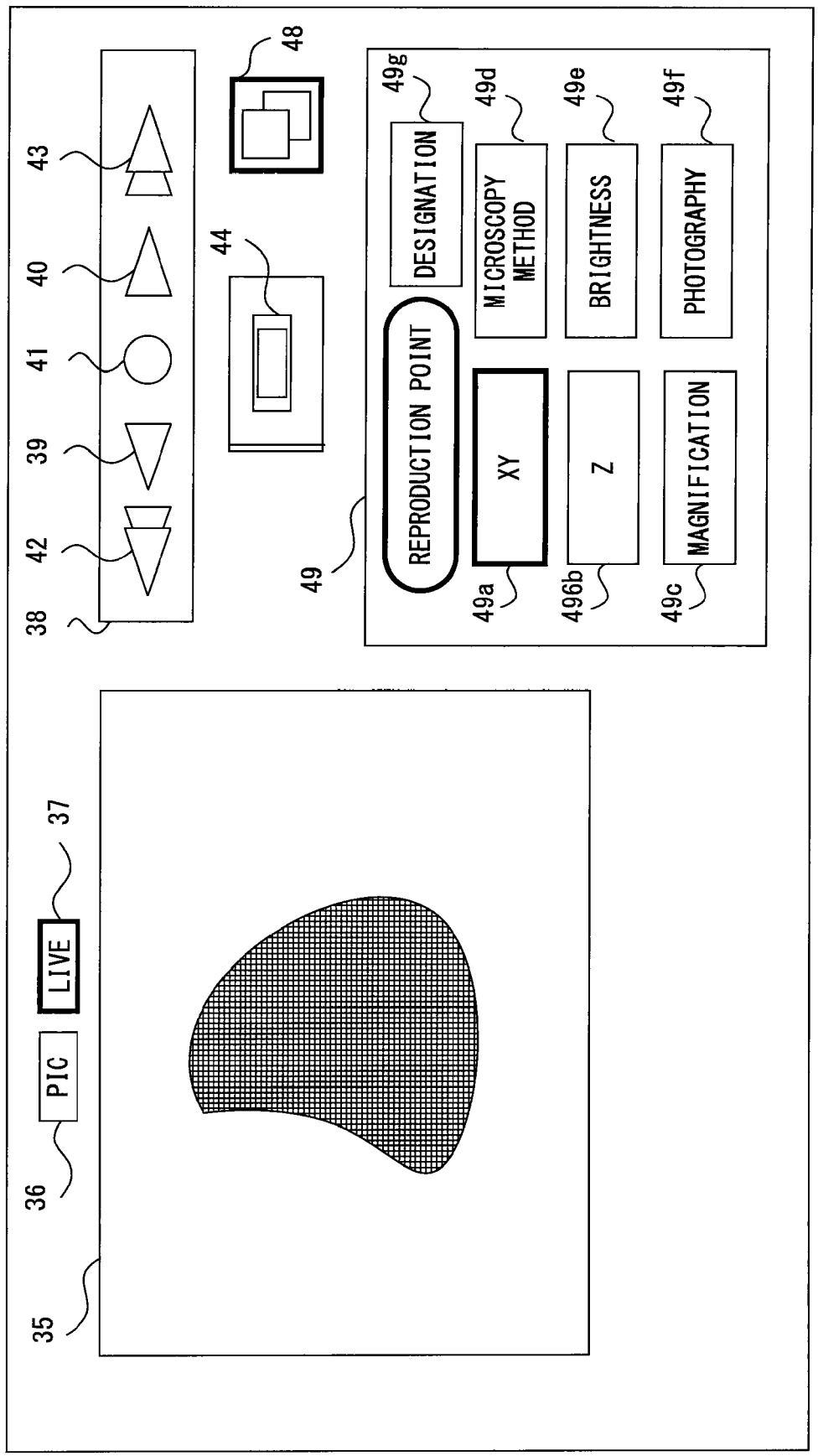
FIG. 17 is a first diagram showing an exemplary operation menu according to the second embodiment.

If the judgment result of S231 is "yes", the microscope operation menu 45 in the operation menu is changed over to a reproduction point selection menu 49 as shown in FIG. 17.

Here, the reproduction point selection menu 49 is disposed to enable the selection of a condition for specifying the operation log data to be read from the operation history record unit 4 so that the thumbnail images related to the thumbnail image data correlated with the operation log data that are read out in accordance with the selection of the condition can be displayed in the window 35 in a catalog as described later.

When the judgment result of S231 is "yes", causing the microscope operation menu 45 to be changed over to the reproduction point selection menu 49, then the condition for the operation log data to be read from the operation history record unit 4 is specified (S232), the operation log data in accordance with that condition and the thumbnail image data correlated with the present data are read from the operation history record unit 4, and the thumbnail images related to the read-out thumbnail image data are displayed in the window 35 in a catalog (S233).

Figure 18:
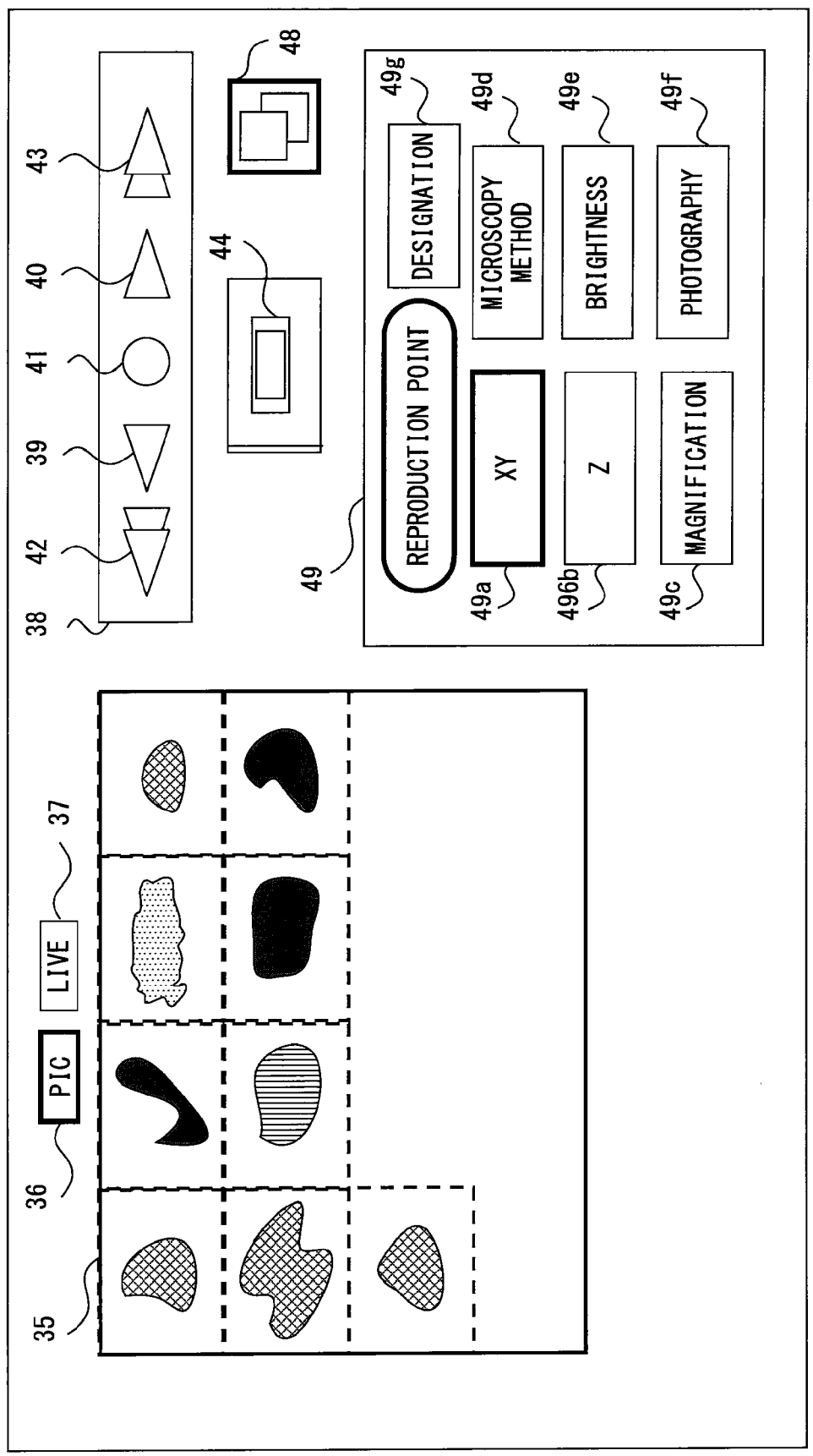
FIG. 18 is a second diagram showing an exemplary operation menu according to the second embodiment.

For example, when the XY button 49a is selected in the reproduction point selection menu 49, when the operation log data that has been recorded when the motorized stage 20 is stopped on the XY coordinate for at least a predetermined period is specified as the condition for the operation log data to be read from the operation history record unit 4, and when button 48 is mouse-clicked, then the operation log data that has been recorded when the motorized stage 20 is stopped on the XY coordinate for at least a predetermined period and the thumbnail image data correlated to the present operation log data are read from the operation history record unit 4, and the thumbnail images of the sample 19 related to the thumbnail image data are displayed in the window 35 as a catalog, as shown in FIG. 18. With this configuration, the thumbnail images of the sample 19 at respective points b through j (refer to FIG. 3) are displayed in the window 35 in a catalog, as shown in FIG. 18. Note that the still images are displayed in the window 35 in this event and therefore button 36 indicating this is turned on.

Figure 19:
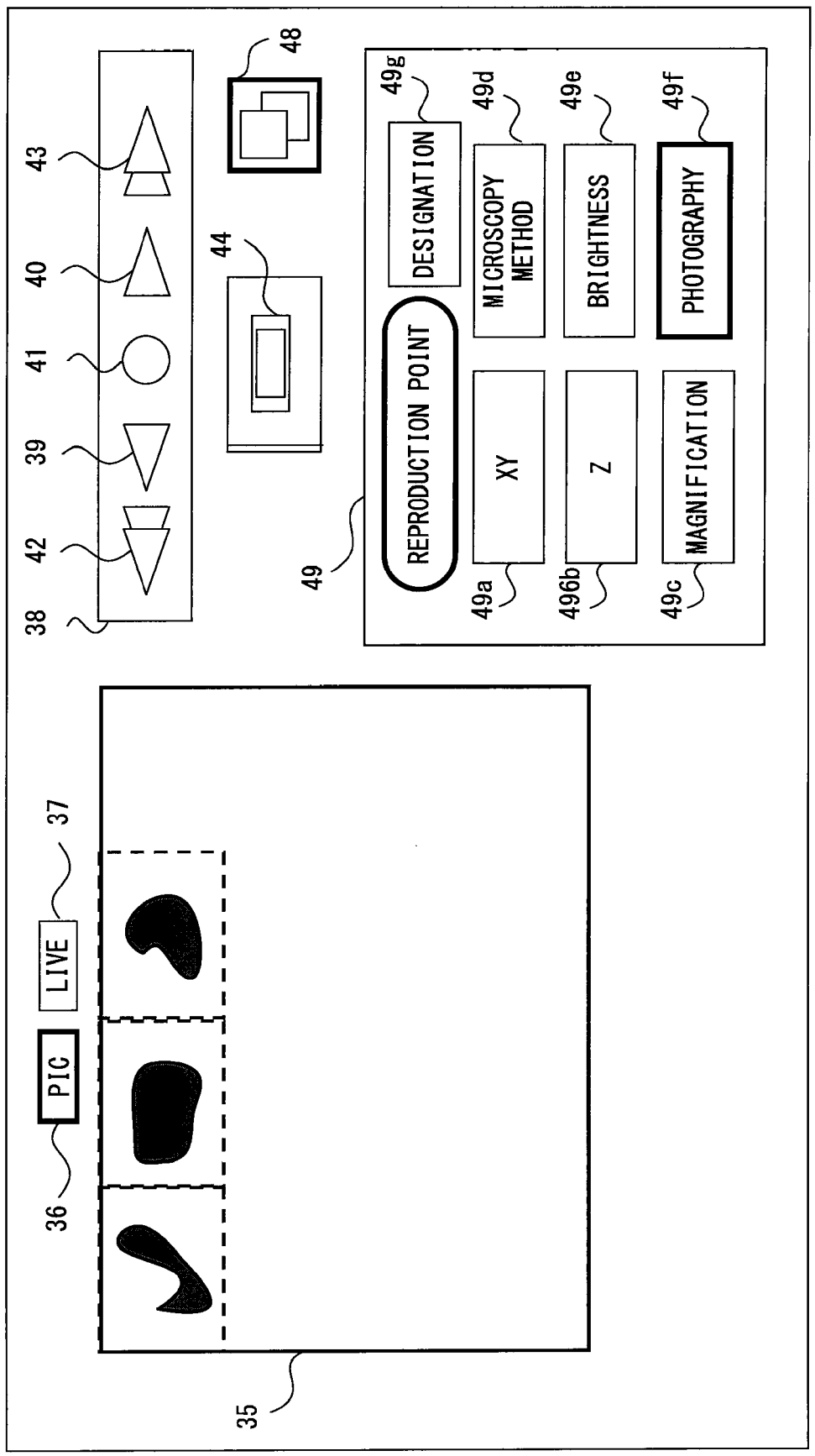
FIG. 19 is a third diagram showing an exemplary operation menu according to the second embodiment.

Further, when the photography button 49f is selected in the reproduction point selection menu 49, the operation log data that has been recorded when a photographing operation was performed by the user instructing photographing as a condition for the operation log data to be read from the operation history record unit 4 and then the button 48 is clicked with the mouse, the operation log data and the thumbnail image data correlated with the operation log data, which have been recorded when a photographing operation was performed by the user instructing photographing, are read from the operation history record unit 4 and the thumbnail images of the sample 19 related to the thumbnail image data are catalog-displayed in the window 35 as shown in FIG. 19. With this, the thumbnail images of the sample 19 at the respective points c, d and i (refer to FIG. 3) are catalog-displayed in the window 35 as shown in FIG. 19. Incidentally, a still image is displayed in the window 35 in this event and therefore the button 36 is turned on, indicating it.

When S233 is completed, then, the point for which the microscope state is to be reproduced is selected (S234). Note that the selection is made by the user clicking with the mouse the desired thumbnail image from among the thumbnail images catalog-displayed in the window 35. That is, the point at which the thumbnail image data representing the thumbnail image clicked on with the mouse has been recorded is selected as the point for which the microscope state is to be reproduced. This configuration enables the user to reproduce a microscope state in accordance with the operation log data recorded at the aforementioned point by clicking with the mouse the thumbnail image of the sample 19 related to the thumbnail image data that has been recorded at the point for which the microscope state is to be reproduced. The assumption here is that, in the window 35 shown in FIG. 19, the second thumbnail image from the left (i.e., the thumbnail image according to the thumbnail image data recorded at point d (refer to FIG. 3)) is clicked on with the mouse and that point d is selected as a point for which the microscope state is to be reproduced.

Note that when a thumbnail image is clicked on with a mouse, the operation log data correlated with the thumbnail image data representing the thumbnail image is also read out; the microscope state, however, has not been reproduced.

Figure 20:
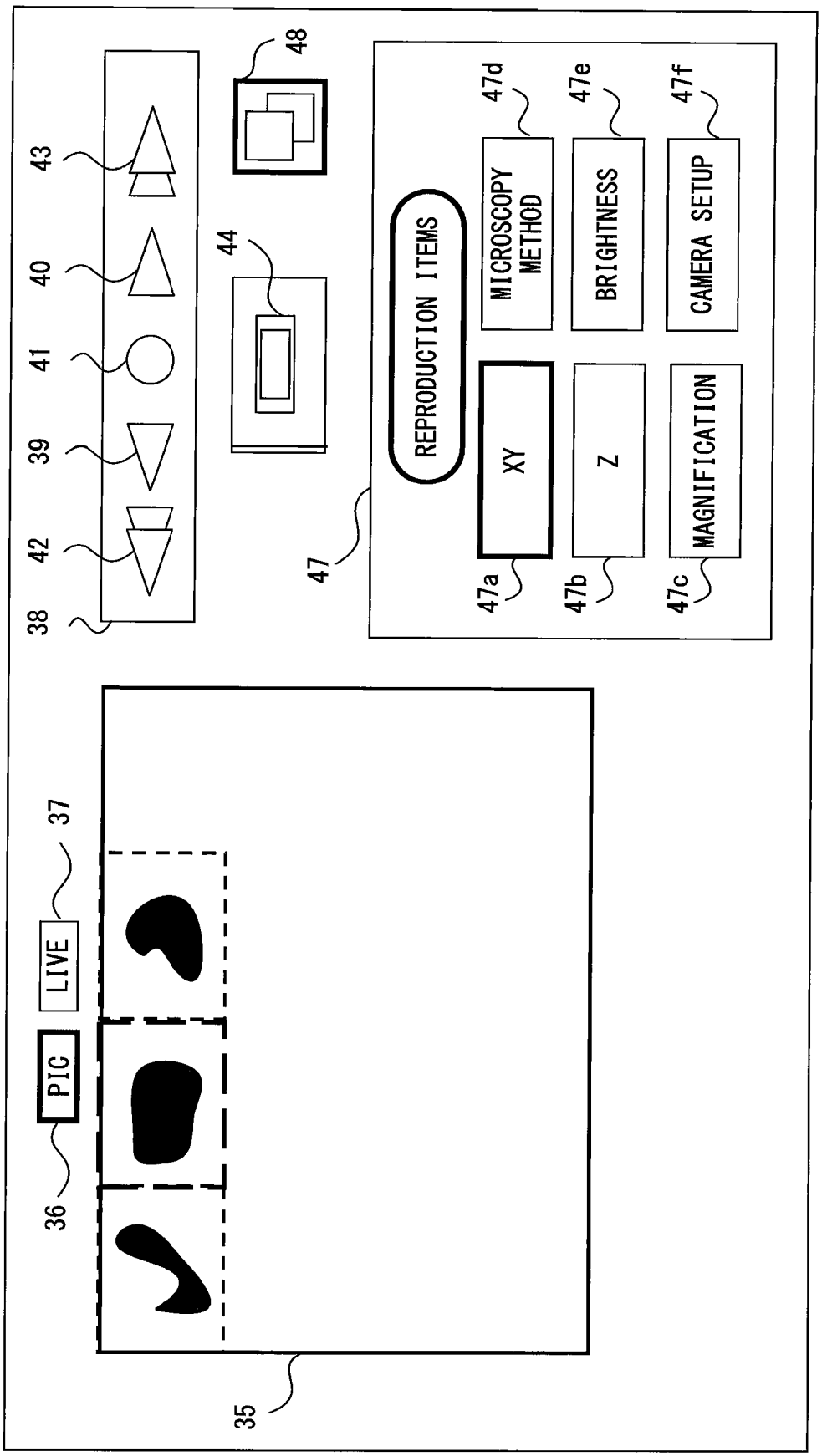
FIG. 20 is a fourth diagram showing an exemplary operation menu according to the second embodiment.

In the window 35 shown in FIG. 19, when the second thumbnail image from the left is clicked with the mouse and point d (refer to FIG. 3) is selected as a point for which the microscope state is to be reproduced, the reproduction point selection menu 49 is changed over to the reproduction item selection menu 47 as shown in FIG. 20. Note that the second thumbnail image from the left in the window 35 is mouse-clicked, and therefore a frame (i.e., the solid line box shown in FIG. 20) indicating that the thumbnail image has been mouse-clicked is displayed for the present thumbnail image.

When S234 is completed, with the reproduction point selection menu 49 being changed over to the reproduction item selection menu 47, a reproduction item in the reproduction item selection menu 47 is selected (S235). Here, the assumption is that only the state of the XY coordinate of the motorized stage 20 is to be reproduced and that the user has clicked the XY button 47a with the mouse in the reproduction item selection menu 47.

Subsequently, the microscope state is reproduced in accordance with the reproduction item selected in S235 (S236). The microscope state, however, is reproduced by the user clicking the reproduction button 44 with the mouse. Here, since the XY button 47a in the reproduction item selection menu 47 is selected, the host system 2, by way of the microscope controller 31, instructs the stage X-Y drive control unit 21 so as to cause the XY coordinate of the motorized stage 20 to be the coordinate (d_x, d_y) so that only the XY coordinate of the motorized stage 20 is reproduced in the operation log related to the operation log data that has been recorded at point d (refer to FIG. 3) when the reproduction button 44 is clicked with the mouse.

Figure 21:
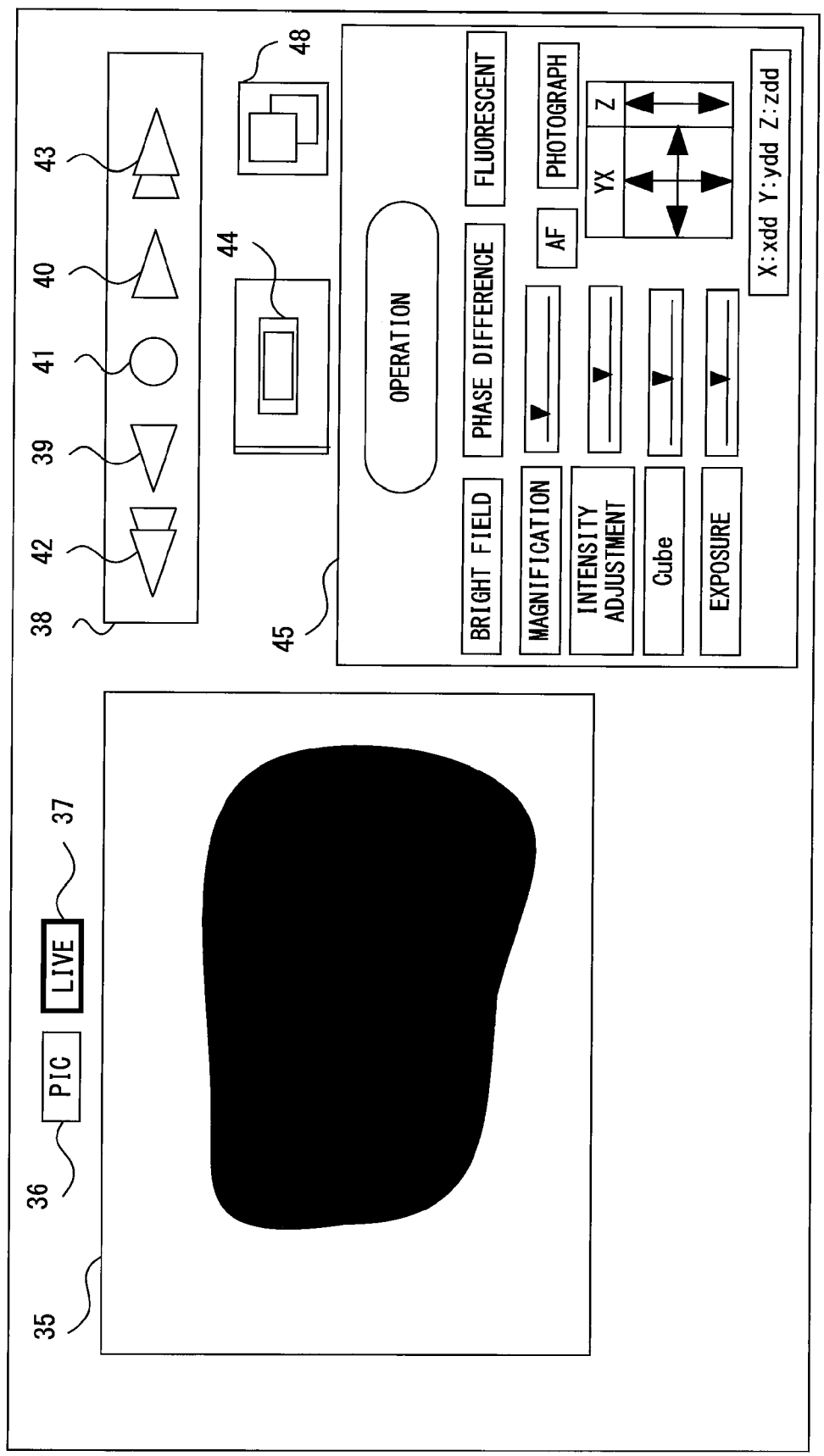
FIG. 21 is a fifth diagram showing an exemplary operation menu according to the second embodiment.

When the reproduction of the microscope state is carried out as described above, the image displayed in the window 35 in the operation menu is changed over to a live image and also the reproduction item selection menu 47 is changed over to the microscope operation menu 45. Here, when the state of the XY coordinate of the motorized stage 20 at point d (refer to FIG. 3) is actually reproduced, the image displayed in the window 35 is changed over to the live image of point d and also button 37 is turned on as shown in FIG. 21. Further, the reproduction item selection menu 47 shown in FIG. 20 is changed over to the microscope operation menu 45 as shown in FIG. 21. This makes it possible to continue an observation starting from point d once again.

When S236 is completed, then, the operation log data and image data which have been recorded in the operation history record unit 4 between the point at which the operation log data and image data are last recorded in the operation history record unit 4 and the point at which the microscope state has been reproduced in S236 are cleared (i.e., deleted) (S237). Here, the operation log data and image data in the operation history record unit 4, all of which have been recorded between point j and point d, are cleared.

In S238 through S239, which are carried out after the completion of S237 or if the judgment result of S231 is "no", the same operations are carried out as in S134 through S135 shown in FIG. 2B, and therefore the description is not provided here.

As described above, the microscope system according to the present embodiment is configured to select a desired thumbnail image from among the catalog-displayed thumbnail images, making it possible to easily search for the operation log which has been recorded during a screening and which is desired to be reproduced and, further, making it possible to easily reproduce the state of the microscope apparatus 1 by selecting a reproduction item, and therefore it is possible to shorten the time required for observation work and to lighten the load off the user. It further enables the user to recover the original microscope state safely and securely if a failure occurs even when she/he is carrying out a complex microscope operation.

Note that the present embodiment is configured to set an obtainment condition flag in accordance with the state of the motorized stage 20, the state of an object lens 23, the state of a microscopy method, the state of the brightness of a light source, a photographing instruction from the user, and the user setting of the designated reproduction point; such a configuration is arbitrary. An alternative configuration may set an obtainment condition flag on the basis of other kinds of states of the microscope or the combination of those kinds of states.

Further, the present embodiment may be alternatively configured such that respective buttons to be selected in the reproduction point selection menu 49 and reproduction item selection menu 47 are pre-set, with those buttons not being displayed in the normal condition, and such that the reproduction point selection menu 49 and reproduction item selection menu 47 are displayed only when there is a need to change the setting in these menus.

Further, the above described first and second embodiments are configured to require the user to select the reproduction item(s) in the reproduction item selection menu 47; an alternative configuration may be such that such selection can be made by the host system 2 in accordance with a prescribed condition. Further, the reproduction in accordance with the selected reproduction item may be set so that the host system 2 inhibits the reproduction in accordance with a prescribed condition.

Further, the above described first and second embodiments are configured such that the microscope apparatus 1, including a plurality of object lenses 23, changes the magnification ratios by changing over the object lenses 23 to be inserted into the light path. An alternative configuration may include an object lens having a zoom mechanism to change the magnification ratios.

In the meantime, the above described first and second embodiments are configured to adopt an upright microscope apparatus as the microscope apparatus 1; it is of course possible to adopt an inverted microscope apparatus instead, and it is also possible to adopt the microscope system according to the present embodiment to various systems such as a line apparatus that incorporates a microscope apparatus.

Further, the above described first and second embodiments have been described by exemplifying the case in which the log data and image data recorded prior to the reproduction are deleted; an alternative configuration may provide a choice between deleting and not deleting the log data and image data individually. Further, they may be configured to keep recording all pieces of data until a replacement of specimens. Furthermore, they may be configured to enable a selection between deleting and not deleting either or both of the log data and image data when the specimens are replaced.

Third Embodiment

Next is a description of a third preferred embodiment of the present invention.

A microscope system according to the present embodiment includes, as an object lens 23, a so-called correction collar-attached object lens (not shown in a drawing herein) having an aberration correction function for correcting an aberration due to the thickness of a cover glass and a control of the position of the correction collar using a microscope controller 31. Otherwise the configuration is the same as that of the microscope system according to the first embodiment and therefore a description here is concentrated on the operation of the system, while the description of the configuration is not provided.

Figure 22:
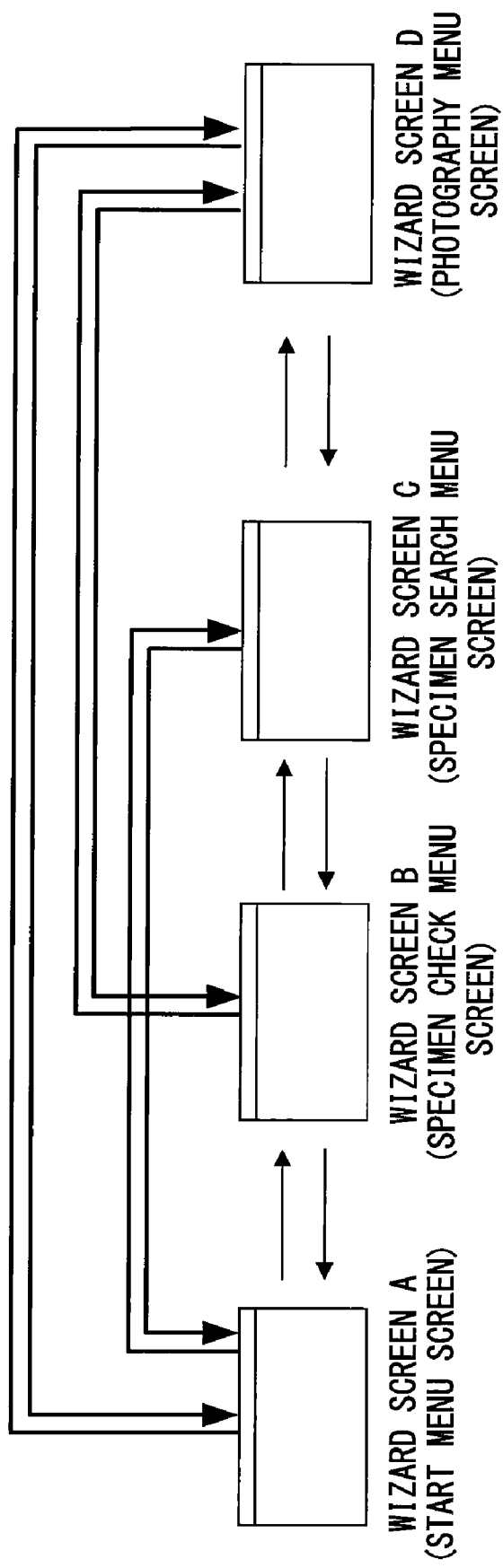
FIG. 22 is a diagram describing an outline of four wizard screens.

FIG. 22 is a diagram describing an outline of four wizard screens displayed on the monitor 5 one by one as an operation menu screen performed by the host system 2.

As shown in FIG. 22, four wizard screens are constituted by a wizard screen A that is a start menu screen, a wizard screen B that is a specimen check menu screen, a wizard screen C that is a specimen search menu screen, and a wizard screen D that is a photographing menu screen.

Each of the four wizard screens is equipped correspondingly to each respective step of a plurality of observation steps (i.e., assuming four according to the present embodiment) of a microscopic observation so that the user uses them by sequentially changing over the wizard screens in accordance with the observation step. Note that the wizard screen can be changed over from any one of them to any one of the remaining three wizard screen as indicated by the arrows in FIG. 22.

In order to enable the acceptance of only the setting and operation that are required for the corresponding step, each wizard screen is correlated with a unit(s) allowing or disallowing setting and operation to be performed, inhibiting the user from inadvertently carrying-out unnecessary processes of setting or operation. The configuration is further such that the setting and operation accepted in each wizard screen are recorded in the operation history record unit 4 as history data.

Next is a description, in detail, of each of the four wizard screens.

Figure 23:
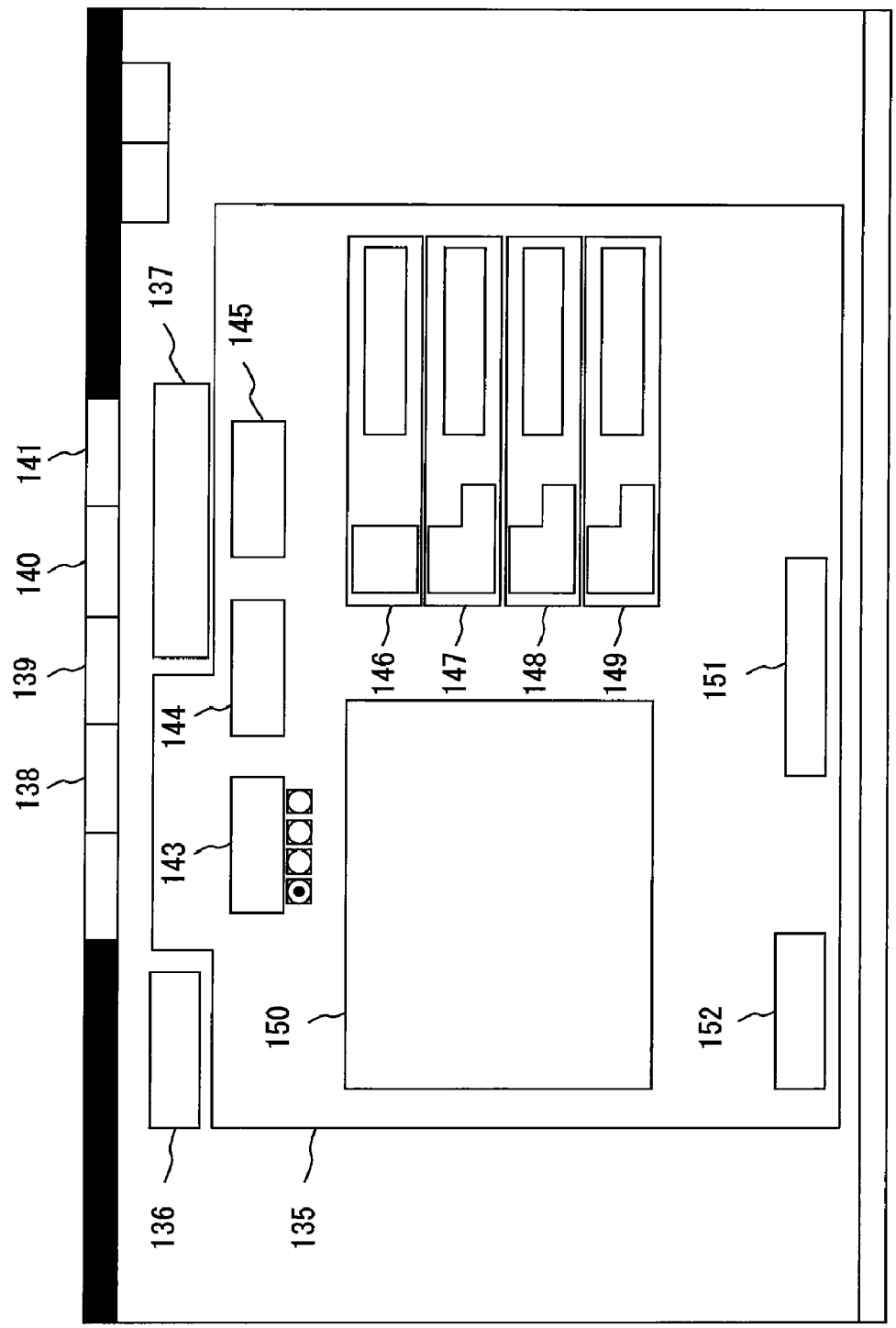
FIG. 23 is a diagram showing exemplary wizard screen A.

FIG. 23 is a diagram showing an exemplary wizard screen A.

The wizard screen A shown in FIG. 23 is a start menu screen (i.e., a photography course selection menu screen) that constitutes the first operation menu screen for starting an observation.

In this wizard screen A, the user is enabled to carry out a setting (replacing) work for a specimen (i.e. a slide glass) 19 to be observed, the selection of a microscopy method (i.e., a bright field observation, a differential interference observation, a fluorescent observation, et cetera) to be used for the observation, the selection of an optical element(s) (i.e., an object lens 23, cube, et cetera) to be used, the setting of a photography image size, and the like.

In wizard screen A, a specimen changeover button 136 is a button for sending an instruction to replace the specimen 19. Pressing (e.g., clicking with a mouse) this button causes the host system 2 to send an instruction to the motorized stage 20 by way of the microscope controller 31 and move the motorized stage 20 to a stage position coordinate (i.e., specimen replacement position coordinate) for replacing the specimen 19. Note that after setting the specimen 19, it is also possible to move the motorized stage 20 so as to set the position of the specimen 19 at a center stage position coordinate (i.e., an observation start default coordinate) via the user carrying out a prescribed operation (e.g., re-pressing the specimen changeover button 136) for wizard screen A.

Area 135 is the main area of wizard screen A. Buttons 143 through 145 within area 135 are respectively microscopy method selection buttons, with button 143 being a fluorescent observation selection button, button 144 being a differential interference observation selection button, and button 145 being a bright field observation selection button. Buttons 146 through 149 are respectively photography method selection buttons, with, for example, button 146 being a button for selecting a common photography, button 147 being a button for selecting a Z stack photography, and button 148 being a button for selecting a time lapse photography. Meanwhile, button 151 is a button for shifting the screen to wizard screen B corresponding to the next observation step, while button 152 is for returning to a wizard screen that had been selected prior to shifting to wizard screen A. If the present wizard screen A has been shifted from wizard screen D, the pressing of button 152 (e.g., clicking the button with a mouse) returns it to wizard screen D. Area 150 is an area for displaying various explanations.

Area 137 is an area for selecting, adding, and replacing (i.e., physically replacing) an optical element to be used. The user is enabled to set a cube to be used for an observation in the selected microscopy method, or a similar setting, by way of area 137. That is, the user is enabled to set, from among various optical elements that can be driven in the microscope apparatus 1, only an optical element related to the microscopy method selected in wizard screen A.

Buttons 138 through 141 are buttons for respectively shifting the screen directly to other wizard screens, with button 138 being a button for shifting the screen to wizard screen A, button 139 being for shifting it to wizard screen B, button 140 being for shifting it to wizard screen C, and button 141 being for shifting it to wizard screen D. However, if the button for shifting the screen to the same wizard screen as the wizard screen presently displayed on the monitor 5 is pressed (e.g., clicked with a mouse), the wizard screen will not be shifted.

Note that buttons 138 through 141 are equipped in wizard screens B, C and D (which are described later).

Meanwhile, an image size can also be set in wizard screen A when a photograph is taken with the video camera.

As described above, the setting and operation that are enabled for the user in wizard screen A are limited to the following purposes: sending an instruction to move the motorized stage 20 in order to replace the specimen 19, selecting a photography course (i.e., a microscopy method), replacing the optical elements, and setting a photography image size, while the setting or operation of other units cannot be carried out in wizard screen A.

Figure 24:
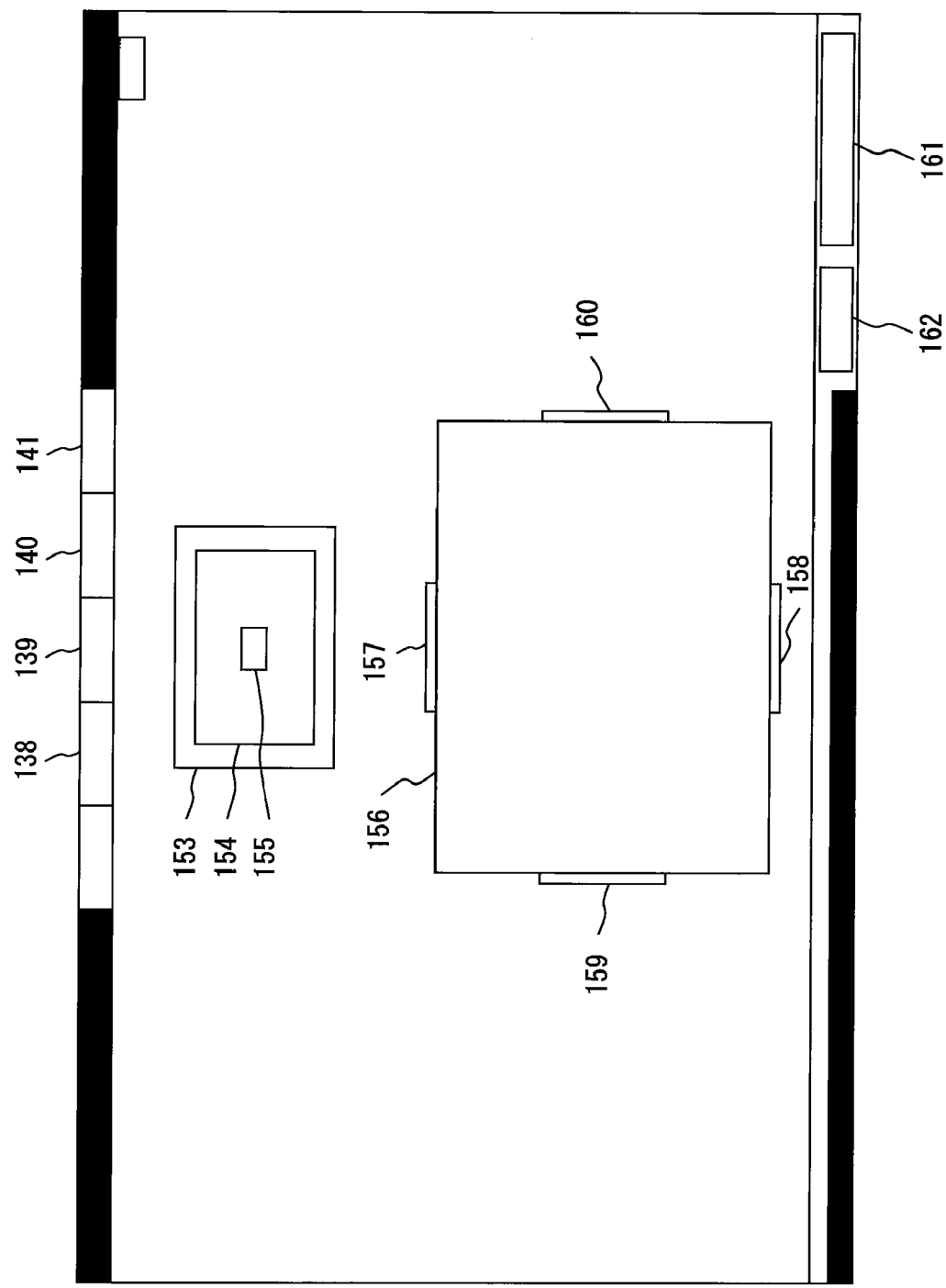
FIG. 24 is a diagram showing exemplary wizard screen B.

FIG. 24 is a diagram showing an exemplary wizard screen B.

The wizard screen B shown in FIG. 24 is a specimen check menu screen that constitutes an operation menu screen for searching for the initial observation start position in a macro image (i.e., a photographed image with a low magnification ratio object lens) and for performing an auto focus (AF) operation (i.e., a focusing operation) in the macro image.

In this wizard screen B, the range of area 154 indicated by a rectangle in a slide image area 153 represents the operable scope of the motorized stage 20 relative to the overall slide glass that is the specimen 19.

A macro image display area 156 is an area in which a macro image that is the live image of the specimen 19 to be photographed in real time by the video camera 3 is displayed. Note that when wizard screen B is displayed on the monitor 5, the object lens to be used is fixed as a low magnification ratio (i.e., a 4× (i.e., 4-times) object lens in this case). Further, the macro image displayed in the macro image display area 156 is basically a macro image photographed under the microscopy method selected in wizard screen A shown in FIG. 23; if the microscopy method selected in wizard screen A is a fluorescent observation, the microscopy method is changed over to a differential interference observation in wizard screen B in order to prevent a discoloration of the observation object in the specimen 19 and therefore the macro image photographed under the differential interference observation is displayed. Meanwhile, in the slide image area 153, the scope corresponding to the macro image displayed in the macro image display area 156 is shown as a rectangular frame 155.

The periphery of the macro image display area 156 is equipped with buttons 157 through 160 that are used for moving the specimen 19 in four directions. When the user presses (e.g., clicks with a mouse) any of buttons 157 through 160, the motorized stage 20 is moved in a direction corresponding to the pressed button, moving the specimen 19 in that direction. Therefore, the user is enabled to select an initial observation start position, where the observation target of the specimen 19 exists, by pressing any of buttons 157 through 160 while confirming the display content of the slide image area 153 and macro image display area 156. Further, after the initial observation start position is selected, an AF operation can be carried out by the user pressing (e.g., clicking with the mouse) a button 161, making it possible to determined a focusing coordinate (i.e., Z coordinate) in the macro image. Note that, if a fluorescent observation has been selected in wizard screen A, the microscopy method is temporarily changed over to a differential interference observation as described above and a macro image photographed under the differential interference observation is displayed in the macro image display area 156, and therefore the above described selection of the initial observation start position and the determination of the focusing position in the macro image will both be carried out for the macro image photographed under the differential interference observation.

Further, button 161 is also a button for shifting the screen to wizard screen C corresponding to the next observation step in addition to executing the above described AF operation. That is, the user pressing button 161 executes the above described AF operation and then shifts the screen to wizard screen C. Button 162 is also a button for returning to a wizard screen that had been selected prior to shifting wizard screen B.

As described above, the setting and operation that are enabled for the user in wizard screen B are limited to those that are for selecting the initial observation start position where the observation target in the specimen 19 exists, and for carrying out an AF operation in the macro image. Note that when wizard screen A is replaced with wizard screen B, the changeover to the microscopy method selected in wizard screen A is automatically carried out. If a fluorescent observation has been selected as a microscopy method, the changeover to a differential interference observation is carried out as described above. In the changeover of microscopy methods, settings of the object lens 23 and other are set to a default value in accordance with the microscopy method to be changed over to.

FIG. 25 is a diagram showing an exemplary wizard screen C.

The wizard screen C shown in FIG. 25 is a specimen search menu screen that constitutes an operation menu screen for selecting the search for a photographing position and for a photographing magnification ratio of the specimen 19.

In this wizard screen C, a macro live image area 163 is an area in which a macro image that is the live image of the specimen 19 to be photographed in real time by the video camera 3 is displayed. In the macro live image area 163, the user is enabled to search for a photography target position and select a photography scope of the specimen 19. Note also that when wizard screen C is displayed on the monitor 5, an object lens 23 to be used is fixed as a low magnification ratio (i.e., a 4× object lens in this case), as in the case of wizard screen B.

A scope designation frame 164 is for indicating the photography scope by the video camera 3 in wizard screen D corresponding to the next observation step, indicated with a rectangle. That is, the scope indicated by the scope designation frame 164 is the scope corresponding to the field scope provided by the object lens 23 to be used when photographing in the next wizard screen D. Further, the scope designation frame 164 can be moved within the scope of the macro live image area 163 by the user carrying out a drag & drop operation with a mouse.

A scope designation frame changeover area 167 is used for changing the size (i.e., the photographing magnification ratio) of the scope designation frame 164, making it possible to change the size (i.e., the photographing magnification ratio) of the scope designation frame changeover area 167 (it is assumed to allow a change in the range of 20× and 60× (i.e., between 20 and 60 times)), by the user moving the slider 167a left and right.

A slide area 165 is an area indicating the position of the macro live image area 163 relative to the overall slide glass that is the specimen 19, with a cross mark 166 indicating the position corresponding to the center of the macro image displayed in the macro live image area 163.

A tool area 169 is used for adjusting the brightness of the macro image displayed in the macro live image area 163.

A focus area 168 is used for adjusting the focus of the macro image displayed in the macro live image area 163 so that an instruction to move the motorized stage 20 in the light axis direction (i.e., the Z direction) is given by the user moving a slide bar 168a up and down, making it possible to change the focus positions. Note that the instruction to move the motorized stage 20 in a direction orthogonal to the light axis direction (i.e., the XY direction) can be performed by the user carrying out a drag & drop operation with the mouse in the macro live image area 163, thereby performing a scrolling operation of the macro image.

Button 170 is a button for shifting the screen to a wizard screen D corresponding to the next observation step in order to photograph the scope designated by the scope designation frame 164. Button 171 is a button for shifting it to a wizard screen that had been displayed prior to shifting to wizard screen C.

As described above, the setting and operation that are enabled for the user in wizard screen C are limited to those that are for searching for the photographing position of the specimen 19 and selecting a photographing magnification ratio.

Figure 26:
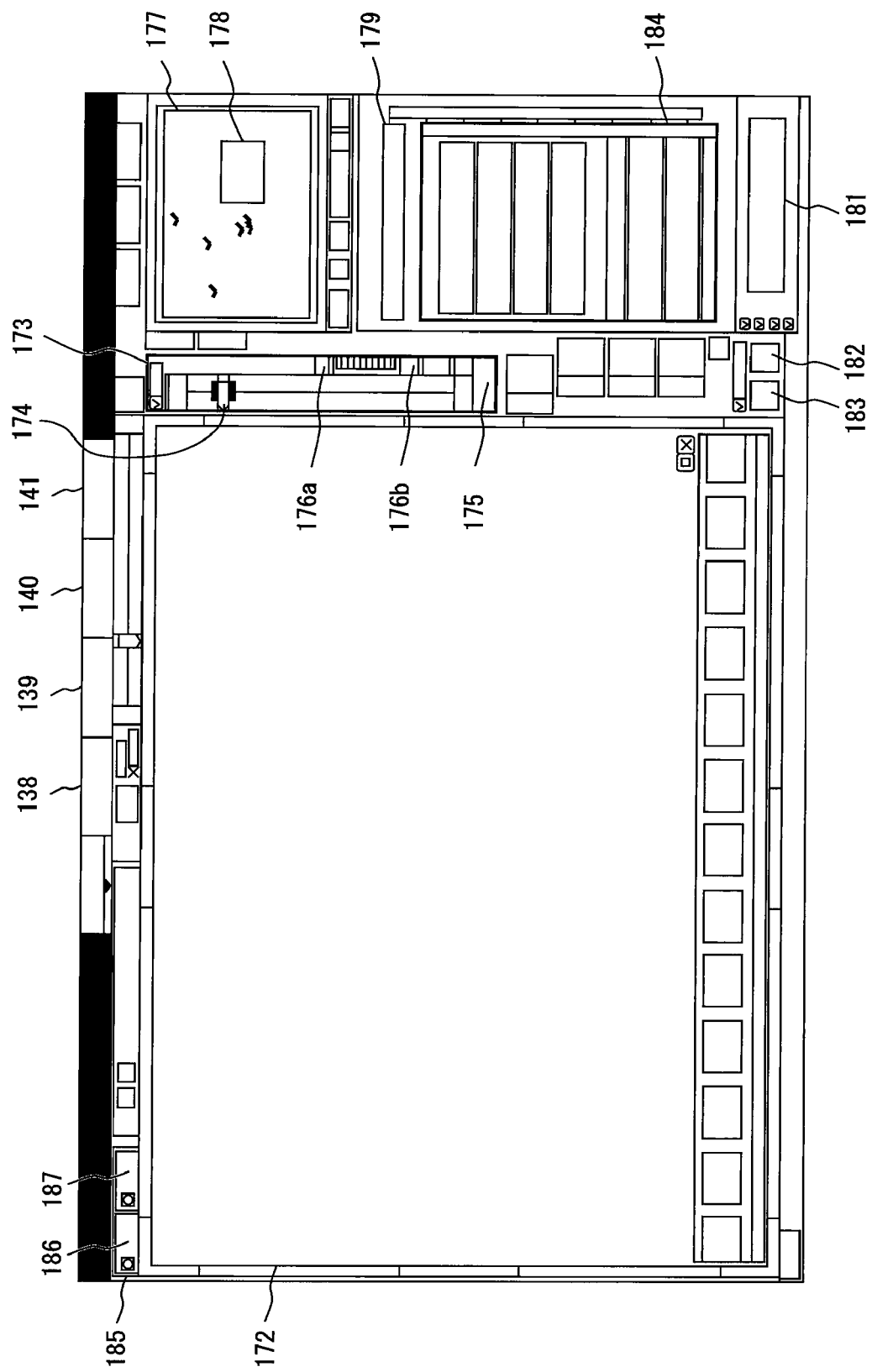
FIG. 26 is a diagram showing exemplary wizard screen D.

FIG. 26 is a diagram showing an exemplary wizard screen D.

The wizard screen D shown in FIG. 26 is a photography menu screen that constitutes an operation menu screen for photographing the scope designated by the scope designation frame 164 of wizard screen C.

In this wizard screen D, an image display area 172 is an area for displaying a live image that the specimen 19 in the scope specified by the scope designation frame 164 of wizard screen C is photographed with the video camera 3 in real time, or a paused image that the specimen 19 in the scope is photographed with the video camera 3. In the image display area 172, the user specifying a position within the image display area 172 (e.g., double-clicking the position with the mouse) when a live image is displayed makes it possible to move the motorized stage 20 so that the specified position becomes the center of the image display area 172. Therefore, it also enables the user to instruct the movement of the motorized stage 20 in order to adjust a photographing position using the image display area 172.

A display image changeover area 185 is an area for changing an image to be displayed in the image display area 172 to a live image that is a real time image, or to a paused image that is a photographed image. Button 186 within the display image changeover area 185 is used for changing an image to be displayed in the image display area 172 over to a live image, while button 187 is used for changing an image to be displayed in the image display area 172 over to a paused image.

A focus-correction collar area 173 is used for carrying out the focusing and AF operation for the image displayed in the image display area 172. In the focus-correction collar area 173, a slide bar 174 is used for adjusting focus. Note that the slide bar 174 enables the user to send instructions to move the motorized stage 20 in the optical axis direction (i.e., the Z direction) by moving the slide bar 174 up or down, making it possible to change the focus position, as with the slide bar 168a in wizard screen C. An AF button 175 is used for carrying out an AF operation (i.e., a focusing operation). Meanwhile, correction collar adjustment buttons 176a and 176b are used for sending instructions to drive the correction collar in order to correct an aberration due to the thickness of the cover glass.

A stage control-map area 177 is an area for displaying the display scope of the image display area 172 and the image of the surrounding area, and also for enabling the scrolling of the image displayed in the present area 177. Incidentally, in the stage control-map area 177, the display scope of the image display area 172 is indicated as a rectangular frame 178.

Button 179 is a button for displaying a catalog of images photographed in the past under the same or similar observation conditions as the present observation condition (i.e., the microscopy method, the cube in use, the magnification ratio of the object lens (i.e., the photographing magnification ratio), the photographed image size, et cetera).

A shot button 181 is a button used for photographing the live image displayed in the image display area 172.

Area 184 is used for the user manually setting a photographing condition.

Button 182 is for shifting the screen to wizard screen C, while button 183 is used for returning to a wizard screen that had been selected prior to shifting to wizard screen D.

As described above, the setting and operation that are enabled for the user in wizard screen D are limited to those that are for photographing the scope designated by the scope designation frame 164 on wizard screen C.

Next is a description of the operation of the microscope system when a specimen is observed while using the above described four wizard screens. In this case, the operation is described by exemplifying the case in which the fluorescent observation is selected as a microscopy method, a fluorescent cube A is selected as a cube to be used, and the specimen 19 is photographed under the fluorescent observation using the fluorescent cube A.

FIGS. 27 through 30 are diagrams showing the flow charts of the specimen observation operations. FIGS. 31 through 39 are diagrams exemplifying wizard screens displayed on the monitor 5 during those operations.

To begin with, a user carrying out a prescribed operation for starting a specimen observation will display wizard screen A (refer to FIG. 23) on the monitor 5. This will start the flow chart (shown in FIG. 27) in accordance with wizard screen A, which is a start menu screen.

Referring to FIG. 27, in response to the user pressing the specimen changeover button 136, the motorized stage 20 is moved to the stage position coordinate (i.e., the specimen changeover position coordinate) in order to change over the specimens (i.e., the samples) 19, and thereby the specimen 19 is set by the user (S1101).

When the specimen 19 is set, the motorized stage 20 is moved so that the position of the specimen 19 comes to a predetermined center stage position coordinate (i.e., an observation start default coordinate) of the motorized stage 20 in response to the user carrying out a prescribed operation (e.g., re-pressing the specimen changeover button 136) related to wizard screen A (S1102). With this, the position of the motorized stage 20 is set at the reference coordinate.

Then, in response to the user pressing any of buttons 143 through 145, a microscopy method is selected (S1103). With this, the microscopy method with which the observation is carried out is selected. The present embodiment assumes the selection of the fluorescent observation and therefore button 132 is assumed to be pressed.

Subsequently, in response to the user operating in area 137, a cube is selected (S1104). With this, the cube to be used for the observation is selected. The present embodiment assumes the use of the fluorescent cube A, and therefore the fluorescent cube A is assumed to be selected.

Then, in response to the user carrying out a prescribed operation in wizard screen A, an image size is set for photographing with the video camera 3 as the initial setup of the camera (S1105). The present embodiment is assumed to be set at M×N as a photographing image size.

Then, in response to the user pressing button 151, the settings and operations carried out in S1101 through S1105 are recorded in the operation history record unit 4 as history data (S1106). The present embodiment records, in the operation history record unit 4 as history data, the fact that the fluorescent observation is selected as the microscopy method, the fact that the fluorescent cube A is selected as the cube to be used, and the fact that the photographing image size is set to be M×N. Then, wizard screen A, which has been displayed on the monitor 5, is changed over to wizard screen B (refer to FIG. 24). With this, the flow chart (shown in FIG. 28) related to wizard screen B, which is a specimen check menu screen, is started.

Figure 28:
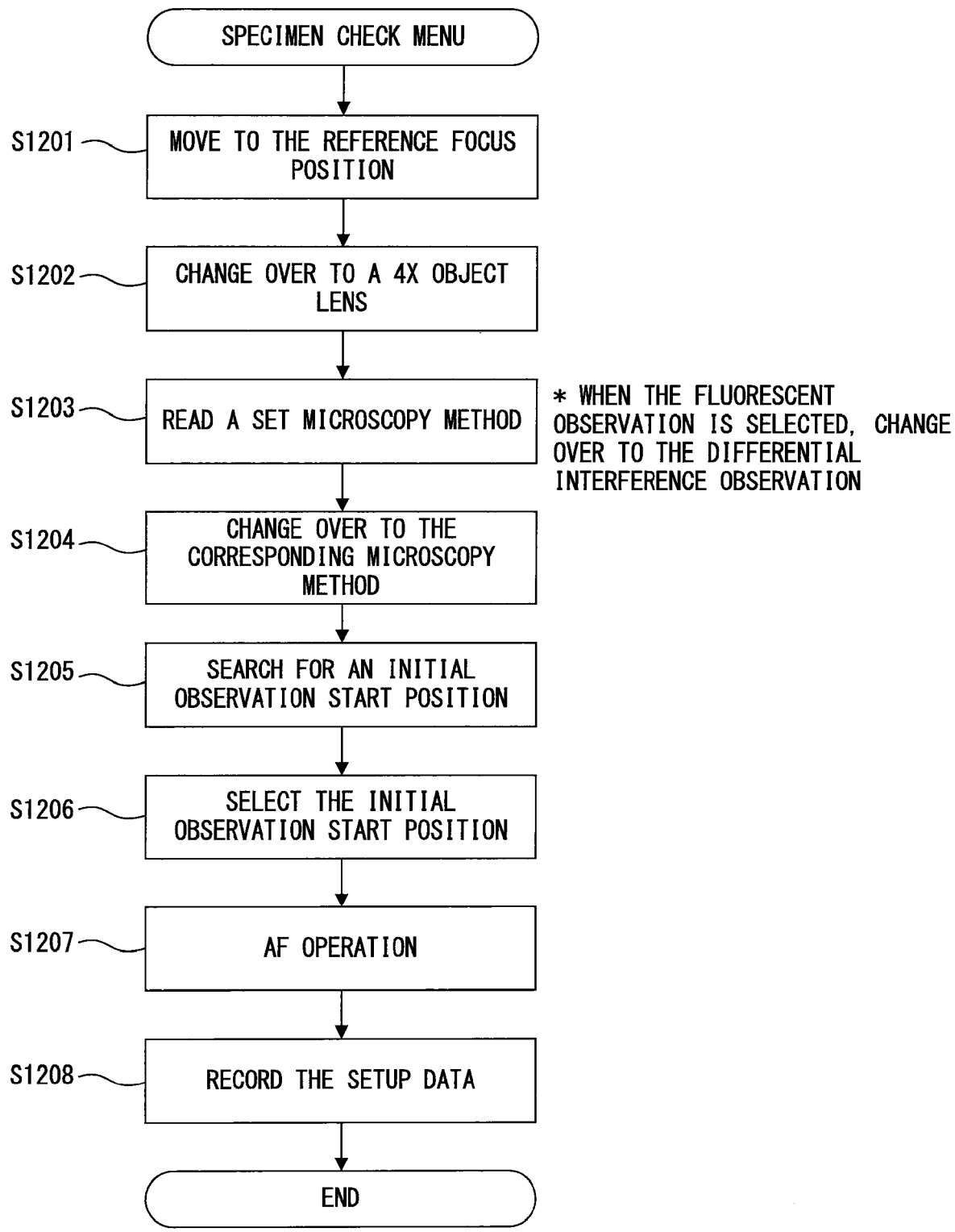
FIG. 28 is a diagram showing a flow chart related to wizard screen B.

Referring to FIG. 28, when the screen has been shifted to wizard screen B, first, the host system 2 instructs the microscope controller 31 to move the motorized stage 20 to a predetermined standard focus position (the Z coordinate position) (S1201) and to change an object lens 23 to be used over to a 4× object lens (S1202).

Then, the host system 2 reads the selected microscopy method from the operation history record unit 4 (S1203) and changes over the current microscopy method to a microscopy method corresponding to the read microscopy method (S1204). In the present embodiment, since the fact that the fluorescent observation is selected as the microscopy method is recorded in the operation history record unit 4, the fluorescent observation is read as the selected microscopy method, and the present microscopy method is changed over to the differential interference observation as the microscopy method corresponding to the readout fluorescent observation. As such, if the selected microscopy method in wizard screen B is the fluorescent observation, the present microscopy method is changed over to the differential interference observation instead of the fluorescent observation in order to prevent a discoloration of the observation target, as described above. With this, the setting of the microscope apparatus 1 in accordance with the present microscopy method is changed over to that of the microscope apparatus 1 in accordance with the differential interference observation.

Figure 31:
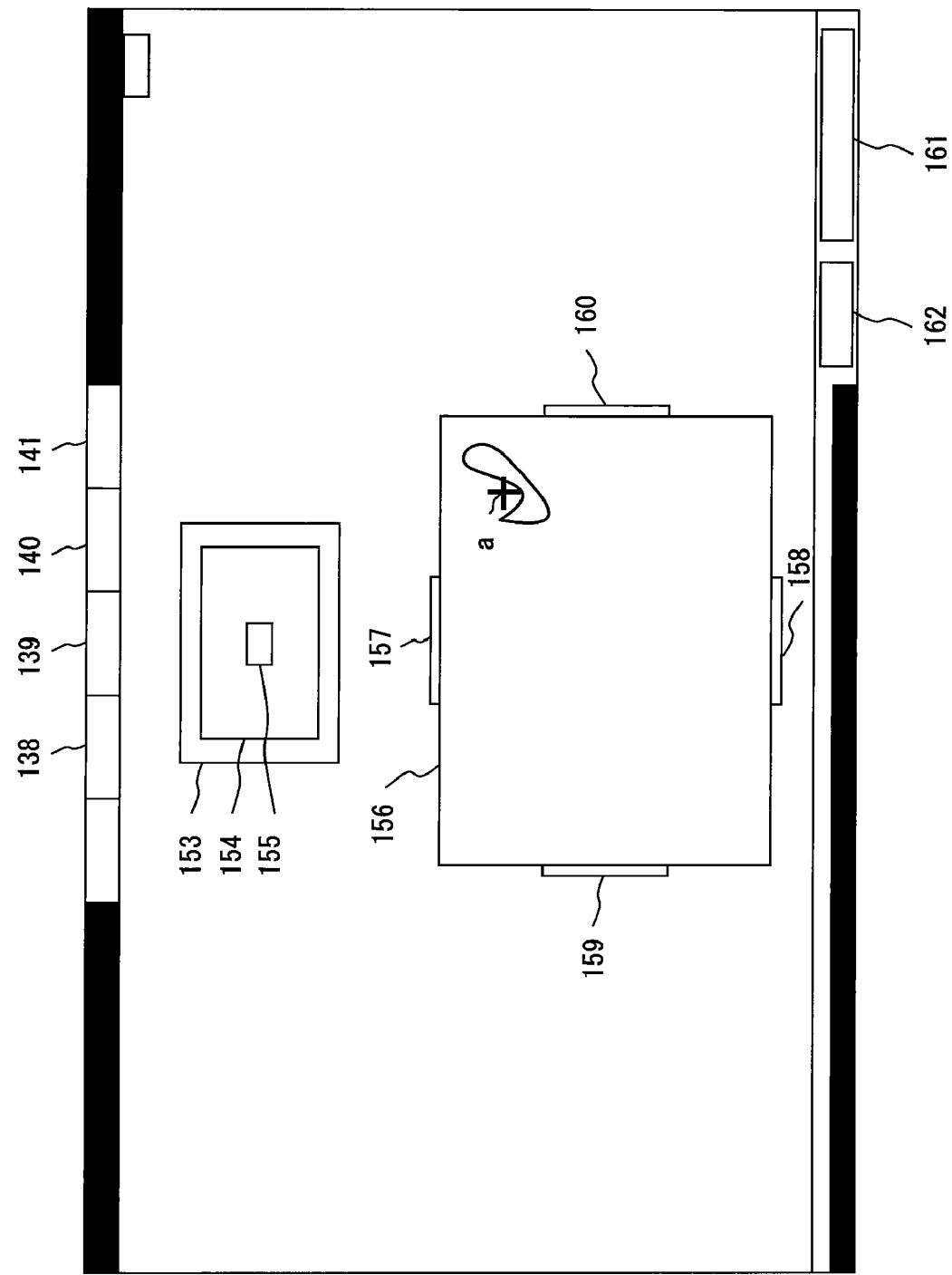
FIG. 31 is a first diagram showing exemplary wizard screen B during an observation operation.

When the changeover of microscopy methods is completed, the operation of photographing the specimen 19 in real time with the video camera 3 under the post-change microscopy method and the displaying of a macro image that constitutes the live image of the photographed area in the macro image display area 156 are started. Since the post-change microscopy method is the differential interference observation in the present embodiment, this starting includes the specimen 19 being photographed in real time with the video camera 3 under the differential interference observation and the macro image that constitutes the live image being displayed in the macro image display area 156. FIG. 31 is a diagram showing an exemplary wizard screen B in this event.

Figure 32:
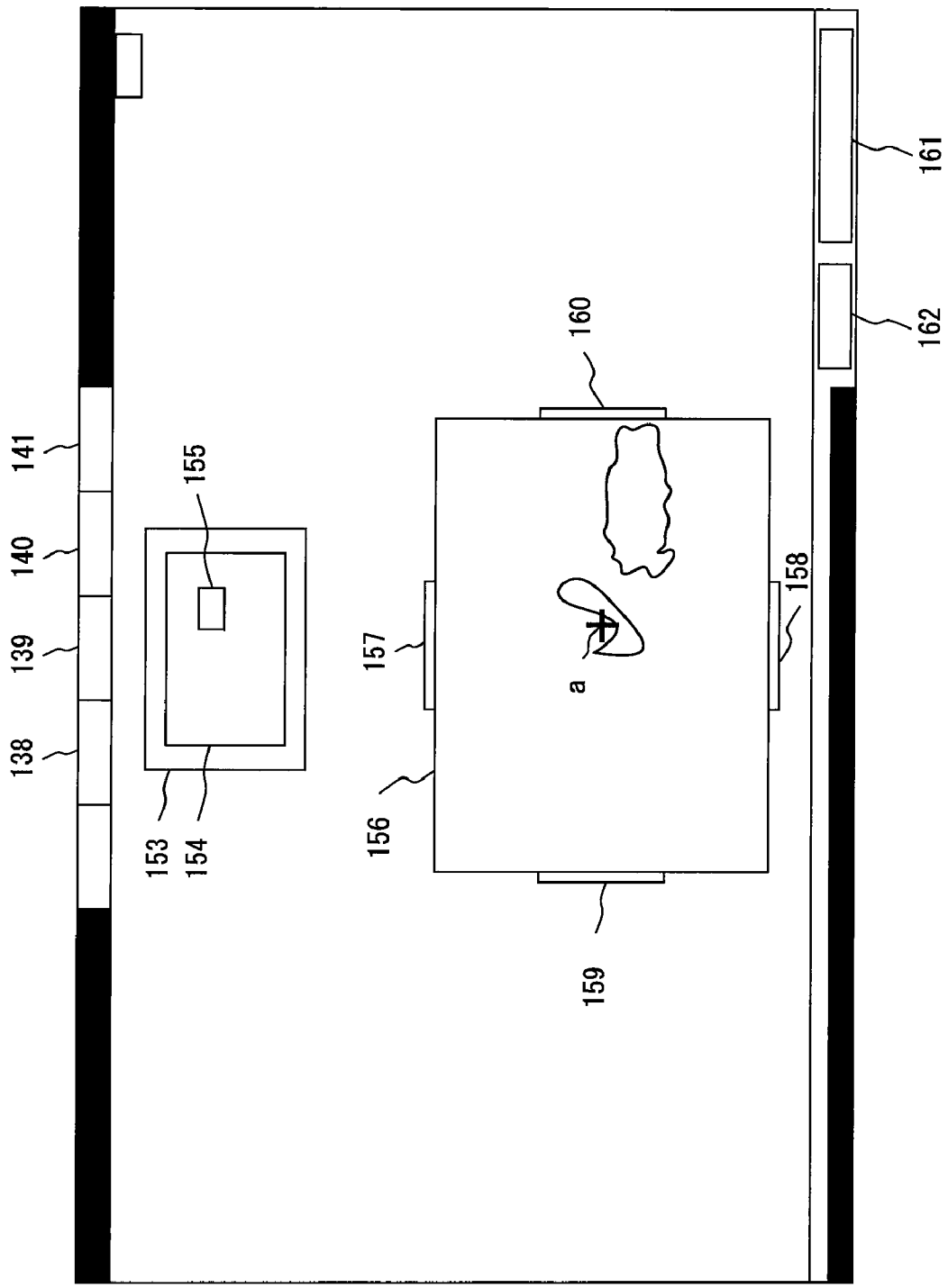
FIG. 32 is a second diagram showing exemplary wizard screen B during an observation operation.

Then, in response to the user pressing buttons 157 through 160, the motorized stage 20 is moved (S1205) to select the initial observation start position at which the observation target in the specimen 19 exists (S1206). With this, the user is enabled to search for the initial observation start position at which the observation target in the specimen 19 exists by pressing buttons 157 through 160 while confirming the display content of the slide image area 153 and macro image display area 156 and to select a desired position as the initial observation start position. Note that the position selected as the initial observation start position matches the center position of the macro image displayed in the macro image display area 156. The present embodiment assumes that buttons 157 through 160 are pressed so that point "a" in the macro image displayed in the macro image display area 156 of wizard screen B shown in FIG. 31 matches the center position of the macro image display area 156 so as to select the present point "a" as the initial observation start position and so that the present point "a" matches the center position of the macro image display area 156 as shown in FIG. 32 and is selected as the initial observation start position. The XY coordinate (x_a, y_a) is established as the initial observation start position in this event. Further, associated with point "a" moving to the center of the macro image display area 156, the rectangular frame 155 in the slide image area 153 of wizard screen B shown in FIG. 32 is moved to the corresponding position.

After the selection of the initial observation start position is completed, an AF operation is performed at the selected initial observation start position in response to the user pressing button 161 (S1207). In the present embodiment, the Z coordinate (z_a) is established as the post-AF operation focus coordinate.

Then, the settings and operations carried out in S1201 through S1207 are recorded in the operation history record unit 4 as the history data (S1208). In the present embodiment, the above noted XY coordinate (x_a, y_a) and Z coordinate (z_a) are recorded as the history data in the operation history record unit 4. Then, wizard screen B, which has been displayed on the monitor 5, is changed over to wizard screen C (refer to FIG. 25). With this, the flow chart, shown in FIG. 29, related to wizard screen C, which is the specimen search menu screen, is started.

Referring to FIG. 29, when a wizard screen is shifted to wizard screen C, first, the host system 2 instructs the microscope controller 31 to replace the object lens 23 that is to be used with a 4× magnification lens if it is not already a 4× magnification lens (S1301).

Then, the host system 2 reads the selected microscopy method from the operation history record unit 4 (S1302) and changes the present microscopy method to the read-out microscopy method (1303). In the present embodiment, since the fact that the fluorescent observation is selected as the microscopy method is recorded in the operation history record unit 4, the fluorescent observation is read as the selected microscopy method and also the fluorescent cube A is read as the selected cube, and the present microscopy method and cube are changed over to the read-out fluorescent observation and fluorescent cube A. With this, the setting of the microscope apparatus 1 in accordance with the present microscopy method is changed over to the setting of the microscope apparatus 1 in accordance with the fluorescent observation using the fluorescent cube A.

Figure 33:
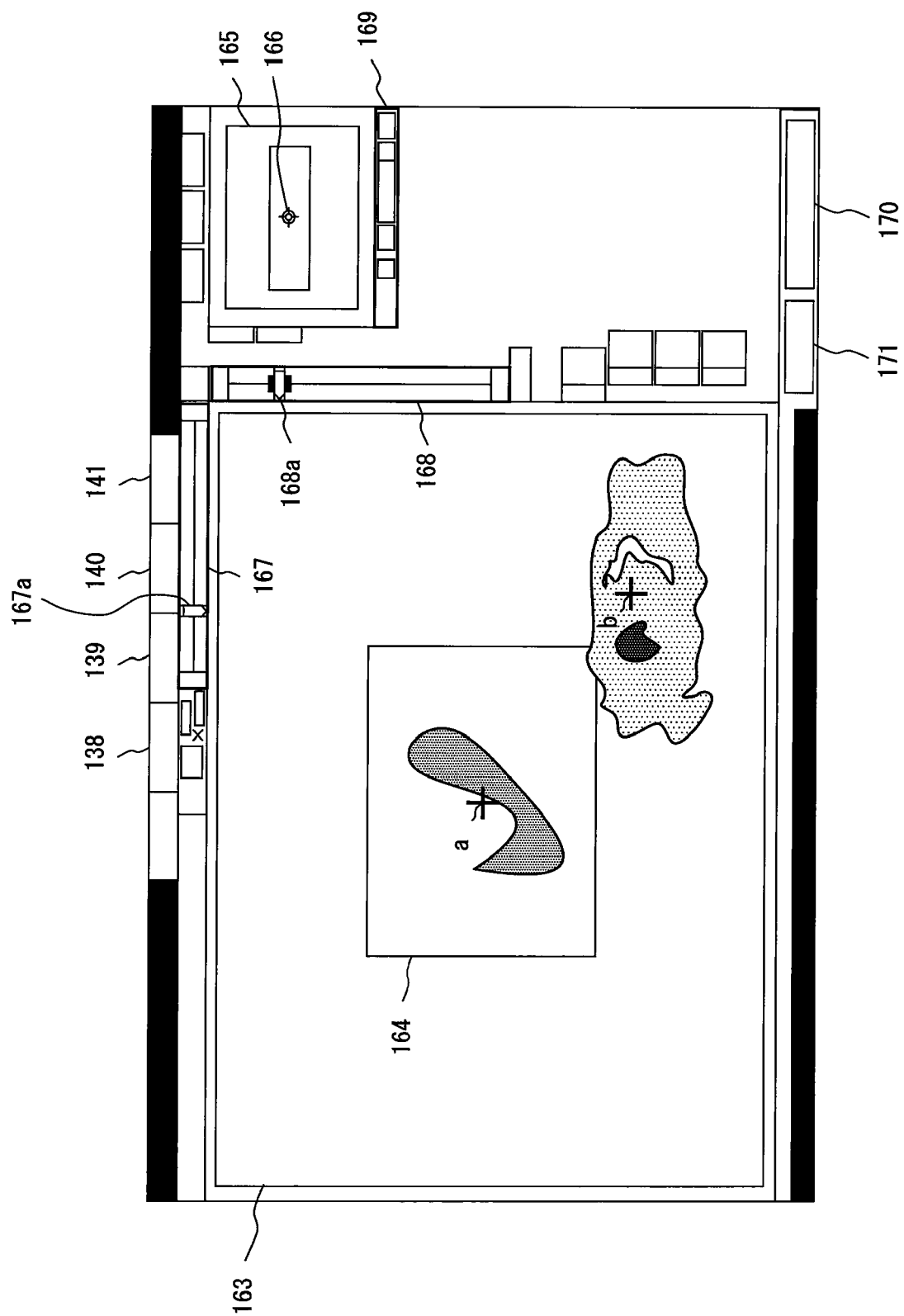
FIG. 33 is a first diagram showing exemplary wizard screen C during an observation operation.

When the changeover of the microscopy methods is completed, the specimen 19 is photographed with the video camera 3 in real time under the post-change microscopy method and the operation of displaying the macro image that constitutes the live image of the photographed image in the macro live image area 163 is started. In the present embodiment, the post-change microscopy method is the fluorescent observation using the fluorescent cube A, and therefore the specimen 19 is photographed with the video camera 3 in real time under the fluorescent observation using the fluorescent cube A and the display of the macro image that constituted the live image of the photographed image in the macro live image area 163 is started. FIG. 33 is a diagram showing an exemplary wizard screen C in this event.

Figure 34:
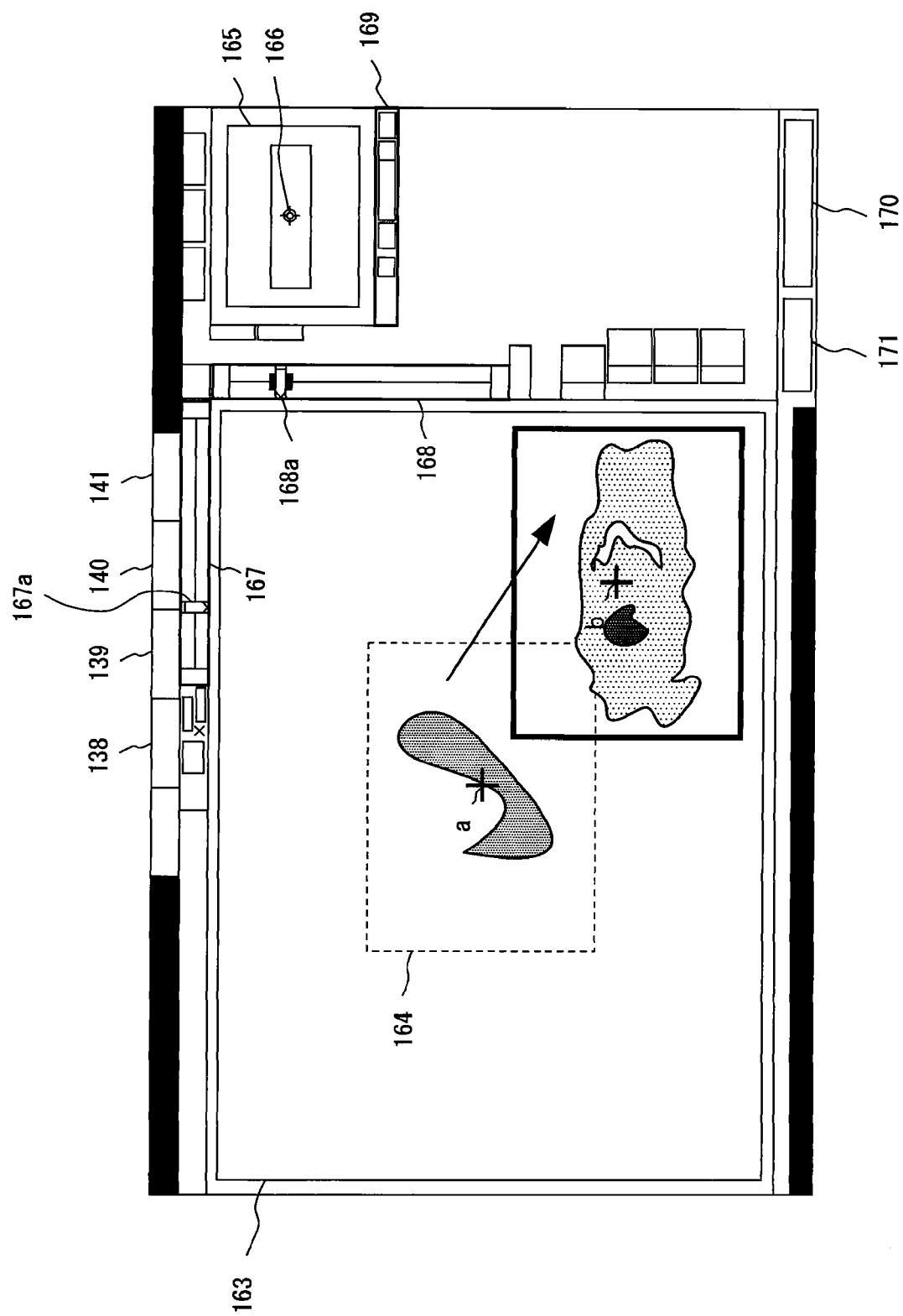
FIG. 34 is a second diagram showing exemplary wizard screen C during an observation operation.

Subsequently, in response to the user operating (e.g., a drag & drop with a mouse) the scope designation frame 164 of the macro live image area 163, the scope designation frame 164 is moved, or in response to the scrolling operation of the macro image by the user carrying out a drag & drop operation with the mouse in the macro live image area 163, the motorized stage 20 is moved (S1304) and an observation target (i.e., a photographing target) is established (S1305). With this, the user is enabled to search for an observation target and also to establish a desired scope as the observation target by matching the desired scope with the scope designation frame 164. The present embodiment assumes that, in order to establish point b in the macro image displayed in the macro live image area 163 of wizard screen C shown in FIG. 33 as the observation target, the scope designation frame 164 is operated so that the present point b matches the center position of the scope designation frame 164, that point b has matched the center position of the scope designation frame 164, and that point b has been established as the observation target, as shown in FIG. 34. Note that a frame 164' shown in FIG. 34 indicates the post-movement scope designation frame 164.

Then, the observation target established in S1305 is determined as the photography target position, and also the size of the scope designation frame 164 is changed in accordance with the user operating the slider 167a of the scope designation frame changeover area 167 to determine a photographing magnification ratio (i.e., the magnification of an object lens) (S1306). The present embodiment assumes that point b within the scope designation frame 164' shown in FIG. 34 is determined to be the photography target position and also that an object lens with a 20× photographing magnification ratio is established in accordance with the user operating the slider 167a. Note that the XY coordinate (x_b, y_b) is established as the position of point b.

Then, in response to the user pressing button 170, the scope presently displayed in the macro live image area 163 is photographed, and the macro image obtained by the present photographing and the settings and operations carried out in S1301 through 1306 are recorded in the operation history record unit 4 as the history data (S1307). In the present embodiment, the macro image photographing the scope displayed in the macro live image area 163 at the present time is defined as (pick_m_b), and recorded in the operation history record unit 4 as the history data include are the macro image (pick_m_b), the XY coordinate (x_b, y_b) of the above described point b as the coordinate of the photography target position, the photographing magnification ratio (20×) in accordance with the size of the post-change scope designation frame 164, and the like. Then, wizard screen C that has been displayed on the monitor 5 is changed over to wizard screen D (refer to FIG. 26). With this, the flow chart (shown in FIG. 30) related to wizard screen D, which is a photography menu screen, is started.

Figure 30:
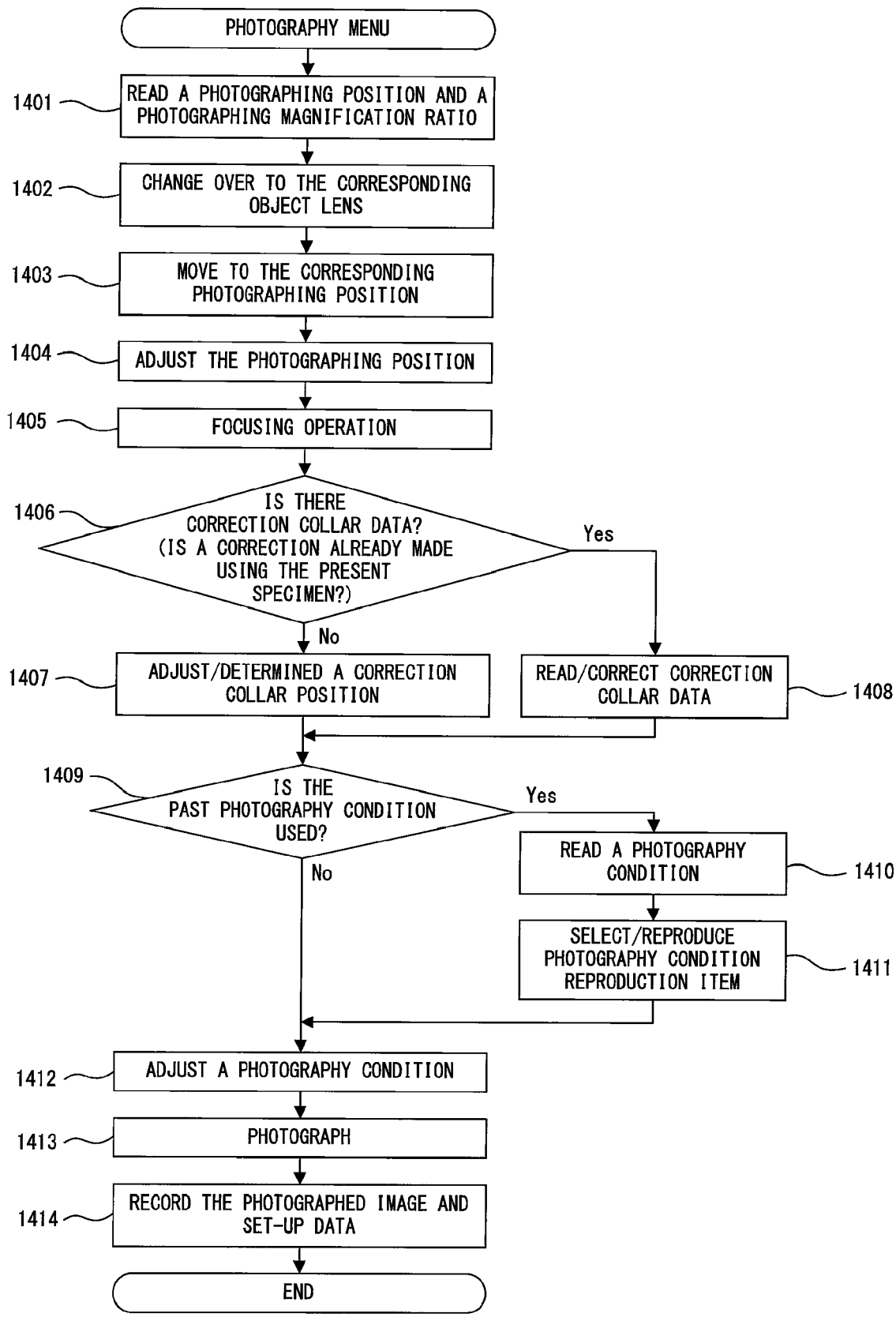
FIG. 30 is a diagram showing a flow chart related to wizard screen D.

Referring to FIG. 30, after the screen is shifted to wizard screen D, first, the coordinate of the determined photography target position and the photographing magnification ratio are read from the operation history record unit 4 (S1401), the object lens 23 is changed over to an object lens 23 corresponding to the read-out photographing magnification ratio (S1402), and the motorized stage 20 is moved to the coordinate of the read-out photography target position (S1403). In the present embodiment, the coordinate (x_b, y_b) of the photography target position and the photographing magnification ratio (20×) are recorded in the operation history record unit 4, and therefore the object lens 23 is changed over to an object lens 23 with a 20× magnification ratio (simply noted as "20× object lens" hereinafter) and the motorized stage 20 is moved to the coordinate (x_b, y_b) of the photography target position.

Figure 35:
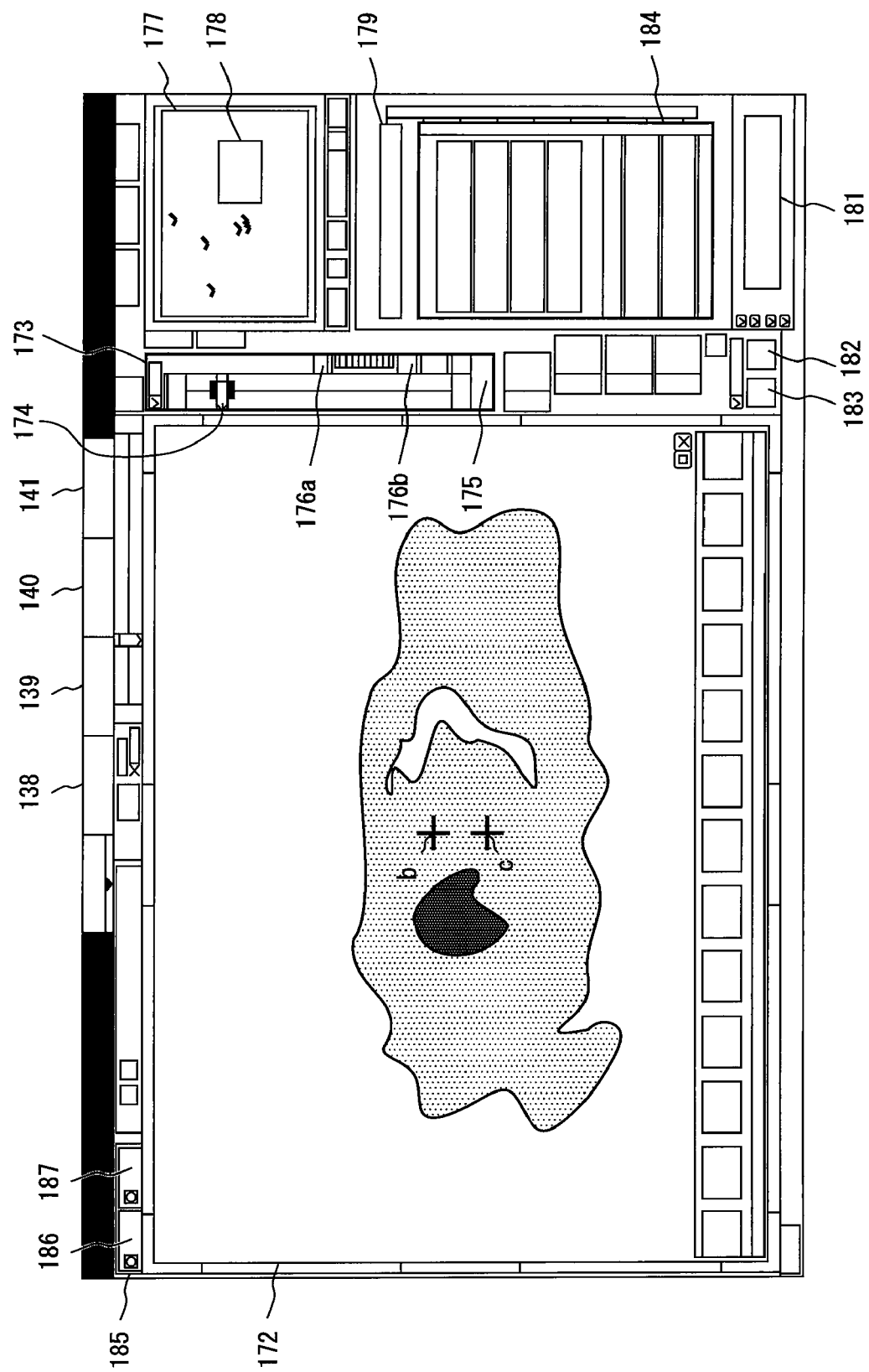
FIG. 35 is a first diagram showing exemplary wizard screen D during an observation operation.

Then, the photography target position of the specimen 19 is photographed in real time with the video camera 3 and with the post-changeover object lens 23 and the display of the live image of the photographed image in the image display area 172 is started. Further, a macro image recorded in the operation history record unit 4 just prior to shifting the screen to wizard screen D is read and the macro image is displayed in the stage control-map area 177. In the present embodiment, point b, which constitutes the photography target position, is photographed with the video camera 3 using the post-changeover 20× object lens (i.e., the 20× object lens determined in correspondence with the size of the scope designation frame 164' shown in FIG. 34) in real time, and the display of the live image of the photographed image in the image display area 172 is started. Meanwhile, a macro image (pick_m_b) recorded in the operation history record unit 4 immediately prior to shifting to wizard screen D is read out and the macro image (pick_m_b) is displayed in the stage control-map area 177. FIG. 35 is a diagram showing an exemplary wizard screen D in this event. As shown in wizard screen D of FIG. 35, point b, which constitutes the photography target position, is displayed at the center of the image display area 172, and the macro image (pick_m_b) is displayed in the stage control-map area 177.

Figure 36:
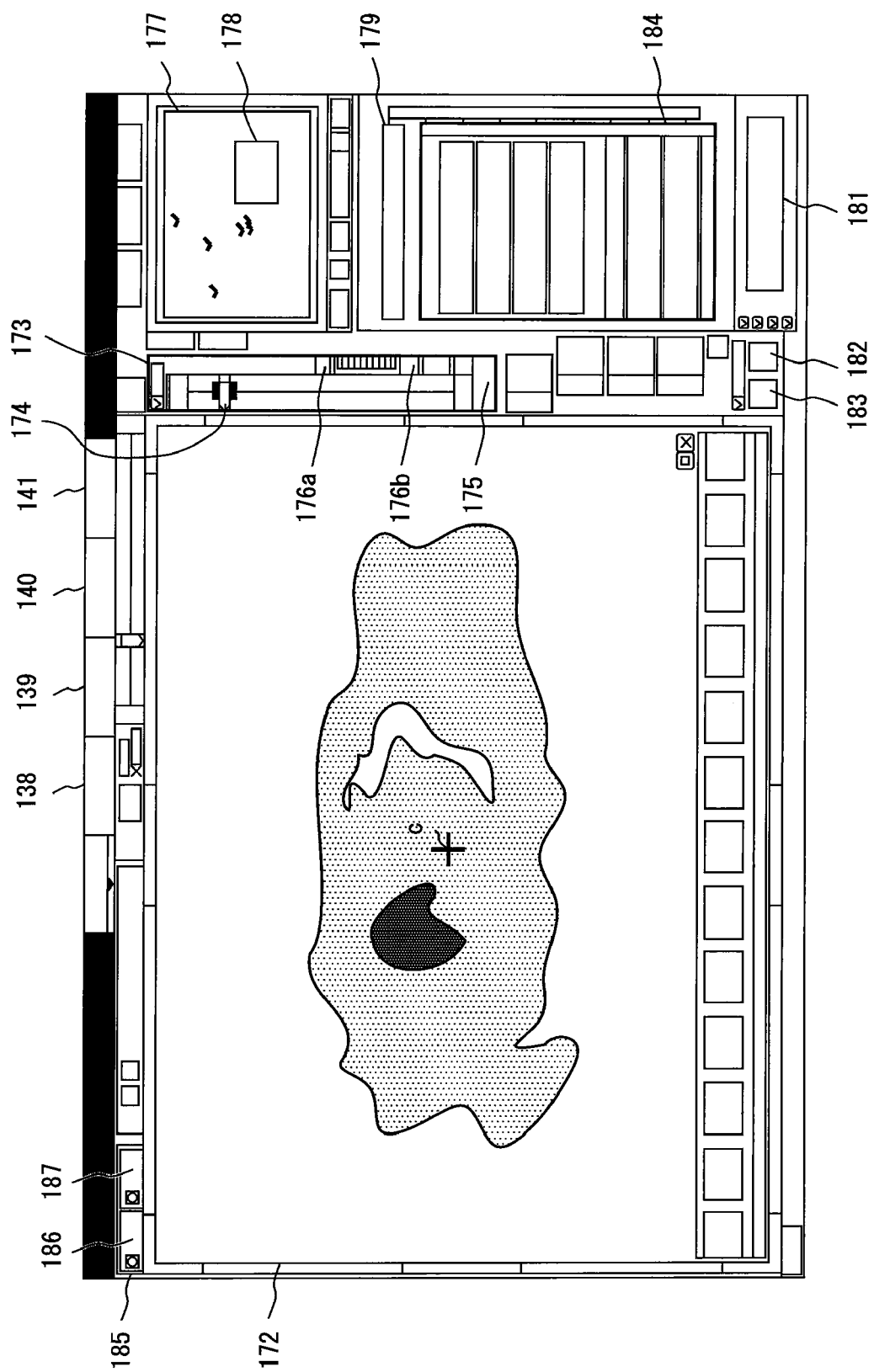
FIG. 36 is a second diagram showing exemplary wizard screen D during an observation operation.

Then, in response to the user designating a position within the image display area 172, the motorized stage 20 is moved so that the designated position matches the center position of the image display area 172 (S1404). With this, the user is enabled to carry out a fine adjustment of the photography target position (i.e., the scope for photographing). The present embodiment assumes that a point c that is in the live image displayed in the image display area 172 of wizard screen D shown in FIG. 35 is designated so that point c matches the photography target position, assumes that the motorized stage 20 is moved so that point c matches the center position of the image display area 172, and assumes that point c matches the center position of the image display area 172, constituting the photography target position as shown in FIG. 36. Further, associated with point c moving to the center of the image display area 172, the rectangular frame 178 is moved to the corresponding position in the stage control-map area 177 in this event. Note that the XY coordinate (x_c, y_c) is defined as the position of point c.

Then, in response to the user pressing (e.g., clicking with the mouse) the AF button 175 in the focus-correction collar area 173, an AF operation (i.e., a focus operation) is carried out (S1405). Meanwhile, after the AF operation, in response to the user operating the slide bar 174 in the focus-correction collar area 173, the motorized stage 20 is moved in the optical axis direction (i.e., the Z direction), and thereby the focusing position can also be changed. With this, the user is also enabled to finely adjust the focusing position. Incidentally, the configuration may also be such that AF operation performed in S1405 is carried out manually by only operating the slide bar 174. The coordinate of the focusing position is defined as the Z coordinate (z_c).

Then, whether or not correction collar data (i.e., a correction collar position) for the present specimen 19 is recorded in the operation history record unit 4 is judged (S1406).

Here, if the judgment result is "no", then the process for a correction collar position adjustment/determination is carried out (S1407). In this process, in response to the user pressing the correction collar adjustment buttons 176a and 176b in the focus-correction collar area 173, the correction collar of the object lens 23 presently in use is driven. With this, the user is enabled to adjust the optimal correction collar position and correct an aberration due to the thickness of the cover glass by pressing the correction collar adjustment buttons 176a and 176b while confirming the live image displayed in the image display area 172. Further, in response to the user carrying out a prescribed operation for the wizard screen D, the present correction collar position is recorded in the operation history record unit 4 as the post-adjustment (i.e., the post-correction) correction collar position (i.e., the correction collar data). With this, the user is enabled to record the post-adjustment correction collar position in the operation history record unit 4. The present embodiment assumes that the correction collar position (h_1) is recorded in the operation history record unit 4 as the correction collar data.

In contrast, if the judgment result of S1406 is "yes", the correction collar data recorded in the operation history record unit 4 is read, and the correction collar is driven to a position in accordance with the correction collar data (S1408). With this, the correction collar is moved to the optimal position so that the correction of an aberration due to the thickness of the cover glass can be carried out. For example, let it be assumed that the above described correction collar position (h_1) is recorded in the operation history record unit 4 as the correction collar data. Then, the correction collar is driven to the correction collar position (h_1) in accordance with the correction collar data.

The process of the above described S1406 through 1408 causes only one process S1407 to be applied to one specimen in the present process flow, and after the process of S1407 is applied to it once, the process will not be applied again until the specimen is replaced, and instead the process of S1408 will be applied.

When the process of S1407 or S1408 is completed, subsequently, whether or not the user has pressed button 179 is judged (S1409). Note that the judgment is for determining whether or not to use the photography condition used in the past photographing when the photographing condition for the video camera 3 is set.

Figure 37:
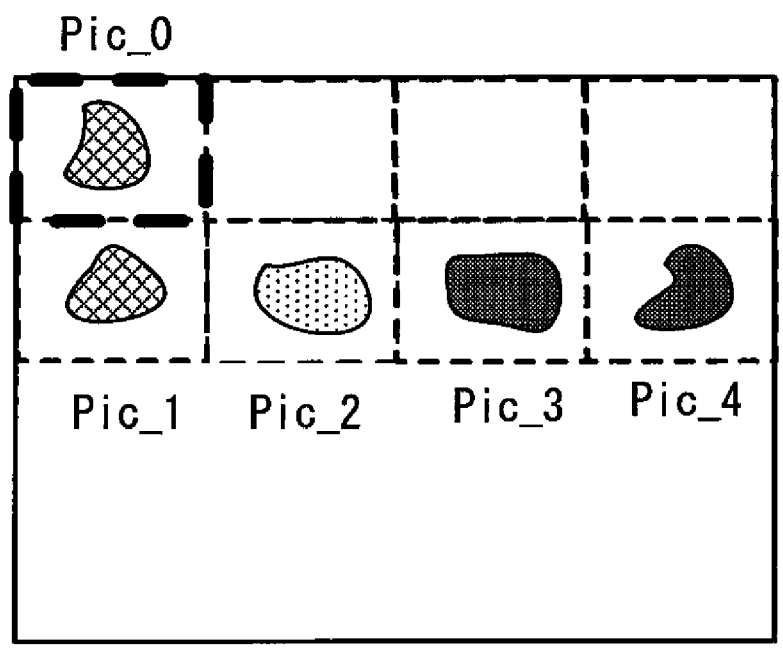
FIG. 37 is a diagram showing an exemplary window.

Here, if the judgment result is "yes", an image or images (excluding macro images) that have been photographed in the past under the same or similar observation conditions as the present observation condition (i.e., the microscopy method, the cube in use, the magnification ratio of the object lens (i.e., photographing magnification ratio), photographed image size, et cetera) and recorded in the operation history record unit 4 are searched for, and the applicable images are displayed in a catalog within a window displayed separately from wizard screen D (S1410). FIG. 37 is a diagram showing an exemplary window in this event. The exemplary window shown in FIG. 37 is configured to display not only four images (pic_1 through pic_4) that have a high degree of similarity with one another but also to display an image photographed in the immediate past (pic_0) (excluding macro images). Incidentally, in FIG. 37, the labels pic_0 through pic_4 are given only for convenience of description, and they are not actually displayed.

Then, in response to the user carrying out an image selection operation (e.g., clicking with the mouse), one image shown in the window is selected, photography conditions under which the selected image has been photographed is set, and the photography conditions are displayed in the menu 184 (S1411). With this, the user is enabled to easily reproduce the photography conditions used when a desired image has been photographed by selecting the image in the window. Note that the image selected in the window is displayed with, for example, a bold-lined box (refer to the image pic_0) as shown in FIG. 37, so as to distinguish it from unselected images. Further, the configuration is such that the window is turned off when, for example, wizard screen D is changed over to another wizard screen.

In the present process flow, the reproducible photography conditions are designated to be exposure, intensity adjustment (including an ND filter), white balance (W/B), and black balance (B/B), while the XY coordinate and Z coordinate of the motorized stage 20 at photographing are designated as irreproducible conditions. Further, it can be selected as to whether the reproducible photography conditions can be reproduced or not for each photography conditions. Note that the selection can be made in the window in which the images are displayed in a catalog. This can be implemented by configuring such that, as the user selects a desired image from the catalog-displayed window, the photography conditions with which the image has been photographed are also displayed in the same window; this is a window in which the user selects the photography conditions to be reproduced or not to be reproduced.

The present embodiment assumes that an image (pic_2) is selected by the user, and exposure (ae_2), intensity adjustment (l_2), W/B (wb_2), or B/B (bb_2), are set/reproduced as the photography conditions in the window example shown in FIG. 37.

In contrast, if the judgment result of S1409 is "no", the photography conditions used for the last photographing (excluding the photography conditions used for a macro image photographing) are set, and the aforementioned photography conditions are displayed in the menu 184. Incidentally, an alternative configuration may be such that the setting and displaying of the photography conditions can also be carried out immediately after changing over a screen to wizard screen D.

When the photography conditions are set as described above, then, in response to the user performing operations (e.g., clicking with the mouse) for changing the photography conditions in the menu 184, the set-up photography conditions are changed (S1412). With this, the user is enabled to finely adjust the set-up photography conditions. Of course, the user is also enabled to set the photography conditions manually.

Subsequently, in response to the user pressing the shot button 181, the live image displayed in the image display area 172 is photographed (S1413). The present embodiment defines the exposure (ae_c), intensity adjustment (l_c), W/B (wb_c), and B/B (bb_c) as the photography conditions (i.e., the photography conditions used for photographing point c) in this event, with the photographed image as (pic_c). Incidentally, when the live image is photographed, the photographed image is displayed in the image display area 172 as a paused image.

Then, the settings and operations which have been carried out in S1401 through S1413 are recorded in the operation history record unit 4 as history data (S1414). Recorded in the operation history record unit 4 according to the present embodiment are the above described XY coordinate (x_c, y_c) and Z coordinate (z_c), both of which are also the present XY coordinate and Z coordinate, the exposure (ae_c), intensity adjustment (l_c), W/B (wb_c), and B/B (bb_c) as the photography conditions used when point c has been photographed in S1413, the photographed image (pic_c), and the like. Further, in S1414, it is also possible to change the paused image displayed in the image display area 172 over to a live image by the user pressing button 186.

The above description has been provided on a series of operations for carrying out a specimen observation while using the wizard screens in which it is possible to change the screen over to another wizard screen on an as-required basis, as described above. In such a case, it is possible to restart the flow chart shown in FIG. 27 by pressing button 138 to change it over to wizard screen A. It is also possible to restart the flow chart shown in FIG. 28 by pressing button 139 to change it over to wizard screen B. It is also possible to restart the flow chart shown in FIG. 29 by pressing button 140 or button 182 to change it over to wizard screen C. It is further possible to restart the flow chart shown in FIG. 30 by pressing button 141 to change it over to wizard screen D.

Figure 38:
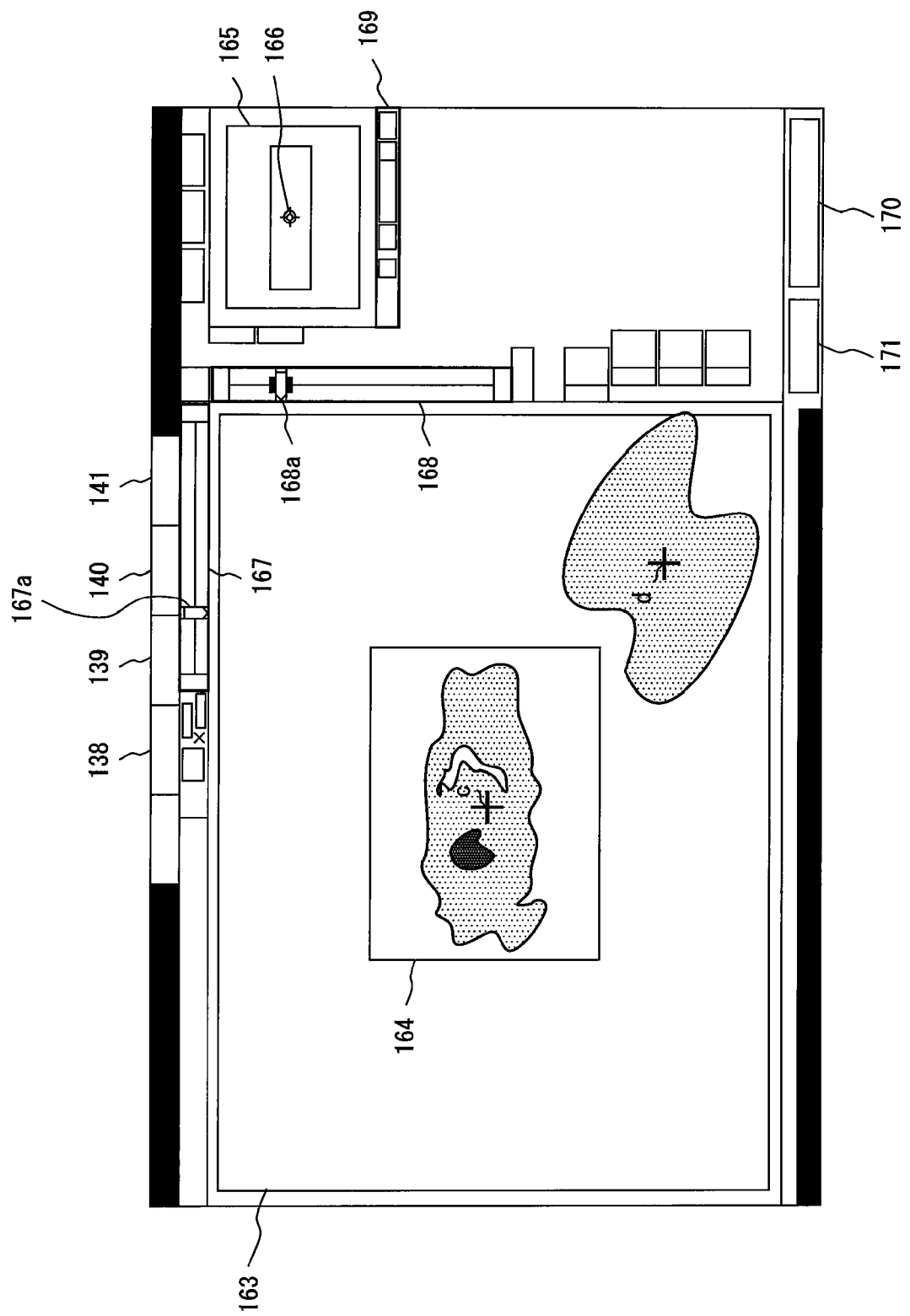
FIG. 38 is a third diagram showing exemplary wizard screen C during an observation operation.
Figure 39:
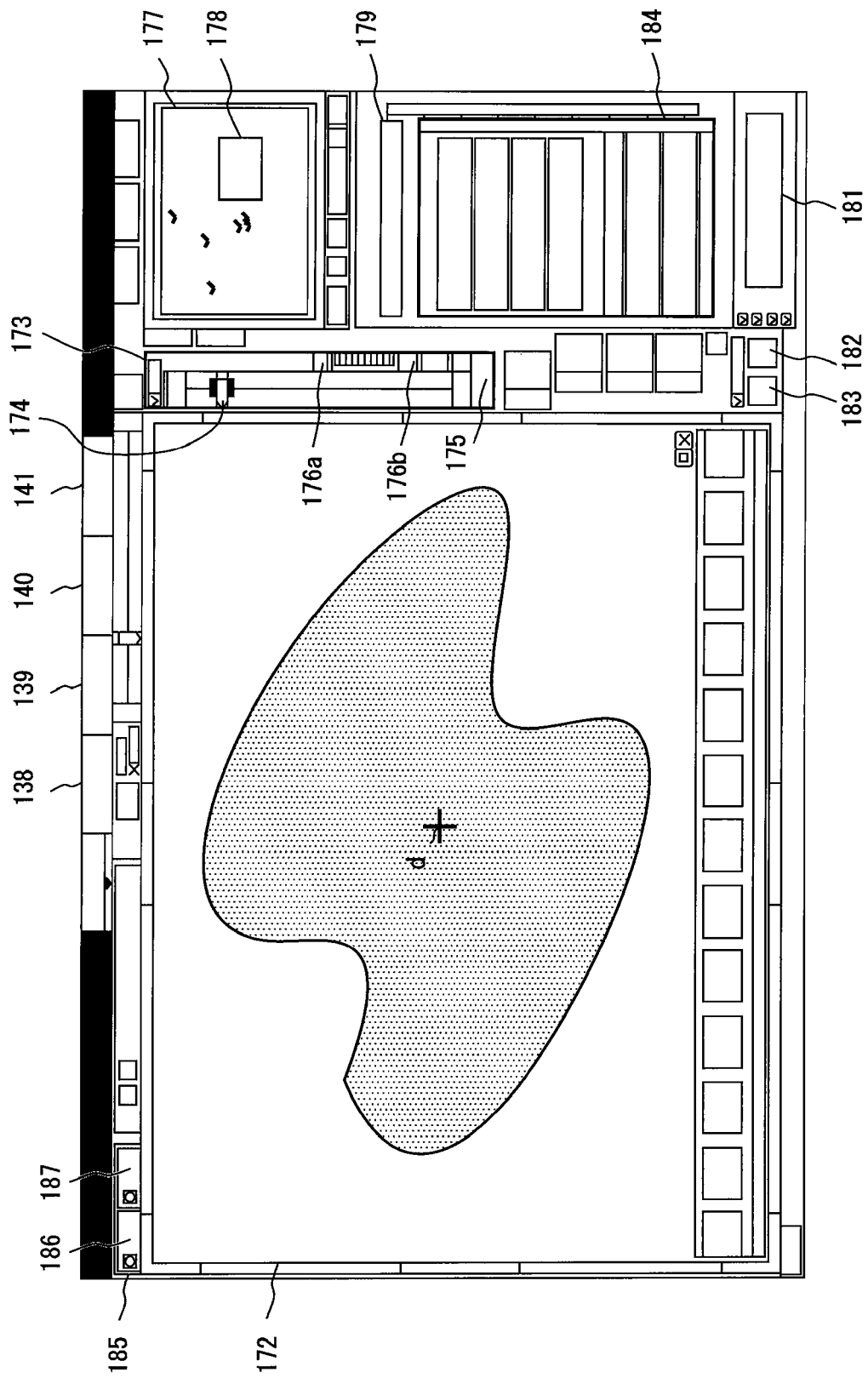
FIG. 39 is a third diagram showing exemplary wizard screen D during an observation operation.

With this configuration, the user is enabled to continue a search for an observation target that constitutes another observation point by the user pressing button 182 after the process of, for example, the above described S1414 is completed. In this case, in response to the user pressing button 182, wizard screen D displayed on the monitor 5 is changed over to wizard screen C, with the object lens 23 to be used being changed from the 20× to 4× object lens and a macro image (i.e., a live image) picked up by the 4× object lens being displayed again in the macro live image area 163. Incidentally, the fact that the XY coordinate and Z coordinate in this event succeed from the XY coordinate and Z coordinate that are immediately prior to the changing from wizard screen D over to wizard screen C should be clear on the basis of the flow chart related to wizard screen C (refer to FIG. 29). Therefore, in the present embodiment, the XY coordinate and Z coordinate succeed from the XY coordinate ($x\_c$, $y\_c$) and Z coordinate ($z\_c$) that are immediately prior to the changing over to wizard screen C. FIG. 38 is a diagram showing an exemplary wizard screen C in this event. Here, when the user operating on wizard screen C shown in FIG. 38 determines point d displayed in the macro live image area 163 as a new observation target, determines 20× as the photographing magnification ratio, and changes over to wizard screen D, the live image of point d picked up by the 20× object lens is displayed in the image display area 172 of wizard screen D. FIG. 39 is a diagram showing an exemplary wizard screen D in this event. Here, the user is once again enabled to set the photography conditions that were used when the photographing was last carried out, or to set the photography conditions used for past photographing, by pressing button 179. The user is also enabled to finely adjust, by way of the menu 184, the photography conditions set-up in the above described manner.

Here, if the user wishes to set an unset cube B additionally, it is possible to set it by pressing button 138. In this case, wizard screen D is changed over to wizard screen A in response to the user pressing button 138. Note that at minimum the XY coordinate and Z coordinate and the photography conditions immediately prior to the changeover will be recorded in the operation history record unit 4 as history data when wizard screen D is changed over to wizard screen A. Then, the user setting up the cube B additionally by way of area 137 followed by pressing button 141 in wizard screen A causes wizard screen A to be changed over to wizard screen D. When the screen is changed over to wizard screen D as such, the state immediately prior to shifting to wizard screen A is reproduced and it is once again possible to perform an observation. That is, it is possible to perform an observation in a state immediately prior to shifting to wizard screen A, with the cube B additionally set.

In the observation operations described above, among the settings and operations which are recorded in the operation history record unit 4 as history data during the operations, each XY coordinate, each Z coordinate, and a correction collar position (i.e., correction collar data) are cleared when the specimens 19 are replaced in wizard screen A, while other settings and operations are selectively reproduced in accordance with the post-changeover wizard screen.

Figure 40:
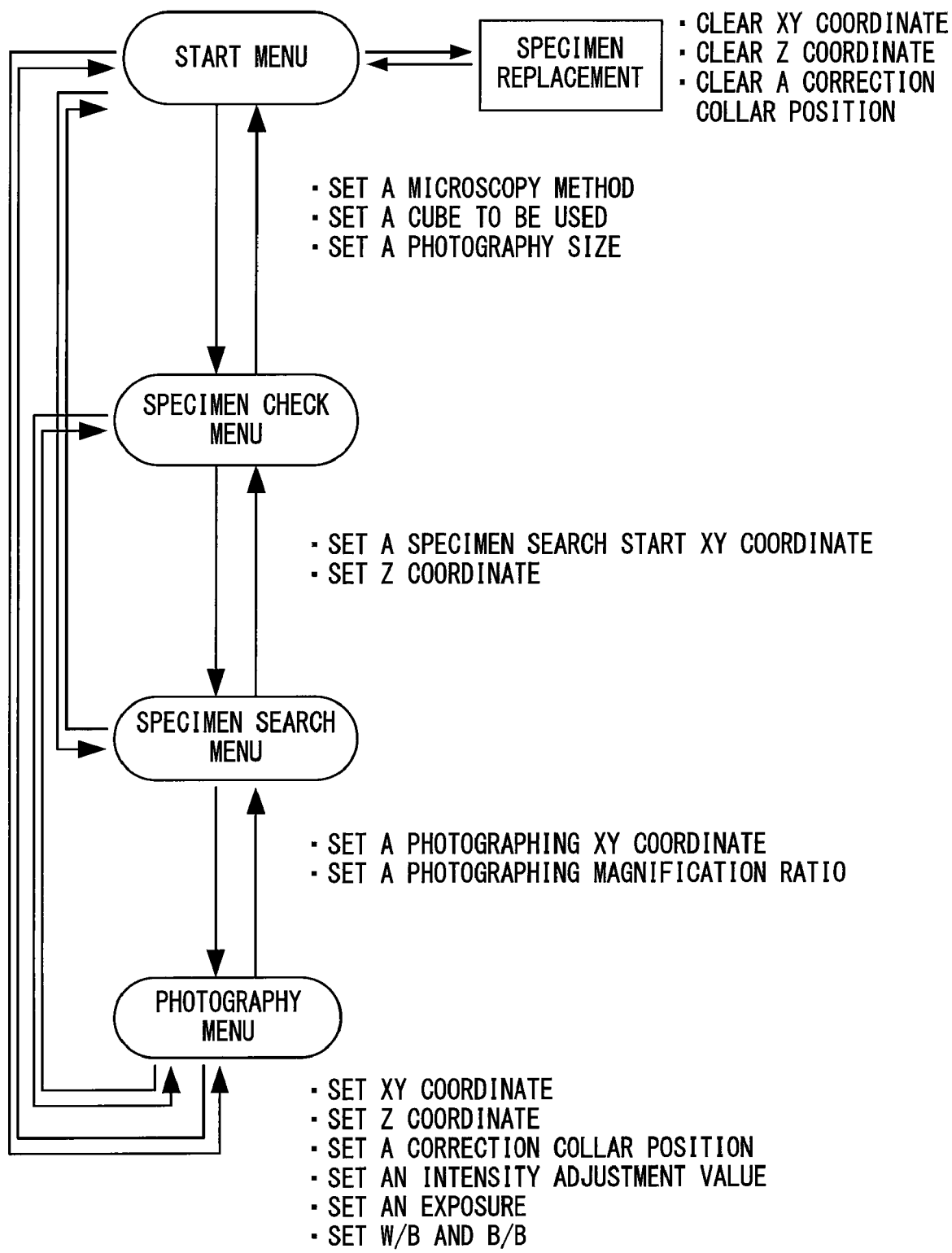
FIG. 40 is a diagram showing the acceptable setup and operation for each wizard screen.

FIG. 40 is a diagram showing the setup and operation that are acceptable in each wizard screen.

As shown in FIG. 40, wizard screen A, which is the start menu screen, is capable of accepting at least a microscopy method, a cube in use, and photography size as settings and operations, and these settings and operations are recorded in the operation history record unit 4 as history data. Further, in wizard screen A, when the specimens 19 are replaced the respective XY coordinate, Z coordinate and correction collar position that are recorded in the operation history record unit 4 are cleared.

Wizard screen B, which is the specimen check menu screen, is capable of accepting, as the settings and operations, at least a specimen search start XY coordinate (i.e., the initial observation start position) and the Z coordinate obtained by an AF operation (refer to S1207) at the aforementioned position, and these settings and operations are recorded in the operation history record unit 4 as history data.

Wizard screen C, which is the specimen search menu screen, is capable of accepting, as the settings and operations, at least a photographing XY coordinate (a photography target position) and photographing magnification ratio, and these settings and operations are recorded in the operation history record unit 4 as the history data.

Wizard screen D, which is the photography menu screen, is capable of accepting, as the settings and operations, at least an XY coordinate that is an actual photographing position, a Z coordinate obtained by an AF operation (refer to S1405) at the aforementioned position, a correction collar position (i.e., correction collar data), and photography conditions (i.e., exposure, light intensity adjustment, W/B and B/B), and these settings and operations are recorded in the operation history record unit 4 as the history data.

As described above, each wizard screen is configured to accept only predetermined setting and operation, and therefore the setting and operation that are recorded in the operation history record unit 4 will be reproduced for the unaccepted setting and operation. For example, the setting of a microscopy method that cannot be accepted in wizard screen B will be reproduced on the basis of the microscopy method accepted in wizard screen A and recorded in the operation history record unit 4. That is, in changing over the wizard screens, the setting and operation that cannot be accepted in the post-changeover wizard screen will be reproduced on the basis of the setting and operation that are recorded in the operation history record unit 4. This also means that the setting and operation to be reproduced are determined on the basis of the post-changeover wizard screen and the history data recorded in the operation history record unit 4, and that the microscope apparatus 1 is controlled in accordance with the aforementioned setting and operation.

As described above, the microscope system according to the present embodiment is configured to provide a user with a plurality of wizard screens corresponding to a plurality of observation steps as an operation menu for navigating the settings and operations, with each of the wizard screens accepting only the setting and operation necessary for each corresponding observation step; to automatically record, as history data, the setting and operation that are carried out in each wizard screen when a specimen observation is carried out while sequentially changing over the wizard screens corresponding to the observation step; and to enable a selective reproduction of the setting and operation on the basis of the history data when the wizard screens are changed over, and therefore it is possible to simplify and ease user setting and operation and to shorten the time required for the observation work, making it possible to lighten a load on the user a significant amount. Therefore, the microscope system provides the user, such as a novice microscope operator, with the greatest efficiency.

Note that the present embodiment assumes that the selectable combination of microscopy methods is the bright field observation, differential interference observation, and fluorescent observation; alternatively, combinations of other microscopy methods may be applied, such as providing a phase difference observation in place of the differential interference observation.

Further, the present embodiment is configured such that the microscope apparatus 1 includes a plurality of object lenses 23 to change photographing magnification ratios by changing over the lenses 23 as required; alternatively, an object lens equipped with a zoom mechanism may of course be applied instead.

Further, the present embodiment has been described by exemplifying a slide glass as the specimen 19, which is arbitrary, and a dish and other specimens may also be applied.

Meanwhile, the present embodiment is configured to also record a photographed image as history data; alternatively, the photographed image may be excluded therefrom.

Further, in the present embodiment, the data recorded as history data is not limited to the data described above; it is alternatively possible to record, for example, a filter to be used, an aperture stop, more detailed setup information of the video camera 3, et cetera.

Further, the microscope system according to the present embodiment adopts an upright microscope apparatus as the microscope apparatus 1; alternatively, it is of course possible to adopt an inverted microscope apparatus, and it is also possible to apply the present embodiment to various systems such as a line apparatus incorporating a microscope apparatus.

The present invention can also be embodied by producing a control program for making the central processing unit (CPU) of the above described computer of a standard configuration execute the process shown in the flow charts of FIGS. 2, 16, 27 and 30, by recording the program in a computer readable recording medium, by making the computer read the program from the recording medium, and by having the CPU of the computer execute the program.

The recording medium from which a computer can read the recorded control program can utilize, for example, a storage apparatus such as read-only memory (ROM) and a hard disk apparatus which are built in, or externally attached to, the computer; or a portable recording medium, such as a flexible disk, magneto optical (MO) disk, CD-ROM, or DVD-ROM, from which a recorded control program can be read when such a medium is inserted into a media drive apparatus comprised in the computer.

Further, such a recording medium may be a storage apparatus comprised by a computer system which is connected to the computer by way of a telecommunication line and which functions as a program server. In such a case, the configuration is such that a transmission signal obtained by modulating a carrier wave with a data signal expressing the control program is transmitted from the program server to the computer by way of a telecommunication line that is a transmission medium, while the computer demodulates the received transmission signal to reproduce the control program, and thereby the control program can be executed by the CPU of the computer.

The present invention has been described in detail thus far. The present invention, however, may of course be improved and/or changed in various ways possible within the spirit and scope of the present invention, in lieu of being limited to the above described embodiment.

As such, in the case of a user, especially a novice microscope operator, performing a cell diagnosis screening or the like, the present invention makes it possible to shorten the time required to reproduce the microscope state at a desired returned point after returning to the point and to lighten the load of the user significantly.

Further, in a cell diagnosis screening on a microscope system, the present invention also provides a user, especially a novice microscope operator, with a simplified and easy setting and operation, a speeding up of observation work, and a greatly reduced load on the user.

What is claimed is:

1. A microscope system which changes observation states by driving various optical members, the microscope system comprising:
    an image pickup unit for picking up an image of a sample;
    a display unit for displaying an image picked up by the image pickup unit;
    a hardware history record unit for recording history data related to a microscope operation history, wherein the history data relates to a microscope state at a time of changing the microscope state and includes data indicating what change has been made to the microscope state, and wherein the history record unit records image data representing the image of the sample picked up by the image pickup unit and synchronously records the history data and the image data;
    a selection unit for selecting at least one microscope operation item from among a plurality of microscope operation items; and
    a state reproduction unit for reproducing a microscope state based on (i) the at least one microscope operation item selected by the selection unit, and (ii) the history data recorded in the history record unit;
    wherein the state reproduction unit causes the display unit to simultaneously display a plurality of images of the sample corresponding to a plurality of pieces of the image data recorded in the history record unit, selects one image from among the plurality of simultaneously displayed images, and reproduces a microscope state to which an observation state is changed based on the selected image; and
    wherein the history data relating to the microscope operation history is cleared after a return position at which the microscope state is reproduced.

2. The microscope system according to claim 1, wherein the state reproduction unit comprises a selection condition input unit, causes the display unit to display at least one image in accordance with a selection condition input by the selection condition input unit when the plurality of images of the sample are simultaneously displayed in the display unit, and selects one image from among the at least one displayed image.

3. A control method used for a microscope system which changes observation states by driving various optical members, the microscope system comprising an image pickup unit for picking up an image of a sample and a display unit for displaying an image picked up by the image pickup unit, the method comprising:
    recording, by a hardware history record unit, history data related to a microscope operation history, wherein the history data relates to a microscope state at a time of changing the microscope state and includes data indicating what change has been made to the microscope state, and wherein the history record unit records image data representing the image of the sample picked up by the image pickup unit and synchronously records the history data and the image data;
    selecting at least one microscope operation item from among a plurality of microscope operation items; and
    reproducing a microscope state based on (i) the at least one selected microscope operation item, and (ii) the recorded history data;
    wherein said reproducing the microscope state comprises causing the display unit to simultaneously display a plurality of images of the sample corresponding to a plurality of pieces of the image data recorded in the history record unit, selecting one image from among the plurality of simultaneously displayed images, and reproducing a microscope state to which an observation state is changed based on the selected image; and wherein the history data relating to the microscope operation history is cleared after a return position at which the microscope state is reproduced.

4. A non-transitory computer readable recording medium having stored thereon a control program for a computer of a microscope system which changes observation states by driving various optical members, the microscope system comprising an image pickup unit for picking up an image of a sample and a display unit for displaying an image picked up by the image pickup unit, wherein the control program causes the computer to perform functions comprising:

recording history data related to a microscope operation history, wherein the history data relates to a microscope state at a time of changing the microscope state and includes data indicating what change has been made to the microscope state;

recording image data representing the image of the sample picked up by the image pickup unit, wherein the history data and the image data are recorded synchronously;

selecting at least one microscope operation item from among a plurality of microscope operation items; and reproducing a microscope state based on (i) the at least one selected microscope operation item, and (ii) the recorded history data;

wherein said reproducing the microscope state comprises causing the display unit to simultaneously display a plurality of images of the sample corresponding to a plurality of pieces of the image data recorded in the history record unit, selecting one image from among the plurality of simultaneously displayed images, and reproducing a microscope state to which an observation state is changed based on the selected image; and wherein the history data relating to the microscope operation history is cleared after a return position at which the microscope state is reproduced.

* * * * *